United States Patent [19]

Nakayama et al.

[11] Patent Number: 5,737,618
[45] Date of Patent: Apr. 7, 1998

[54] DOCUMENT PROCESSING SYSTEM FOR DISPLAYING BRACKETS

[75] Inventors: Rimiko Nakayama, Yamatoko riyama; Takayuki Nagai, Nara; Toshiharu Oshima, Yamatoko riyama; Tadamasa Maekawa, Nara, all of Japan

[73] Assignee: Sharp Kabushiki Kaisha, Osaka, Japan

[21] Appl. No.: 428,625

[22] Filed: Apr. 25, 1995

[30] Foreign Application Priority Data

Apr. 28, 1994 [JP] Japan ............................. 6-092136
Oct. 6, 1994 [JP] Japan ............................. 6-242688

[51] Int. Cl.⁶ ............................................ G06T 7/60
[52] U.S. Cl. ................. 395/761; 395/794; 395/133; 395/802
[58] Field of Search ................. 395/144–149, 395/100, 102, 104, 117, 133, 135, 139, 141, 155, 761, 794, 799

[56] References Cited

U.S. PATENT DOCUMENTS

| 4,815,029 | 3/1989 | Barker et al. | 364/900 |
|---|---|---|---|
| 4,933,880 | 6/1990 | Borgendale et al. | 364/523 |
| 5,170,467 | 12/1992 | Kubota et al. | 395/148 |
| 5,396,590 | 3/1995 | Kreegar | 395/159 |
| 5,517,578 | 5/1996 | Altman et al. | 382/181 |

FOREIGN PATENT DOCUMENTS

| 63-16367 | 1/1988 | Japan . |
|---|---|---|
| 63-115217 | 5/1988 | Japan . |
| 64-74667 | 3/1989 | Japan . |
| 2-297125 | 12/1990 | Japan . |
| 3-30056 | 2/1991 | Japan . |
| 5-2581 | 1/1993 | Japan . |
| 5-216877 | 8/1993 | Japan . |

OTHER PUBLICATIONS

Rozells, Gia, SuperPaint 3–Everything You Need to Know, Prima Publishing, 137–138, 1992.

Picarille, Lisa, More Desktop Users Turning to Word Processors, PC Week, v. 5, No. 32, p. 73(2), Aug. 8, 1988.

Stone, M. David, PC Publishing Success, PC Magazine, v. 12, No. 3, p. 140(1), Feb. 9, 1993.

Lefkowitz, Larry, PageMaker Gets a Serious Competitor, Windows Sources, v. 1, No. 4, p. 159(3), May 1993.

Petzold, Charles, Font Selection Under Windows NT, PC Magazine, v. 13, No. 10, p. 306(3), May 31, 1994.

*Primary Examiner*—Heather R. Herndon
*Assistant Examiner*—Cliff N. Vo

[57] ABSTRACT

The document processing system which performs a function of storing in a memory data of a bracket input by an input device and positional data of starting and ending points of the bracket located in the document. The document processing system then determines an appropriate size of the bracket based on the positional data stored in the memory so as to properly lay out the bracket in the document. The system then generates and displays the appropriately sized bracket in a position specified by the positional data.

15 Claims, 47 Drawing Sheets

102 Starting point

104 Bracket

101 Cursor

103 Ending point

FIG. 7

| Bracket type number | 1 | 2 | 3 | 4 | 5 | 6 | 7 |
|---|---|---|---|---|---|---|---|
| Bracket type | ⌣ | ⌣ | L⌐ | ⌣ | ⋁ | ⋙ | ⌣ |

FIG. 14
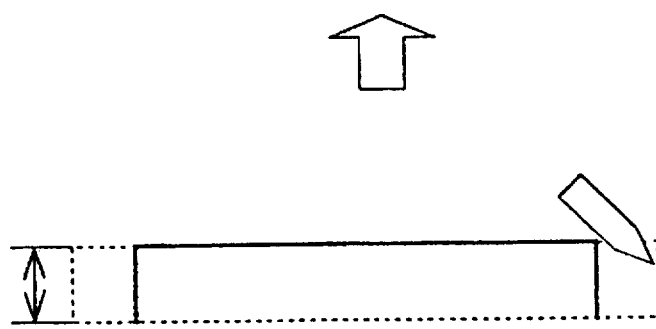
(3)
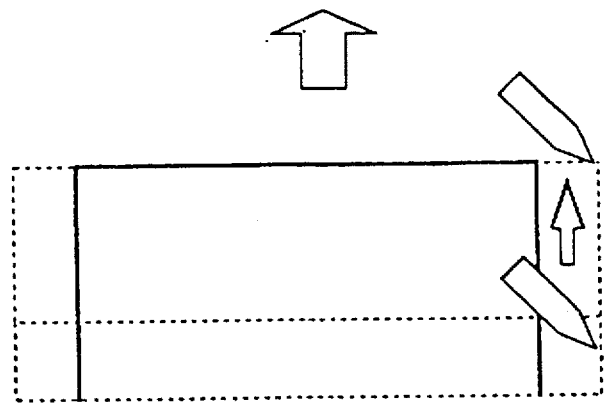
(2)
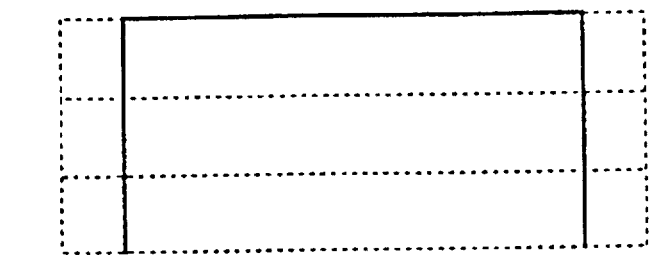
1 column
(1)

FIG. 17
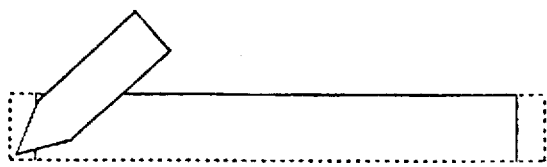
(b)
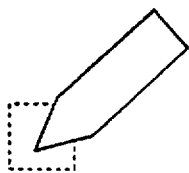
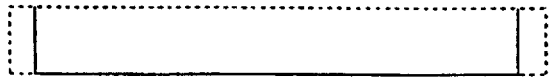
(a)

FIG. 18

<Today's Menu>

Beef stew (for four) {
- beef     3 0 0 g (Preferably lean meat)
- Onions    2
- Carrots    1 5 0 g
- Potatoes   2
- ⋮
- 2 Consomme cubes
}

Mimosa salad {
- Lettuce   1/2
- Egg       1
- Bacon     3
- ⋮
}

Fig. 25

<Today's Menu>

Beef   300g (Preferably lean meat)  ⎫
Onions                              ⎬  Beef stew
Carrots                             ⎭  (for four)
Consomme cubes

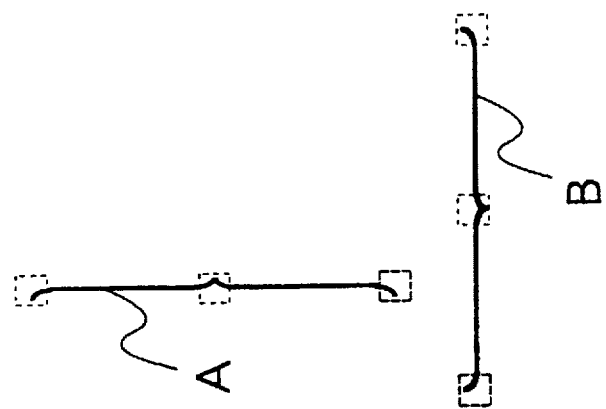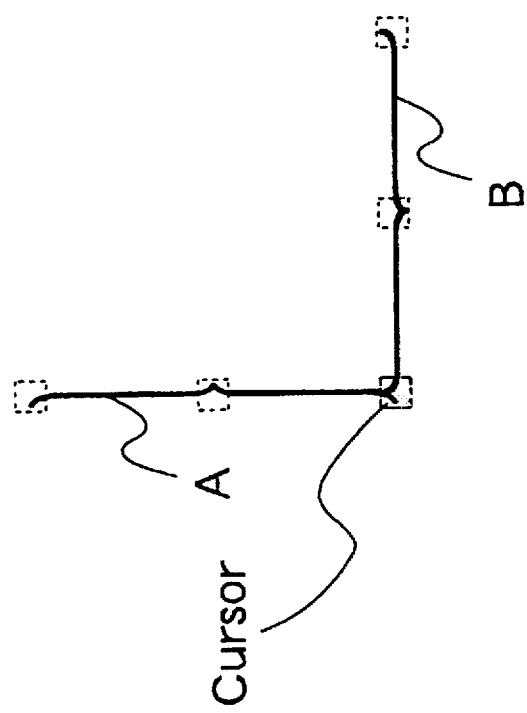
Fig. 28

FIG. 35

| Null characters | Null code | Line-feed code | non-input code |
|---|---|---|---|
| Display | ☐ | → | ● |

FIG. 38

| Type number | 1 | 2 | 3 | 4 | 5 | 6 | 7 | 8 |
|---|---|---|---|---|---|---|---|---|
| Elongated bracket | ⎣⎦ | ⌵ | ⌣ | ⌣ | ⌣ | ⌴ | ⌣ | ⌄⌄ |
| Characteristic point | ○ | ○ | ○ | × | × | × | × | × |

FIG. 39

| Orientation flag | 1 | 2 | 3 | 4 |
|---|---|---|---|---|
| Elongated bracket | ⌣ | ⌢ | } | { |

DOCUMENT PROCESSING SYSTEM FOR DISPLAYING BRACKETS

BACKGROUND OF THE INVENTION

1. Field of the Invention

The present invention relates to document processing systems such as word processors, personal computers, electronic diaries that are capable of editing documents in various languages and, more particularly, to document processing systems capable of displaying brackets extending across plural lines on the screen thereof. The present invention further relates to document processing systems such as word processors and personal computers that are capable of inputting characters, graphics and symbols and, more particularly, to document processing systems capable of modifying characters, graphics and symbols extending across plural lines or plural columns.

2. Description of Background Art

Some of conventional document processing systems including Japanese word processors which have basic functions of inputting characters and editing texts can generate and display brackets extending across plural lines on the screen thereof, and deal with sentences and character strings of plural lines enclosed in elongated brackets. Further, some document processing systems employ graphic-positioning codes to mark the display position of graphics in a document. Examples of such conventional document processing systems will be described below.

Japanese Unexamined Patent Publication No. 63-16367 (1988) discloses a Japanese document processing system in which paired brackets (open and close brackets) preliminarily registered as a dictionary item are read out to be input and displayed on the screen thereof by a single operation, and then the input mode is automatically switched to an insertion mode when the cursor is moved just before the close bracket to input characters between the brackets.

Japanese Unexamined Patent Publication No. 63-115217 (1988) discloses a character inputting system in which, when it is judged that a bracket or bracketing symbol is input, paired brackets are stored and displayed on the screen and subsequently input characters are inserted between the paired brackets.

Japanese Unexamined Patent Publication No. 64-74667 (1989) discloses a document processing system in which paired brackets of a desired type am selected from plural types of vertically elongated brackets, and text data in a designated position is moved to a position between the selected paired brackets.

Japanese Unexamined Patent Publication No. 3-30056 (1991) discloses a document processing system in which, after inputting open and close brackets of a desired type by using a dedicated input key, an operator can change the length of the elongated brackets in accordance with the number of lines or columns of a text block to be input between the open and close brackets.

Japanese Unexamined Patent Publication No. 2-297125 (1990) discloses an information processing system in which a bracket area is set in a desired position on the screen where a bracketed text block is to be located, and brackets of a selected pattern am vertically or transversely elongated on an appropriate scale so as to be accommodated within the bracket area.

Japanese Unexamined Patent Publication No. 5-2581 (1993) discloses a character inputting system in which the size of designated paired brackets is determined in accordance with the number of lines of a text block or character strings to be located between the paired brackets, and then the text block is enclosed in the paired brackets.

In accordance with Japanese Unexamined Patent Publications No. 63-16367 (1988), No. 63-115217 (1988) and No. 330056 (1991), paired brackets (open and close brackets) can be input at a time, and characters to be input can be inserted therebetween. Therefore, it is not necessary to move the cursor to input characters nor to separately input the close bracket, thereby saving time.

In accordance with Japanese Unexamined Patent Publication No. 64-74667 (1989), vertically elongated brackets can be input by a single operation without repeating similar input operations many times.

In accordance with Japanese Unexamined Patent Publication No. 2-297125 (1990), data of the bracket area in which the text block enclosed in the vertically or transversely elongated brackets is to be located is first input and then the sizes of the brackets and characters to be input between the brackets are automatically adjusted so that the brackets and the text block can be accommodated in the bracket area.

In accordance with Japanese Unexamined Patent Publication No. 5-2581 (1993), when a text block of plural lines is to be bracketed, the length of the paired brackets (open and close brackets) can be automatically adjusted in accordance with the line number of the text block.

Further, Japanese Unexamined Patent Publication No. 5-216877 (1993) discloses a document creating system in which graphics-positioning codes are available to facilitate the designation of the position of graphics in a document.

In a typical conventional document processing system, when brackets extending across plural lines or columns (hereinafter referred to as "elongated brackets") are to be input, it is necessary to reserve areas in which the elongated brackets are to be input or to designate the input positions of the elongated brackets by moving the cursor to a position where each of the elongated brackets is to be input. An exemplary bracket inputting operation is shown in FIGS. 48(a) and 48(b). If a text block is to be bracketed when a cursor 296 is in a position shown in FIG. 48(a), it is necessary to move the cursor to a position shown in FIG. 48(b).

Further, it is necessary to elongate a bracket or to select an elongated bracket having a desired size from candidate brackets having different sizes included in a menu. More specific description is given to this operation with reference to FIGS. 48(c) and 48(d).

After a bracket input position is designated as shown in FIG. 48(c), a temporarily displayed elongated bracket 297 (which has a length, shape and the like designated in a previous bracket input operation) should be further elongated as shown in FIG. 48(d) for inputting an elongated bracket having a desired length.

Still further, if an elongated bracket having a characteristic point (e.g., a portion projecting to the left from the center of the open bracket indicated by a reference numeral 232 in FIG. 31) is to be input, the position of the characteristic point should be designated. After the position and length of the elongated bracket are designated, the characteristic point temporarily located at the center of the elongated bracket should be moved to a position adjacent to characters 301 on the left side of the bracket as shown in FIG. 49. That is, the characteristic point should be moved from the position 302 shown in FIG. 49(a) to a position 303 adjacent to the characters shown in FIG. 49(b).

As can be understood from the foregoing, if an existing text block is to be properly bracketed, the position and length of the elongated bracket and the position of the characteristic point thereof should be designated. This complicates the bracket inputting operation.

Furthermore, a document processing system having functions of generating and displaying elongated brackets cannot afford a proper line-feed control within a bracketed area. Therefore, when sentences enclosed in elongated brackets are edited, the layout of the sentences is messed up by the insertion and deletion of characters within the bracketed area.

Still further, if an existing text block is to be enclosed in elongated brackets, the operation of inputting the elongated brackets or changing the size thereof is troublesome.

Yet further, the aforesaid conventional document processing systems can change neither the boldness nor length of the input elongated brackets. Therefore, the appearance of the brackets is monotonous, and it is not easy to create a highly impressive document by using such conventional brackets.

In a document as shown in FIG. 18, an elongated bracket has a left projection at the center thereof, and it is difficult to understand at first glance the relation between a subheading and text lines grouped together by the bracket. Therefore, a function of moving a characteristic point of a bracket in a desired position is required.

Yet further, it may be desired to modify an elongated bracket in accordance with the modification of sentences. More specifically, it may be desired to change the position of the elongated bracket or the starting or ending point of the elongated bracket, to incline the elongated bracket, or to rotate the elongated bracket about a certain center when sentences enclosed in the elongated brackets are moved, inserted or deleted.

In any of these cases, the conventional systems require complicated bracket modifying operations including the reset of bracket positioning data, the change in scale for enlarging a bracket and the like, or require to generate a bracket from scratch. Thus, the modification operation for elongated brackets is very troublesome.

SUMMARY OF THE INVENTION

In accordance with the present invention, there is provided a document processing system comprising: an input means for inputting data of a document; a document storing means for storing therein the input document data; a display means for displaying the document data; a bracket data storing means for storing therein data of plural types of brackets each having a predetermined shape; a bracket specification storing means for storing therein data of a bracket type selected from the plural types of brackets stored in the bracket data storing means; a bracket position specifying means for specifying positions of starting and ending points between which a bracket specified by the data stored in the bracket specification storing means is to be located; a bracket position storing means for storing therein positional data indicative of the positions of the starting and ending points in the document specified by the bracket position specifying means; a bracket generating means for determining a bracket size of the bracket specified by the data stored in the bracket specification storing means based on the positional data stored in the bracket position storing means so as to properly lay out the bracket in the document, generating the bracket having the bracket size, and storing the generated bracket in the document storing means; and an editing means for allowing the display means to display the generated bracket in a position in the document specified by the positional data.

In accordance with the present invention, there is provided a document processing system comprising: an input means for inputting data of a document; a document storing means for storing therein the input document data; a display means for displaying the document data; a bracket data storing means for storing therein data of plural types of brackets each having a predetermined shape; a bracket specification storing means for storing therein data of a bracket type selected from the plural types of brackets stored in said bracket data storing means; a bracket data specifying means for specifying a position in which a bracket specified by the data stored in said bracket specification storing means is to be located; a boldness specifying means for specifying a boldness of the bracket; a width specifying means for specifying a width of the bracket; a set data storing means for storing therein data indicative of the position, boldness and width of the bracket specified by said bracket data specifying means, boldness specifying means and width specifying means, respectively; a bracket generating means for generating the bracket specified by the data stored in said bracket specification storing means and having the position, boldness and width specified by the data stored in said set data storing means, and storing the generated bracket in said document storing means; and an editing means for allowing said display means to display the generated bracket in a position in the document specified by the data stored in said set data storing means, whereby the boldness and width of the bracket once generated are changeable.

In accordance with the present invention, there is provided a document processing system comprising: a second input means for inputting data of a document by handwriting; a document storing means for storing therein the input document data; a display means for displaying the document data; a bracket data storing means for storing therein data of plural types of brackets each having a predetermined shape; a bracket specification storing means for storing therein data of a bracket type selected from the plural types of brackets stored in said bracket data storing means; a bracket identifying means for comparing a trace of the input documents data with the data of plural types of brackets in the bracket data storing means and selecting a bracket type which is the closest in shape; a bracket specification storing means for storing data of the bracket type selected by said bracket identifying means; a bracket position storing means for storing therein positional data of starting and ending points of the trace of the input bracket; a bracket generating means for determining a size of the bracket specified by the data stored in said bracket specification storing means based on the positional data stored in said bracket position storing means so as to properly lay out the bracket in the document, generating the bracket having said size, and storing the generated bracket in said document storing means; and an editing means for allowing said display means to display the generated bracket in a position in the document specified by the positional data.

In accordance with the present invention, there is provided a document processing system comprising: an input means for inputting data of a document; a document storing means for storing therein the input document data; the document of the input means and the document storing means including a symbol extending across plural lines or plural columns; a display means for displaying the document data; an input position specifying means for specifying an input position in the document data; a symbol input position determining means for determining an input position of the symbol, based on the input position specified by said input position specifying means and arrangement of null characters and characters other than the null characters around the input position specified by said input position specifying means in the document data; and an editing means for storing the symbol data input in the input position of the symbol in said document storing means.

In accordance with the present invention, there is provided a document processing system comprising: an input means for inputting data of a document; a document storing means for storing therein the input document data; the document of the input means and the document storing means including a symbol extending across plural lines or plural columns; a display means for displaying the document data; a symbol length determining means for determining a length of the symbol, based on arrangement of null characters and characters other than the null characters around an input position of the symbol in the document data; and an editing means for allowing the symbol data to include data indicative of the length determined by said symbol length determining means, and storing the symbol data in said document storing means.

In accordance with the present invention, there is provided a document processing system comprising: an input means for inputting data of a document; a document storing means for storing therein the input document data; the document of the input means and the document storing means including a symbol extending across plural lines or plural columns; a display means for displaying the document data; a characteristic-point determining means for determining a position of a characteristic point of the symbol based on positions of characters other than null characters around an input position of the symbol in the document data; and an editing means for allowing the symbol data to include data indicative of the position of the characteristic point determined by said characteristic-point determining means and storing the symbol data in said document storing means.

The present invention allows an operator to designate the positions of the starting and ending points of a specified elongated bracket. Therefore, the operator can easily input an elongated bracket of a desired size in a desired position.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 7 is a diagram showing various types of elongated brackets;

FIGS. 14(1) through (3) are diagrams for explaining a process for changing the width of a bracket by using a pen-type input device;

FIGS. 17(a) through (b) are diagrams for explaining an exemplary process for generating a close bracket;

FIG. 18 is a diagram for explaining a conventional elongated bracket;

FIG. 25 is a diagram for explaining an inclined bracket;

FIG. 28 is a diagram for explaining a case where elongated brackets overlap each other.

FIG. 35 is a diagram for explaining null characters;

FIG. 38 is a diagram illustrating a bracket type table in which types of elongated brackets are each specified by a bracket type number;

FIG. 39 is a diagram illustrating an orientation flag table including a flag indicative of an orientation of an elongated bracket;

DESCRIPTION OF THE PREFERRED EMBODIMENTS

It is an object of the present invention to provide a document processing system which can facilitate an operation of inputting an elongated bracket and easily change the appearance of the bracket so as to improve the impression of a document.

It is another object of the present invention to provide a document processing system which can determine a symbol input position based on the arrangement of document data when a symbol such as bracket symbol or graphic symbol extending across plural lines or columns is input, thereby facilitating the operation of designating the symbol input position.

It is further another object of the present invention to provide a document processing system which can determine a bracket input position by searching document data when a bracket extending across plural lines is input, thereby facilitating the operation of designating the bracket input position.

It is still another object of the present invention to provide a document processing system which can determine an appropriate symbol length based on the arrangement of document data when a symbol such as bracket symbol or graphic symbol extending across plural lines or columns is input, thereby facilitating a symbol inputting operation.

It is further another object of the present invention to provide a document processing system which can determine an appropriate bracket length by searching document data when a bracket extending across plural lines is input, thereby facilitating a bracket input operation.

It is still another object of the present invention to provide a document processing system which can easily select an appropriate symbol length from several candidate lengths, when a symbol such as bracket symbol or graphic symbol extending across plural lines or columns is input and the length of the symbol is to be determined based on the arrangement of document data.

It is further another object of the present invention to provide a document processing system which, when a symbol such as bracket symbol or graphic symbol extending across plural lines and having a characteristic point is input, can detect an appropriate position of the characteristic point of the symbol based on the arrangement of document data, thereby facilitating a symbol input operation.

Figure 1:
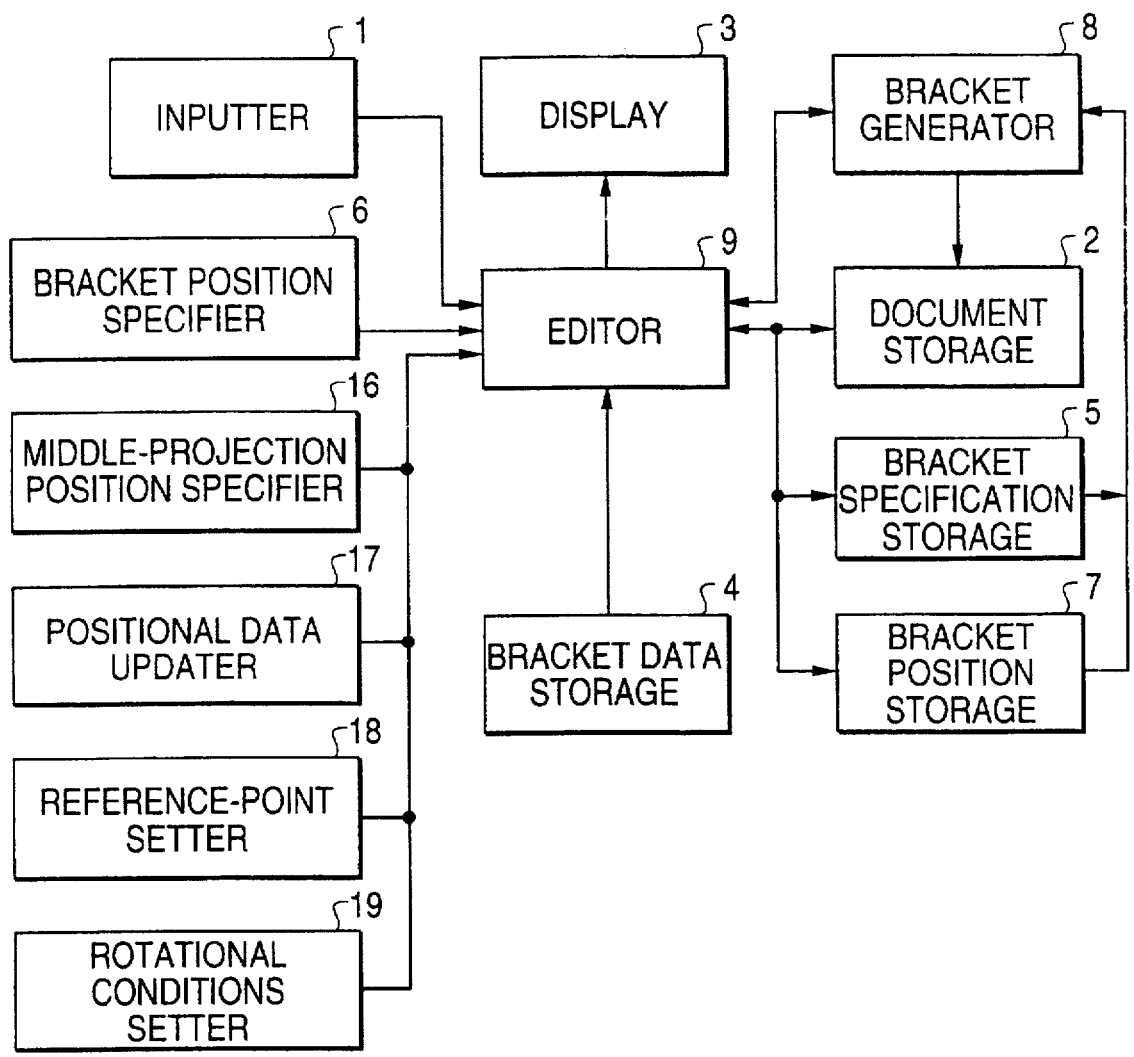
FIG. 1 is a block diagram illustrating a document processing system of a first structure in accordance with the present invention.

FIG. 1 is a block diagram illustrating a document processing system of a first embodiment in accordance with the present invention.

As shown, the document processing system comprises: an inputter 1 for inputting data of a document; a document storage 2 for storing therein the input document data; a display 3 for displaying the document data; a bracket data storage for storing therein data of plural types of brackets each having a predetermined shape; a bracket specification storage 5 for storing therein data of a bracket type selected from the plural types of brackets stored in the bracket data storage 4; a bracket position specifier 6 for specifying positions of starting and ending points between which a bracket specified by the data stored in the bracket specification storage 5 is to be located; a bracket position storage 7 for storing therein positional data indicative of the positions of the starting and ending points in the document specified by the bracket position specifier 6; a bracket generator 8 for determining a bracket size of the bracket specified by the data stored in the bracket specification storage 5 based on the positional data stored in the bracket position storage 7 so as to properly lay out the bracket in the document, generating the bracket having the bracket size and storing the generated bracket in the document storage 2; and an editor 9 for allowing the display 3 to display the generated bracket in a position in the document specified by the positional data.

Figure 2:
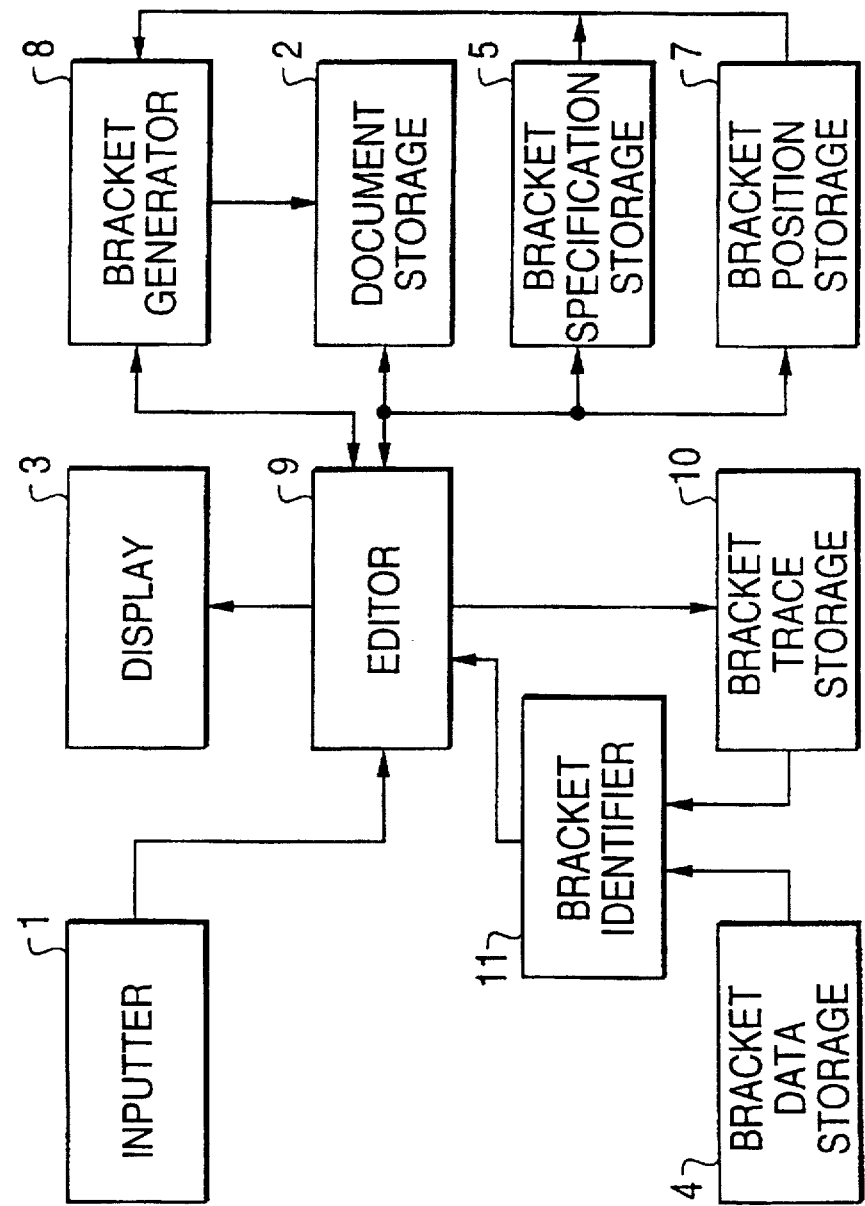
FIG. 2 is a block diagram illustrating a document processing system of a second structure in accordance with the present invention.

FIG. 2 is a block diagram illustrating a document processing system of a second embodiment in accordance with the present invention.

As shown, the document processing system comprises: a second inputter 1 for inputting data of a document by handwriting; a document storage 2 for storing therein the input document data; a display 3 for displaying the document data; a bracket data storage 4 for storing therein data of plural types of brackets each having a predetermined shape; a bracket identifier 11 for comparing a trace of the input documents data with the data of plural types of brackets in the bracket data storage 4 and selecting a bracket type which is the closest in shape; a bracket specification storage 5 for storing data of the bracket type selected by said bracket identifier 11; a bracket position storage 7 for storing therein positional data of starting and ending points of the trace of the input bracket; a bracket generator 8 for determining a size of the bracket specified by the data stored in said bracket specification storage 5 based on the positional data stored in said bracket position storage 7 so as to properly lay out the bracket in the document, generating the bracket having said size, and storing the generated bracket in said document storage 2; and an editor 9 for allowing said display 3 to display the generated bracket in a position in the document specified by the positional data.

Figure 3:
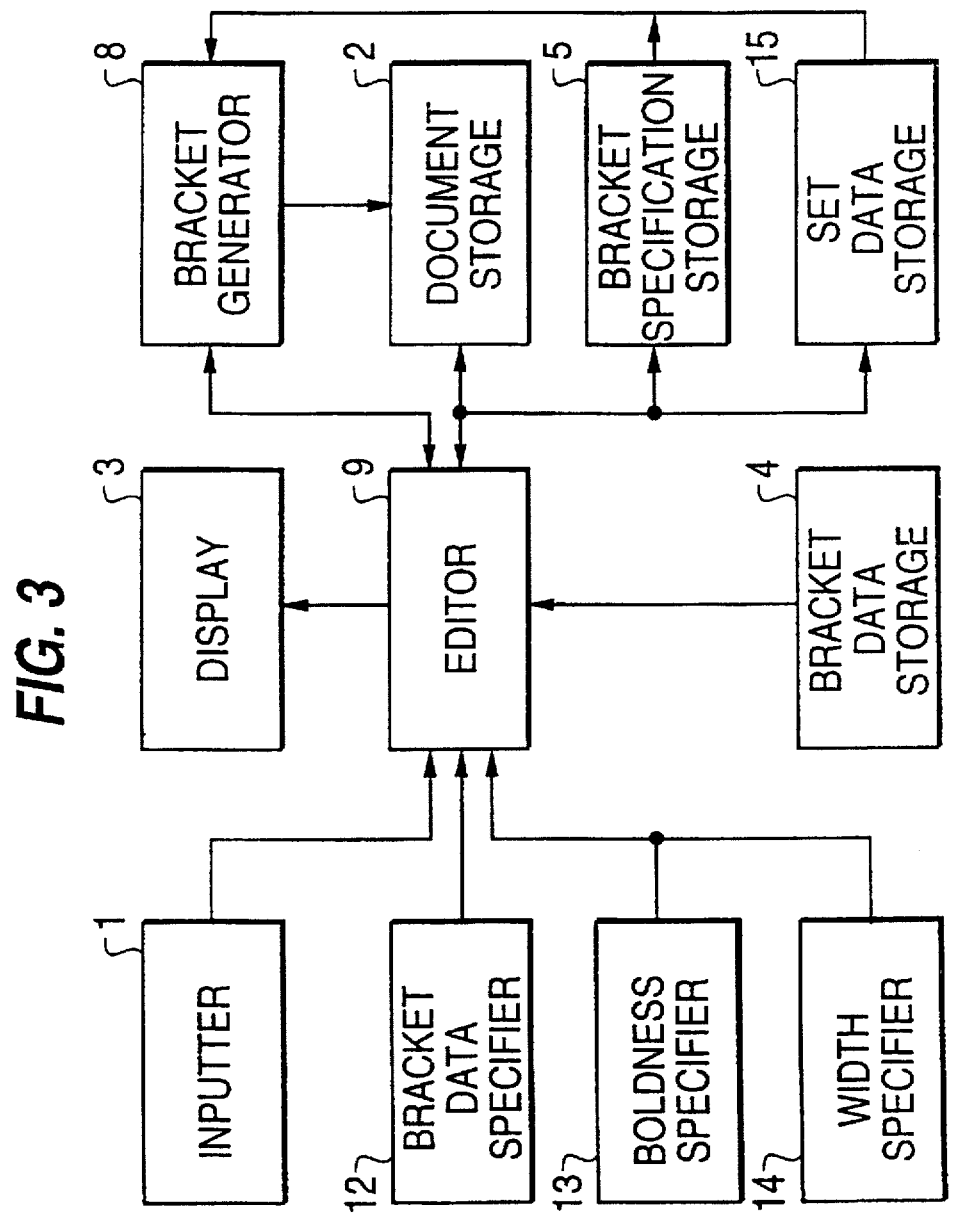
FIG. 3 is a block diagram illustrating a document processing system of a third structure in accordance with the present invention.

FIG. 3 is a block diagram illustrating a document processing system of a third embodiment in accordance with the present invention.

As shown, the document processing system comprises: an inputter 1 for inputting data of a document; a document storage 2 for storing therein the input document data; a display 3 for displaying the document data; a bracket data storage 4 for storing therein data of plural types of brackets each having a predetermined shape; a bracket specification storage 5 for storing therein data of a bracket type selected from the plural types of brackets stored in the bracket data storage 4; a bracket data specifier 12 for specifying a position in which a bracket specified by the data stored in the bracket specification storage 5 is to be located; a boldness specifier 13 for specifying a boldness of the bracket; a width specifier 14 for specifying a width of the bracket; a set data storage 15 for storing therein data indicative of the position, boldness and width of the bracket specified by the bracket data specifier 12, boldness specifier 13 and width specifier 14, respectively; a bracket generator 8 for generating the bracket specified by the data stored in the bracket specification storage 5 and having the position, boldness and width specified by the data stored in the set data storage 15, and storing the generated bracket in the document storage 2; and an editor 9 for allowing the display 3 to display the generated bracket in a position in the document specified by the data stored in said set data storage 15, whereby the boldness and width of the bracket once generated are changable.

Preferably, the document processing system shown in the block diagram of FIG. 1 may further comprise a middle-projection position specifier 16 for specifying a position of a middle projection of the bracket specified by the data stored in the bracket specification storage 5, the bracket position storage 7 being adapted to store positional data indicative of the position of the middle projection in the document specified by the middle-projection position specifier 16, the bracket generator 8 being adapted to generate the bracket specified by the data stored in the bracket specification storage 5 and having the middle projection located in the position specified by the middle-projection position specifier 16, and to store the generated bracket in the document storage 2.

Preferably, the document processing system may further comprise a positional data updater 17 for updating the positional data indicative of the positions of the starting and/or ending points of the bracket which are specified by the data stored in the bracket position storage 7, the bracket generator 8 being adapted to generate the bracket specified by the data stored in the bracket specification storage 5 and having the starting and/or ending points located in the positions specified by the positional data updater 17, and to store the generated bracket in the document storage 2.

Preferably, the document processing system may further comprise a reference point setter 18 for setting a reference point serving as the center of rotation of the bracket and located at a given point on the bracket, and a rotational conditions setter 19 for setting the conditions of rotation of the bracket, the bracket generator 8 being adapted to rotate the bracket specified by the data stored in the bracket specification storage 5 around the reference point under the conditions set by the rotational conditions setter 19. The conditions of rotation include rotational direction, rotational angle and the like.

Exemplary input devices to be used as the inputter 1 include a keyboard and pointing devices such as a pen, mouse and track ball.

Preferable display devices to be used as the display 3 include a CRT (cathode ray tube), liquid crystal display panel (LCD) and the like.

Preferably, an ROM (read only memory) is used as the bracket data storage 4, but external storages such as a hard disk and flexible disk may be used.

Preferably, an RAM (random access memory) is used as the document storage 2, bracket specification storage 5, bracket position storage 7, bracket trace storage 10 and set data storage 15, but external storages such as a hard disk and flexible disk may be used.

Preferable input devices to be used as the bracket position specifier 6, bracket data specifier 12, boldness specifier 13 and width specifier 14 include a keyboard, pointing devices and the like, which are the same as those used as the inputter 1.

Preferably used as the bracket generator 8, editor 9 and bracket identifier 11 is a socalled microprocessor including a CPU (central processing unit), RAM, ROM, I/O interface, timer and the like. In document processing systems, the operation of these elements are controlled by software stored in the ROM.

Preferable input devices to be used as the middle projection position specifier 16, positional data updater 17, reference point setter 18 and rotational conditions setter 19 include a keyboard, pointing devices and the like.

FIG. 1, 2, and 3 are separately explained.

However, the document processing system can be formed by an appropriate combination of the characteristic elements shown in FIGS. 1, 2, and 3, e.g., those in FIGS. 1 and 2, in FIGS. 1 and 3, in FIGS. 3 and 3, and in FIGS. 1, 2, and 3.

Figure 29:
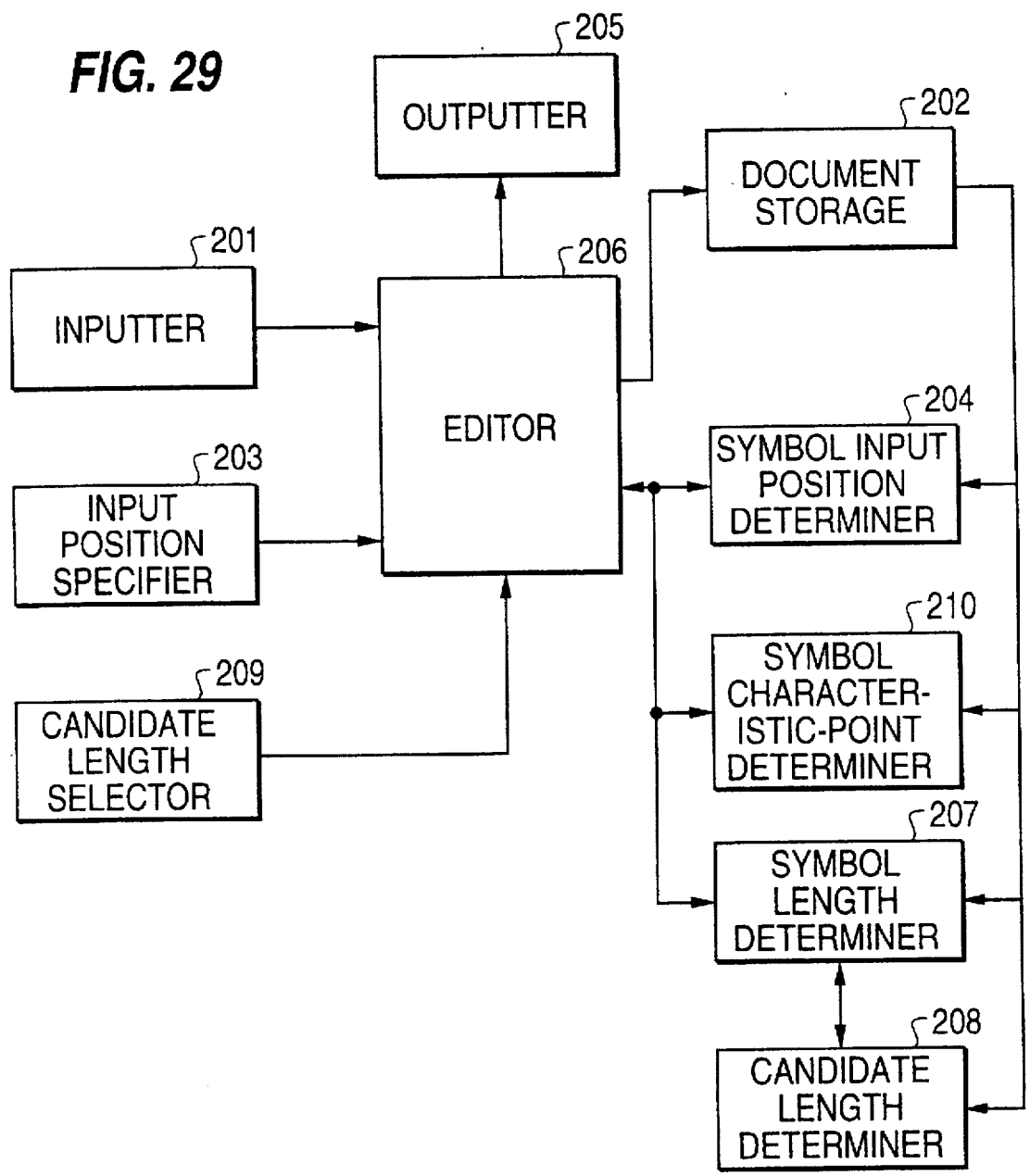
FIG. 29 is a block diagram illustrating a document processing system of a fourth structure in accordance with the present invention.

FIG. 29 is a block diagram illustrating a document processing system of a fourth embodiment in accordance with the present invention.

As shown, the document processing system comprises: an inputter 201 for inputting data of a document and data of a symbol extending across plural lines or plural columns; a document storage 202 for storing therein the document data and symbol data; an input position specifier 203 for specifying an input position of the document data; a symbol input position determiner 204 for determining an input position of the symbol, based on arrangement of null characters and characters other than the null characters around the input position specified by the input position specifier 203 in the document data stored in the document storage 202; and an editor 206 for editing and storing the symbol data input in the symbol input position and the document data input by the inputter 201 in the document storage 202, properly laying out the document data stored in the document storage 202, and outputting to an outputting means 205 the document data properly laid out.

In the document processing system, when the symbol extending across plural lines is input by the inputter 201, the symbol input position determiner 204 may determine the input position of the symbol by detecting a position where a character of a type other than that of a character located in the position specified by the input position specifier 203 in the document data stored in the document storage 202 is first detected on the right or left side of a column of the specified position.

In accordance with another aspect of the present invention, there is provided a document processing system comprising: an input means 201 for inputting data of a document and data of a symbol extending across plural lines or plural columns; a document storing means 202 for storing therein the document data and symbol data; a symbol length determiner 207 for determining a length of the symbol based on arrangement of null characters and characters other than the null characters around an input position of the symbol in the document data stored in the document storage 202; and an editor 206 for allowing the symbol data to include data indicative of the length determined by the symbol length determiner 207 and storing the symbol data in the document storage 202.

In the document processing system, when the symbol extending across plural lines is input by the inputter 201, the symbol length determiner 207 may determine the length of the symbol by downwardly searching the document data stored in the document storage 202 along columns next to the symbol input position on the right and left sides thereof, detecting a first number of lines counted from a line in which a character other than the null characters is first detected on the right side to a line in which a null character is thereafter detected on the right side and a second number of lines counted from a line in which a character other than the null characters is first detected on the left side to a line in which a null character is thereafter detected on the left side, and adopting a line number whichever is greater of the first and second line numbers as the length of the symbol.

The document processing system may further comprise: a candidate length determiner 208 for determining candidate lengths of the symbol, if any, by allowing the symbol length determiner 207 to further downwardly search the document data along the columns next to the symbol input position on the right and left sides thereof from a position of an ending point of the symbol having the length determined by the symbol length determiner 207 as far as possible; a candidate length selector 209 for selecting any one of the candidate lengths determined by the candidate length determiner 208; and an editor 206 for allowing the symbol data to include data indicative of the candidate length selected by the candidate length selector 209 and storing the symbol data in the document storage 202.

In accordance with still another aspect of the present invention, there is provided a document processing system comprising: an inputter 201 for inputting data of a document and data of a symbol extending across plural lines or plural columns; a document storage 202 for storing therein the document data and symbol data; a characteristic-point determiner 210 for determining a position of a characteristic point of the symbol based on positions of characters other than null characters around an input position of the symbol in the document data stored in the document storage 202; and an editor 206 for allowing the symbol data to include data indicative of the position of the characteristic point determined by the characteristic point determiner 210 and storing the symbol data in the document storage 202.

In the document processing system, when the symbol extending across plural lines and having a characteristic point is input by the inputter 201, the characteristic-point determiner 210 may determine the position of the characteristic point of the symbol by downwardly searching the document data along a column next to an input position of the symbol on a side to which the characteristic point projects, and detecting a first position just above a position in which a character other than the null characters is first detected and a second position in which a null character is thereafter detected, and adopting a middle position between the first and second positions as the position of the characteristic point of the symbol.

The present invention will hereinafter be described more specifically by way of embodiments thereof with reference to the attached drawings.

It should be understood that the embodiments are not limitative of the present invention. In the following description, a bracket open to the right is referred to as "open bracket", and a bracket open to the left is referred to as "close bracket".

Figure 4:
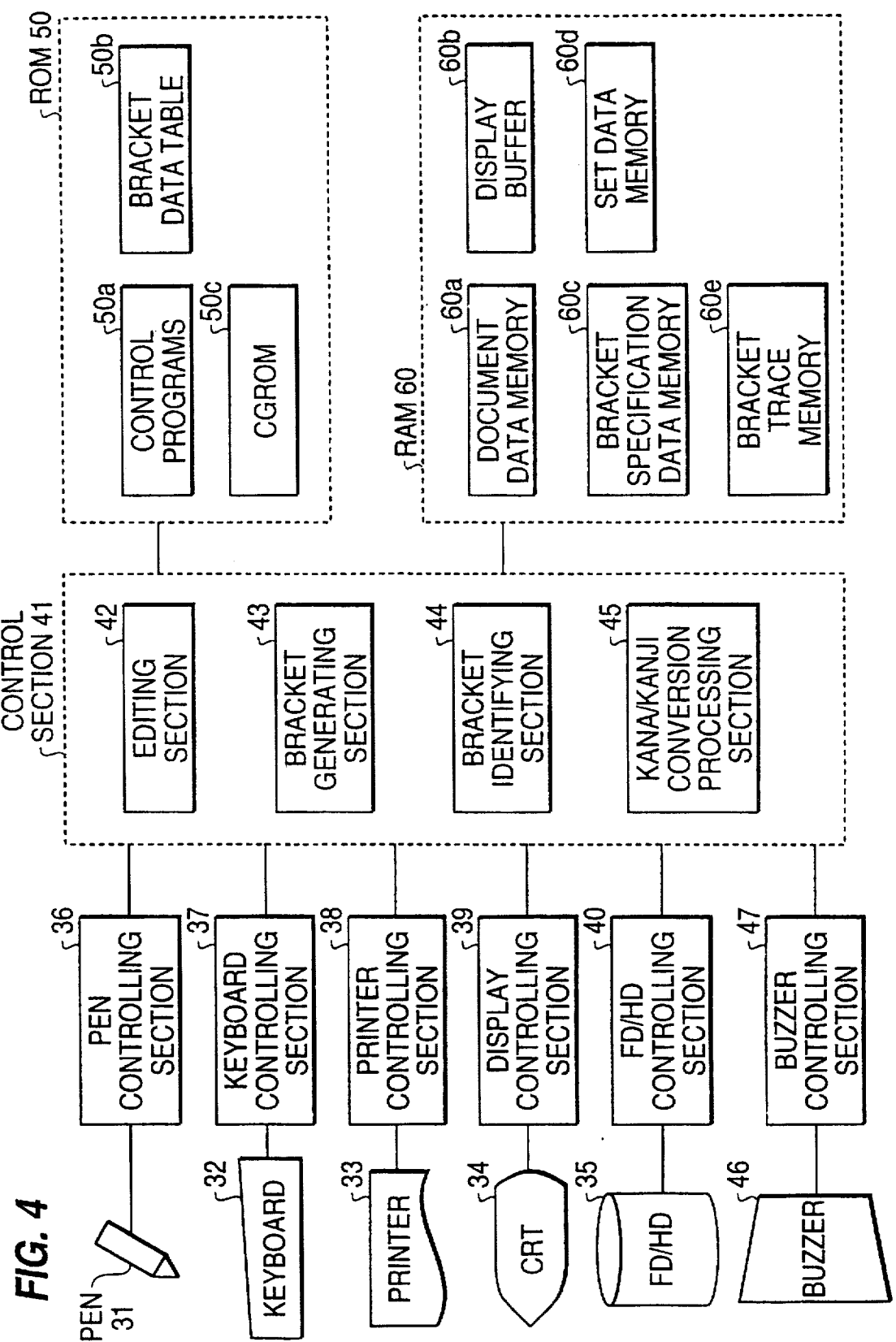
FIG. 4 is a block diagram illustrating the system configuration in accordance with one embodiment of the present invention.

FIG. 4 is a block diagram illustrating the system configuration of a document processing system in accordance with one embodiment of the present invention.

As shown, the document processing system includes external input/output devices 31 to 35 and 46, controllers 36 to 40 and 47 for controlling the external input/output devices, a control section 41, a ROM 50 and a RAM 60, which are connected with each other via address buses and data buses.

A pen 31 is used to specify various kinds of information and to input data, edit commands and the like. A pen controlling section 36 serves to detect an input state of the pen 31 and an input position in a coordinate system which is pointed at by the pen 31 to generate and send coordinate data to the control section 41.

A keyboard 32 is used to specify various kinds of information and to input data, edit commands and the like. A key-board controlling section 37 serves to send an input key code to the control section 41.

A printer 33 serves to output document data and other necessary data. A printer controlling section 38 serves to control the printer 33 and generate printer font data to print out document data and the like stored in the RAM 60.

A CRT 34 serves as a display device for displaying various kinds of information, and a liquid crystal display (LCD) and the like may otherwise be employed as the display device. A display controlling section 39 serves to send to the CRT 34 one-frame data to be displayed which is stored in the RAM 60.

An external storage unit 3 5 including a floppy disk drive and hard disk drive (FD/HD) serves to store document data. An FD/HD controlling section 40 serves to control the FD/HD 35 for data storage and data read.

A buzzer 46 serves to alert an operator to the occurrence of an incorrect data input or the like, and a buzzer controlling section 47 serves to control the actuation of the buzzer 46.

The ROM (read only memory) 50 includes control programs 50a, bracket data table 50b, font data memory (CGROM) 50c and the like. The ROM 50 may also store a dictionary for Kana/Kanji conversion (not shown) and image frame data for specifying various kinds of information.

The control programs 50a include descriptions concerning procedures for the operation of the control section 41. Various functions are performed, based on the control programs 50a.

Stored in the bracket data table 50b are data of brackets such as "(",")", "[","]", "{","}" and the like with the type number and shape thereof being paired.

It should be noted that the term "bracket" is herein used in the broad sense of the word and includes a round bracket, square bracket, angle bracket, brace and other bracketing symbols.

Stored in the font data memory (CGROM) 50c are data of bit-mapped fonts and outline fonts of characters and symbols for the displaying and printing thereof.

The display on the screen of the CRT 34 is achieved by reading out of the CGROM 50c font data corresponding to a character string stored in a display buffer 60b in the RAM 60 (which will be described later) and converting the font data into display data by means of the display controlling section 39.

The RAM (random access memory) 60 includes a document data memory 60a, display buffer 60b, bracket specification data memory 60c, set data memory 60d, bracket trace memory 60e and the like.

The document data memory 60a serves to store therein document data including characters, symbols, graphics, brackets and specification data input by means of the pen 31 or keyboard 32.

The display buffer 60b serves to temporarily store therein character data, graphic data and the like to be displayed on the screen of the CRT 34. Based on the data retained in the display buffer 60, display data is generated by the display controlling section 39.

The bracket specification data memory 60c serves to store therein data including a code and shape of a bracket selected from the bracket data stored in the bracket data table 50b, display positions of starting point and ending point of the bracket, a width of the bracket and the like.

The set data memory 60d serves to store therein data indicative of the boldness, width and input position of a bracket specified by the operator.

The bracket trace memory 60e serves to store therein data indicative of the trace of a bracket input by hand-writing with the pen 31, e.g., coordinate data of input positions sampled at predetermined time intervals.

The control section 41 typically includes a CPU (central processing unit) and serves to perform various functions in accordance with the procedures described in the control programs 50a and to control the external input/output devices.

The functions of the control section 41 which relates particularly to the present invention are performed by the following four sections.

An editing section 42 serves to perform an operation of editing the input document data including characters, graphics and the like. The edit operation includes fundamental operations of moving, copying, deleting, inserting, enlarging, reducing, displaying and printing the input document as well as operations of inputting and generating an elongated bracket, which are features of the present invention.

A bracket generating section 43 serves to generate a bracket as designated by the operator based on the data such as the shape and position of the bracket stored in the bracket specification data memory 60c, and to generate and store display data in the document data memory 60a.

A bracket identifying section 44 serves to determine which bracket among the brackets stored in the bracket data table 50b has the closest data to the data stored in the bracket trace memory 60e to identify the type of the handwritten bracket.

A Kana/Kanji conversion processing section 45 serves to convert a Kana character string input from the keyboard 32 into a Kana/Kanji character string. This function is a fundamental function conventionally employed by Japanese word processors.

FIG. 5 is a diagram for explaining an exemplary method for inputting an elongated bracket.

Figure 7:
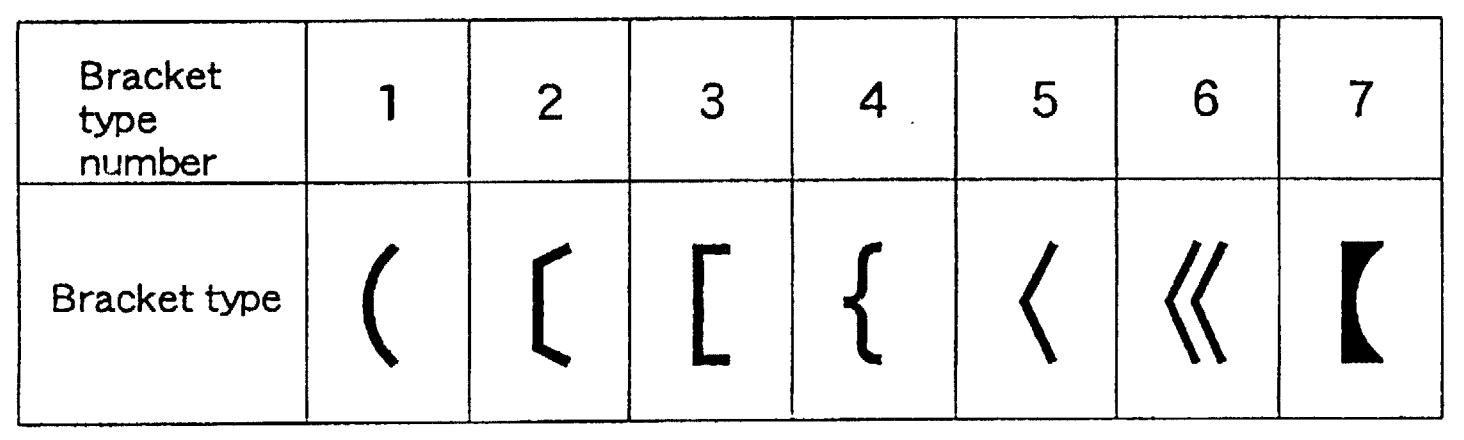

It is herein assumed that the type of an elongated bracket to be input has already been designated. More specifically, there has already been stored in the bracket specification data memory 60c data indicative of the type and shape of a bracket selected from the brackets stored in the bracket data table 50b by displaying a table containing several types of brackets as shown in FIG. 7 and then designating a desired bracket by means of the pen 31 or inputting a bracket type number corresponding to the desired bracket.

Figure 5B:
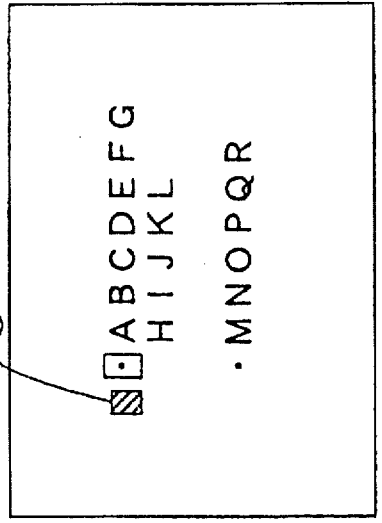
FIGS. 5(a) through (d) are diagrams for explaining an exemplary method for inputting an elongated bracket.
Figure 5D:
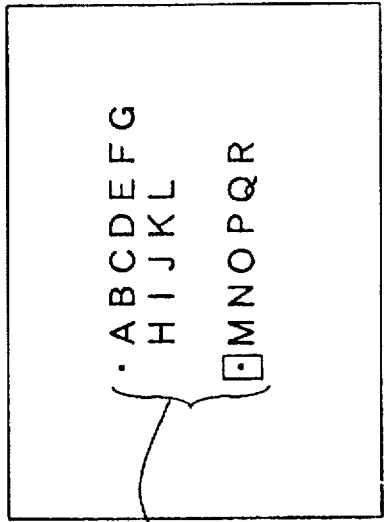
Figure 5A:
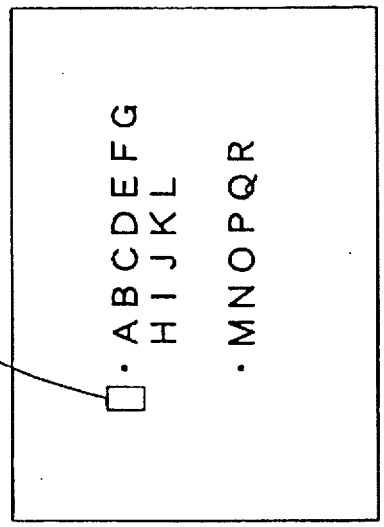

As shown in FIG. 5(a), a cursor 101 is first located at a left upper position where the desired bracket is to be placed after character strings are input. Preferably, the cursor 101 is moved by using keys dedicated to moving the cursor up, down, right and left provided in the keyboard 32.

Subsequently, the starting point 102 of the elongated bracket is input by using a dedicated key in the keyboard or by selecting an item from a menu, as shown in FIG. 5(b).

Figure 5C:
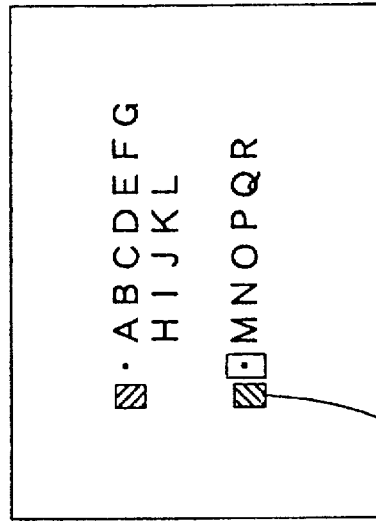

In turn, the ending point 103 of the elongated bracket is input by moving the cursor and pressing a dedicated key, as shown in FIG. 5(c).

Thus, the starting point and ending point of the elongated bracket are defined and the designated bracket having a designated size is displayed as shown in FIG. 5(d). At this time, the positional data of the starting and ending points of the bracket is stored in the bracket specification data memory 60c, and the bracket generating section 45 generates data of the bracket to be displayed, based on the positional data.

FIG. 6 is a diagram for explaining a method for inputting a desired elongated bracket by using the pen 31.

Figure 6A:
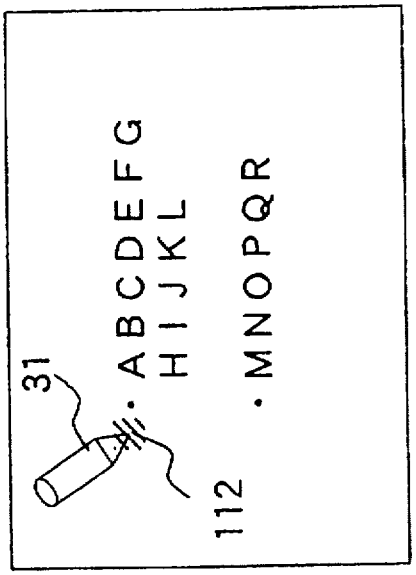
FIGS. 6(a) through (d) are diagrams for explaining a method for inputting an elongated bracket by using a pen-type input device.

As shown in FIG. 6(a), only character strings are first input.

Figure 6B:
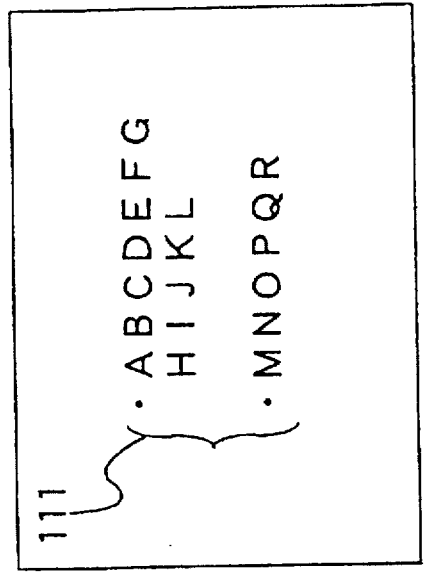

Subsequently, the starting point 112 of the elongated bracket is pointed at on the display screen with the pen 31, as shown in FIG. 6(b).

Figure 6C:
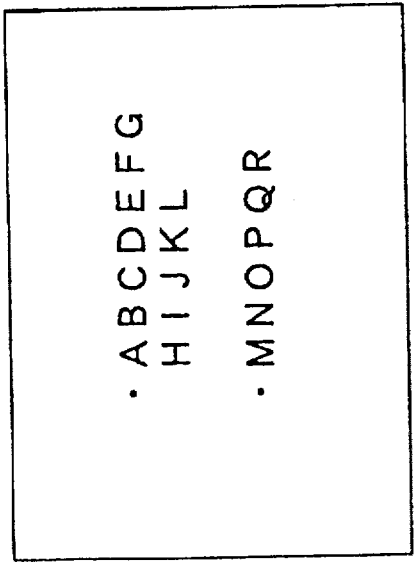

Then, the elongated bracket of a desired shape is contiguously drawn with the pen 31 kept in contact with the display screen as shown in FIG. 6(c), which illustrates a state just before the pen 31 is moved away from the display screen. In FIG. 6(c), reference numerals 113 and 114 denote the trace and ending point, respectively, of the elongated bracket.

Figure 6D:
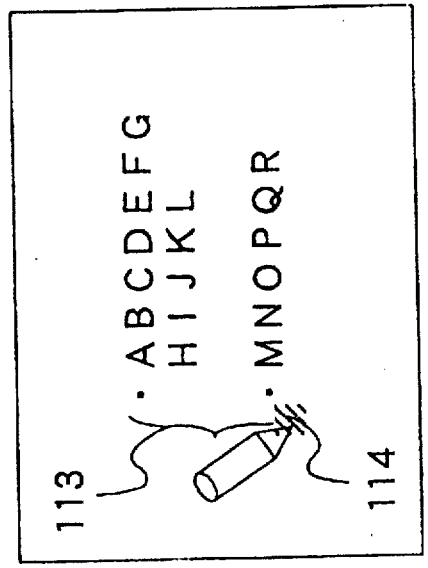

After the pen 31 is moved away from the display screen, the input elongated bracket is detected, then confirmed by the operator and displayed on the display screen, as shown in FIG. 6(d) in which a reference numeral 111 denotes the elongated bracket.

The positional data of the starting and ending points of the elongated bracket is stored in the bracket specification data memory 60c, and the data of the trace of the elongated bracket is stored in the bracket trace memory 60e.

The data of the starting and ending points and trace of the elongated bracket are represented by an X-Y coordinate system where, for example, the left upper corner of a document is defined as the origin thereof, and the X-axis and Y-axis extend transversely and longitudinally therefrom, respectively.

The trace data is a group of positional data of the pen 31 represented by coordinates which are sampled at predetermined time intervals.

The bracket identifying section 44 determines which bracket among the brackets stored in the bracket data table 50b is the closest in shape to the hand-written bracket represented by the trace data, and identifies the type of the bracket.

The editing section 42 sends the data indicative of the type of the bracket identified by the bracket identifying section 44 to the bracket generating section 43. The bracket generating section 43 determines the size of the bracket based on the coordinate data of the starting and ending points of the bracket through calculation to generate bracket data to be displayed. The generated bracket data is stored in a position corresponding to the bracket input position in the document data memory 60a.

The method for inputting an elongated bracket will be further detailed later.

Figure 8:
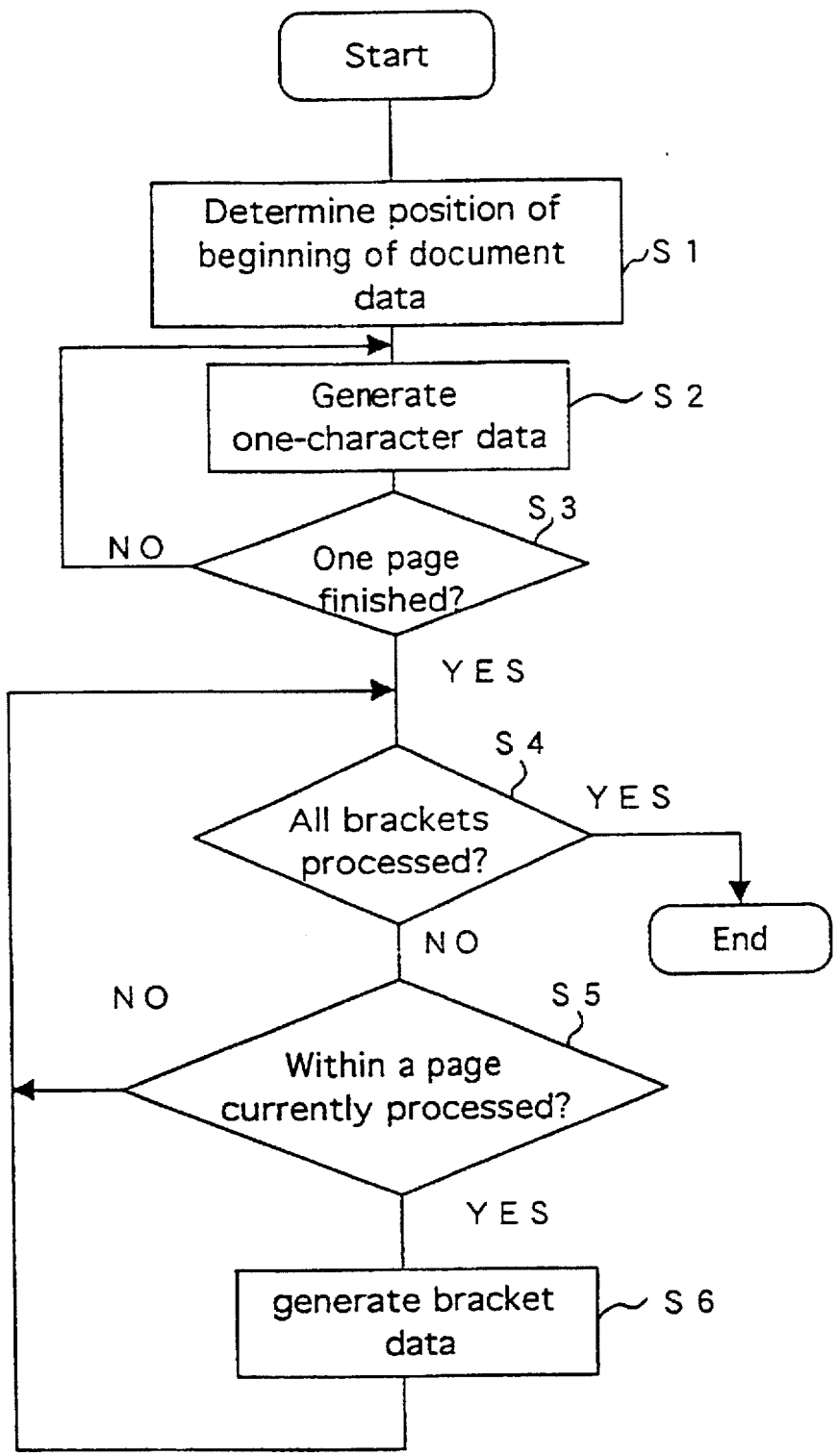
FIG. 8 is a flow chart of a process for displaying a generated elongated bracket.

FIG. 8 is a flow chart of a process for displaying the generated elongated bracket.

The editing section 42 generally reads out display data from the document data memory 60a and writes the data into the display buffer 60b every time the editing section 42 receives an instruction to move a display image or the like instruction issued in accordance with the operation of the pen 31, keyboard 32 or the like.

The display controlling section 39 generally displays the display data retained in the display buffer 60b in real time on the screen of the CRT 34.

With reference to FIG. 8, the process for displaying the elongated bracket will be described.

In step S1, the position where the beginning of a page to be displayed is located in the document data stored in the document data memory 60a is calculated and retained in the display buffer 60b.

In step S2, a character code of a character located in a current data position in the document data is read out and a character font corresponding to the character code is transferred from the CGROM 50c to the display buffer 60b for displaying the character, and then the data positions in the display buffer 60b and document data are respectively moved ahead by one character.

In step S3, it is checked if one-page display data has been generated in the display buffer 60b. If NO, the process returns to step S2. If YES, the process goes into step S4.

In step S4, it is checked if all brackets have been subjected to a display-data generating process. If YES, the process ends. If there is any bracket data that has not been subjected to the display-data generating process or has not been checked yet, the process goes into step S5.

In step S5, bracket data in the document data retained in the document data memory 60a are checked one by one to see if each of the bracket data exists within the page currently subjected to the display data generating process, based on the positional data of the starting and ending points of the bracket. If the currently checked bracket data is not within the page, the process returns to step S4. If the currently checked bracket data is within the page, the process goes into step S6.

In step S6, font data selected based on the size and type of the bracket currently processed is read out of the CGROM 50c, and retained in a data position in the display buffer 60b corresponding to the bracket display position for generating bit-mapped data. Then, the process returns to step S4.

If graphic data is also displayed at this time, the process does not end after step S4, but a step of transferring the graphic data to the display buffer 60b may be provided as a subsequent step. A process for generating one-page frame for printing operation is substantially the same as that for displaying operation, except that the one-page data is transferred to the printer controlling section 38 instead of generating one-page display data in the display buffer 60b.

Figure 9:
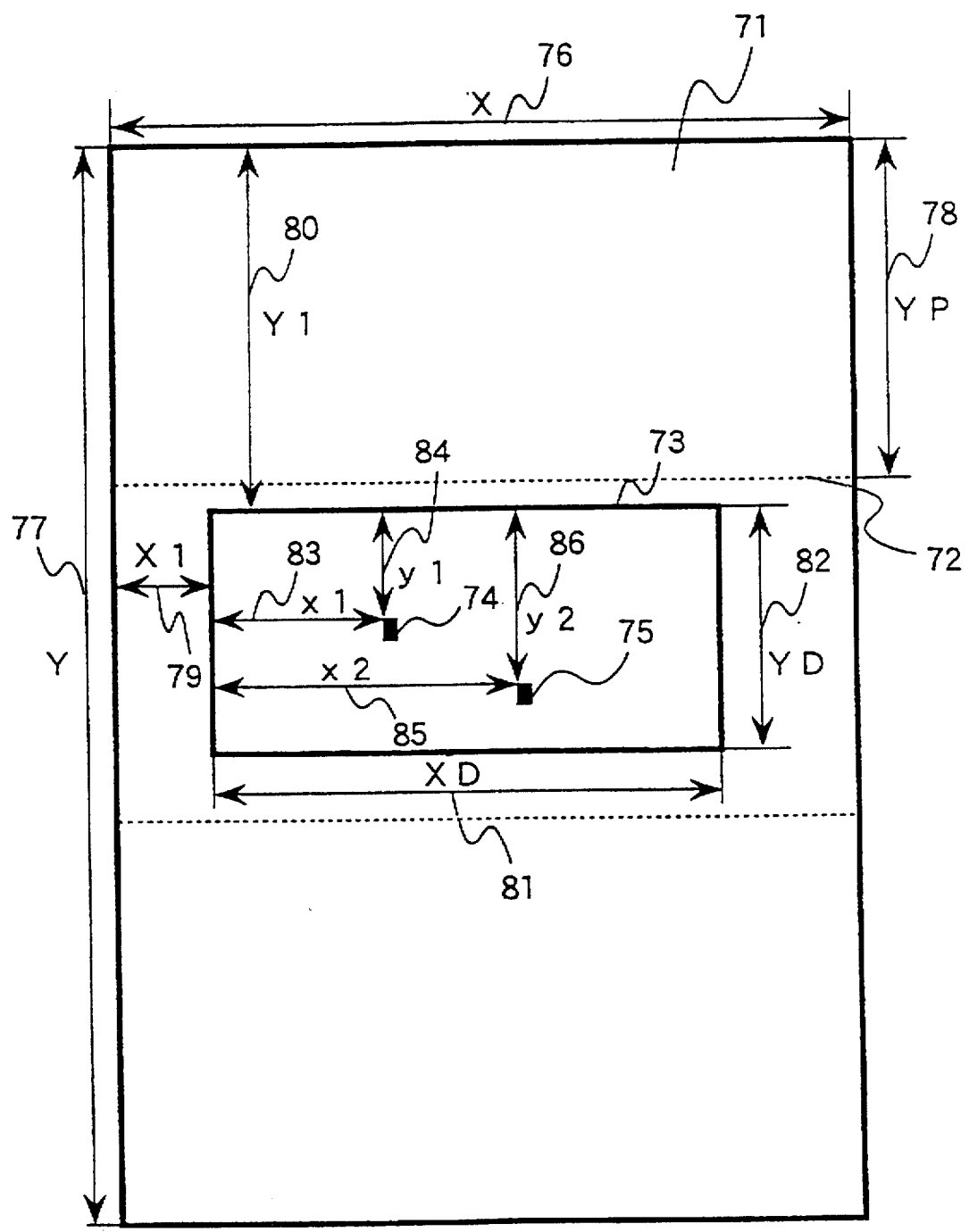
FIG. 9 is a diagram of a coordinate system for locating an elongated bracket in a document.

FIG. 9 is a diagram of a coordinate system for locating the starting and ending points of an elongated bracket in the document data in accordance with this embodiment.

In FIG. 9, there are shown: a layout 71 of document data (from the first page to the final page) stored in the document data memory 60a; a page margin 72; an edit region 73 bitmapped in the display buffer 60b and currently displayed on the screen of the CRT 34; a starting point 74 of an input bracket; an ending point 75 of the input bracket; the number 76 (X) of columns in the document; the number 77(Y) of lines in the document; the number 78 (YP) of lines in one page of the document; an abscissa 79 (X1) of a left upper point (edit origin) of the current edit region with respect to a left upper point (a document origin); an ordinate 80 (Y1) of the edit origin 80 with respect to the document origin; the number 81 (XD) of columns in the edit region 73; the number 82 (YD) of lines in the edit region 73; an abscissa 83 (x1) of the starting point 74 of the bracket with respect to the edit origin; an ordinate 84 (y1) of the starting point 74 of the bracket with respect to the edit origin; an abscissa 85 (x2) of the ending point 75 of the bracket with respect to the edit origin; and an ordinate 86 (y2) of the ending point 75 of the bracket with respect to the edit origin.

Figure 10:
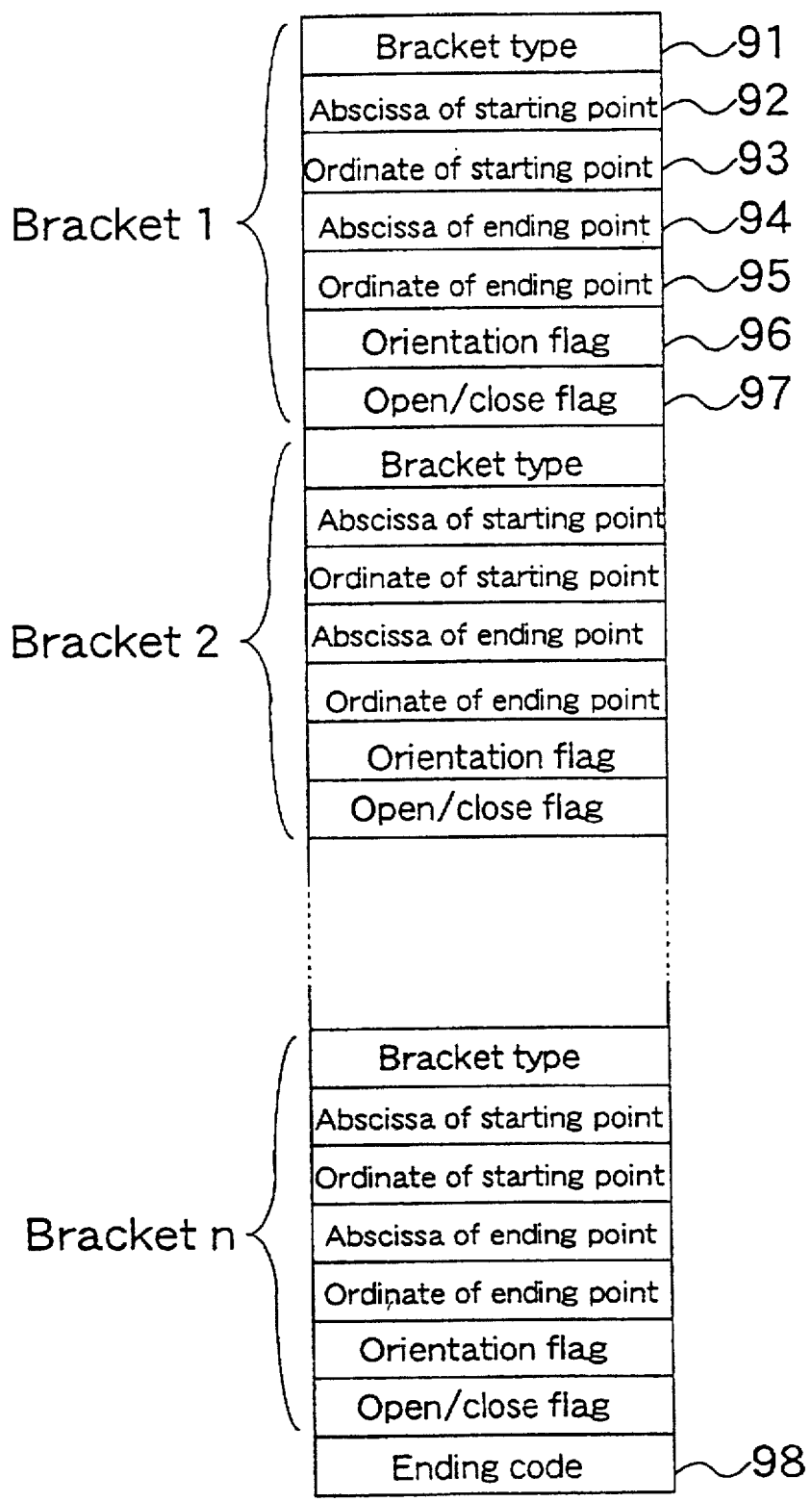
FIG. 10 is a diagram illustrating one example of the structure of input bracket data.

FIG. 10 is a diagram illustrating one example of the structure of bracket data stored in the bracket specification data memory 60c.

Input brackets each have seven data. All the input bracket data in the document are sequentially arranged, and an ending code 98 indicating that there is no more bracket data is added to the end of the last bracket data. These bracket data are stored in the RAM 60.

In FIG. 10, there are shown: a bracket type number 91 selected from those shown in FIG. 7; an abscissa 92 of the starting point of the bracket with respect to the document origin; an ordinate 93 of the starting point of the bracket with respect to the document origin; an abscissa 94 of the ending point of the bracket with respect to the document origin; an ordinate 95 of the ending point of the bracket with respect to the document origin; a bracket orientation flag 96 which is set to 1 if the bracket vertically extends across plural lines, and is set to 2 if the bracket laterally extends across plural columns; an open/close flag 97 which is set to 1 if the bracket is an open bracket, and is set to 2 if the bracket is a close bracket; and the ending code 98 indicating that there is no more bracket data.

With reference to a flow chart shown in FIG. 11, a process for inputting an elongated bracket will be described.

In step S7, previously selected bracket type number and bracket orientation (open bracket or close bracket) or default values are set as bracket data, and then the process goes into step S8.

In step S8, if an operator performs a process cancellation operation, the process ends, and if not, the process goes into step S9.

In step S9, the operator designates the position (x1, y1) of the starting point of a designated elongated bracket with respect to the edit origin by moving the cursor 101, for example, by means of the keyboard, and the designated starting-point position is taken into the bracket specification data memory 60c (at this time, the cursor 101 moves right by one column). Then, the process goes into step S10.

In step S10, a starting-point mark 102 is written in a display position in the display buffer 60b corresponding to the designated starting-point position (x1, y1), and displayed as shown in FIG. 5(b). Then, the process goes into step S11.

In step S11, the operator designates the position (x2, y2) of the ending point of the designated elongated bracket with respect to the edit origin by moving the cursor 101, for example, by means of the keyboard in the same manner as the aforesaid operation of designating the starting-point position, and the designated ending-point position is taken into the bracket specification data memory 60c. Then, the process goes into step S12.

In step S12, an ending-point mark 103 is written in a display position in the display buffer 60b corresponding to the designated ending-point position (x2, y2), and displayed as shown in FIG. 5(c). Then, the process goes into step S13.

In step S13, if $(x1-x2)^2 < (y1-y2)^2$, i.e., the starting point is vertically aligned with the ending point, the process goes into step S21. If not, the process goes into step S14. In step S14, it is judged if the input starting point and ending point are in a correct positional relationship. More specifically, if $(x1-x2)^2 = (y1-y2)^2$, i.e., the starting point is not vertically nor laterally aligned with the ending point, if (Y1+y1) <nYP<(Y1+y2) or (Y1+y1)>nYP>(Y1+y2) (n is a positive integer), i.e., the starting point and ending point are located in different pages, or if x1>X, x2>X, y1>Y or y2>Y, i.e., the starting point and/or ending point are located out of the layout area, then the positional relationship between the starting point and ending point is not correct and the process goes into step S19. If it is judged that the positional relationship is correct, the process goes into step S15.

In step S15, the size of the bracket is calculated based on a distance between the starting point and ending point. More specifically, if x1<x2, the bracket size is x2−x1, and if x1>x2, the bracket size is x1−x2. Then, the process goes into step S16.

In step S16, bit-mapped data of the laterally elongated bracket having the bracket size calculated in step S15 and the bracket type number currently designated is read out of the CGROM 50c, then written in a position between the starting point and ending point in the display buffer 60b, and displayed on the display screen. Then, the process goes into step S17.

In step S17, the system prompts the operator to check if the currently displayed bracket is OK. If the operator approves the bracket, the process goes into step S20. If not, the process goes into step S18.

In step S18, the system prompts the operator to input the bracket type and bracket orientation from the keyboard 32 or the like input device, and specifies a new bracket type number and open/close flag in accordance with the bracket data input by the operator. Then, the process returns to step S13.

In step S19, the buzzer controlling section 47 is controlled to sound the buzzer 46 and notify the operator that the input positions of the starting and ending points are inappropriate. Then, the starting-point mark and ending-point mark are deleted from the display buffer 60b and the process returns to step S7.

In step S20, the input bracket data including the bracket type number 91, the coordinates 92 and 93 (X1+x1, Y1+y1) of the starting point with respect to the document origin, the coordinates 94 and 95 (X1+x2, Y1+y2) of the ending point with respect to the document origin, the bracket orientation flag 96 and open/close flag 97 shown in FIG. 10 is added to the end of the document data stored in the document data memory 60a (if y1>y2 for a vertical bracket or if x1>x2 for a transverse bracket, the starting point is retained in an ending point data area, and the ending point is retained in a starting point data area). Then, the ending code 98 is added to the last bracket data. After the data retained in the display buffer 60b is once deleted, the display process shown in FIG. 8 is performed.

In step S21, the size of the bracket is calculated based on the distance between the starting point and ending point.

More specifically, if y1<y2, the bracket size is y2−y1, and if y1>y2, the bracket size is y1−y2. Then, the process goes into step S22.

In step S22, bit-mapped data of the vertically elongated bracket having the bracket size calculated in step S21 and the bracket type number currently designated is read out of the CGROM 50c, then written in a position between the starting point and ending point in the display buffer 60b, and displayed on the display screen. Then, the process goes into step S17.

The input process is performed in accordance with a procedure described in the control programs 50a by means of the CPU of the control section 41.

Figure 11:
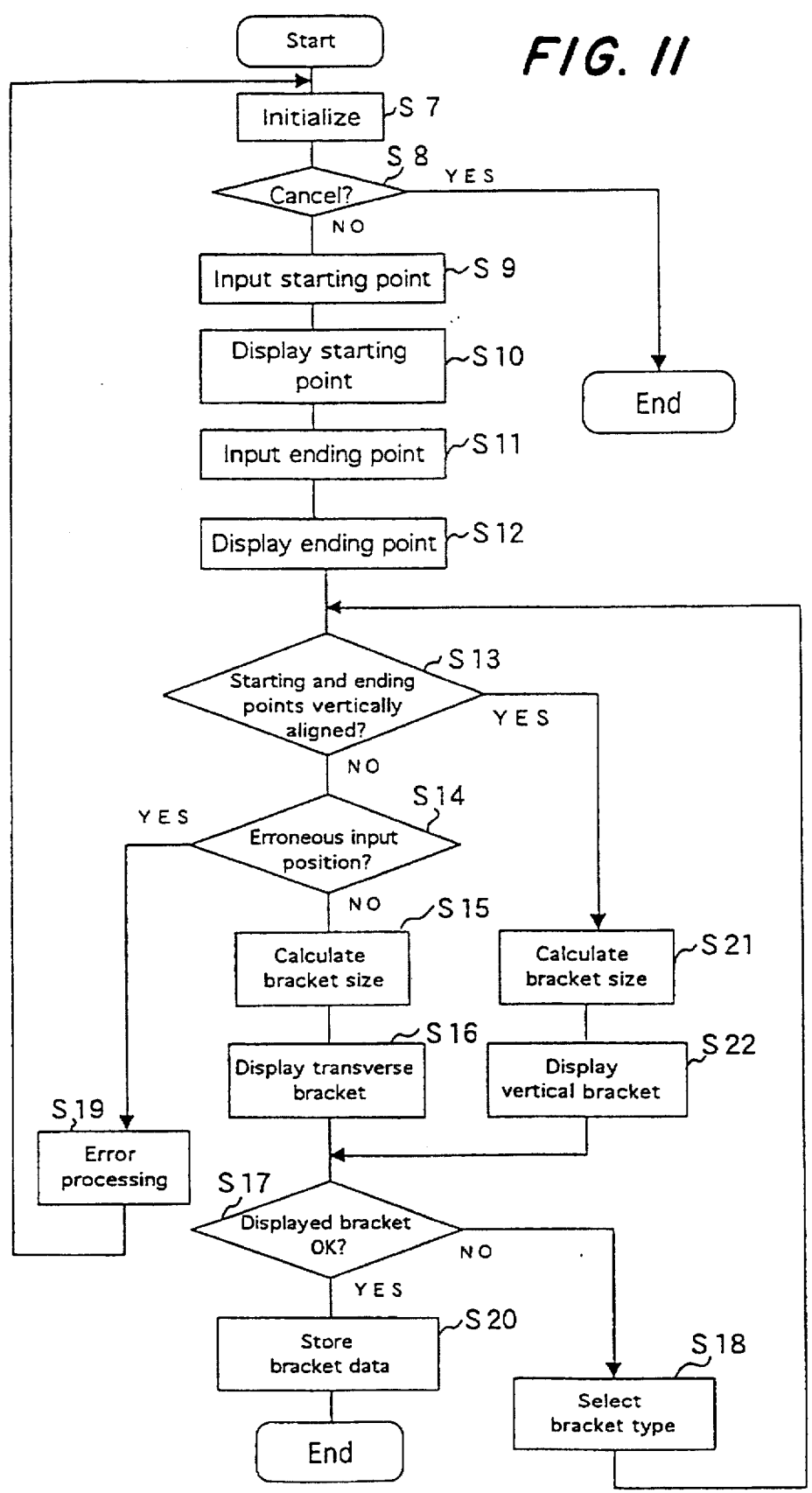
FIG. 11 is a flow chart of a process for inputting an elongated bracket.

If an elongated bracket is to be input by using the pen 31 as shown in FIG. 6, steps S9 to S12 of the input process shown in FIG. 11 are replaced with a process for identifying the bracket input by means of the pen 31.

More specifically, a position 112 where the pen 31 is first brought in contact with the screen is defined as the starting point of the bracket, and a position 114 where the pen 31 is moved away from the screen is defined as the ending point of the bracket. Then, the shape of the bracket handwritten with the pen 31 is identified, and the bracket data indicative of the type, orientation and position of the bracket determined after the identification process is written in the bracket specification data memory 60c. Thereafter, the process shown in FIG. 11 is performed. Thus, the process for inputting the elongated bracket by using the pen 31 is completed.

The positions of the starting and ending points may be designated on any unit basis, e.g., on the basis of character unit, full-line unit, half-line unit, full-column unit or half-column unit. The document data may include graphic data, ruled line data and image data in addition to characters and brackets.

As described above, an elongated bracket can be input by designating the positions of the starting and ending points of the bracket. Alternatively, the starting and ending points and trace of an elongated bracket of a desired shape can be input by hand-writing the bracket directly on the display screen on which a document is displayed. Therefore, an operator can easily input an elongated bracket in a desired position.

Next, a process for designating and changing the boldness and width of an elongated bracket will be described.

Figure 12:
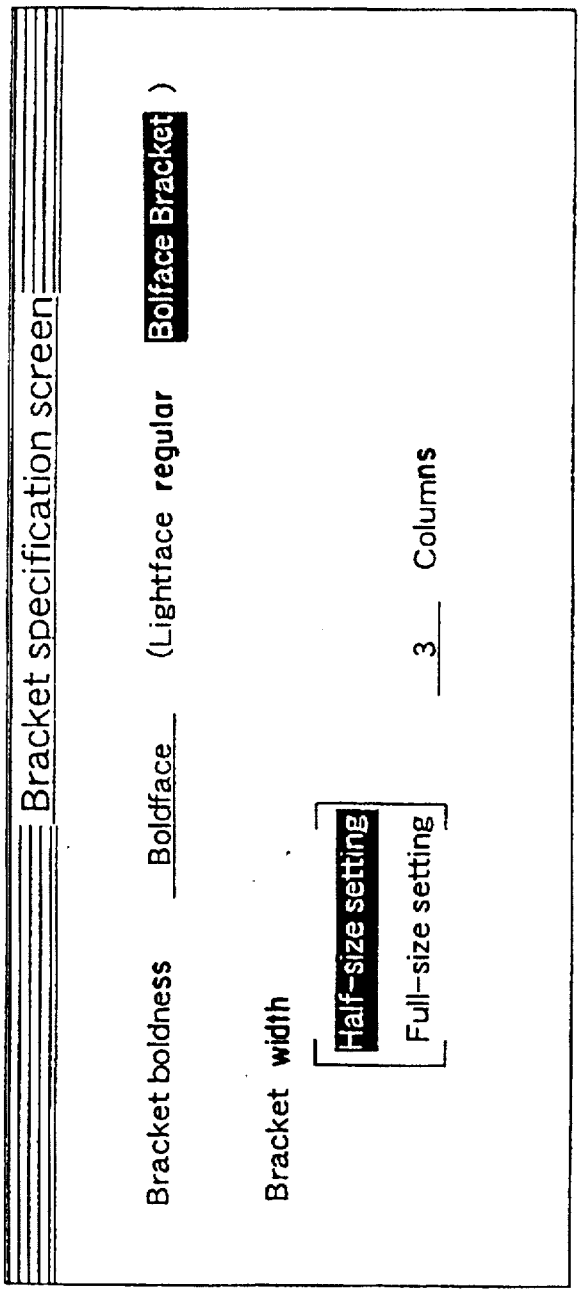
FIG. 12 is a diagram for explaining an exemplary bracket specification screen for specifying the conditions of a bracket.

FIG. 12 is a diagram for explaining an exemplary bracket specification screen.

The boldness of the bracket is selected from three items: "lightface", "regular" and "boldface".

The line width of each bracket is predetermined depending on its boldness. Bracket data stored in the bracket storage 4 include three boldness data for each bracket type.

Figure 13:
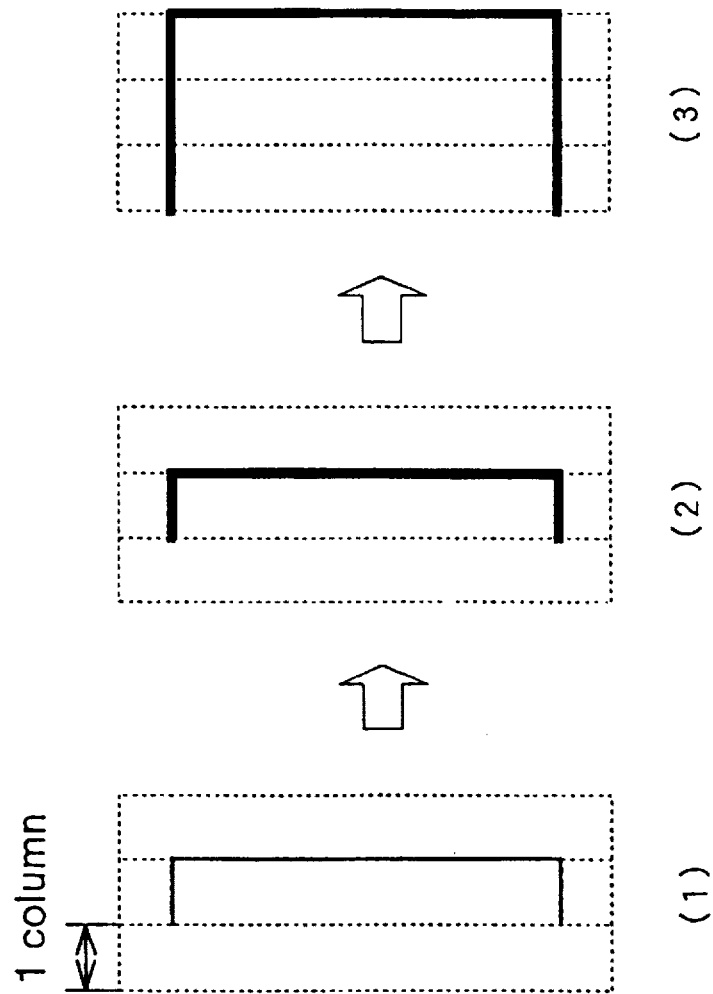
FIGS. 13(1) through (3) are diagrams for explaining an exemplary process for changing the boldness and width of a bracket.

FIG. 13(1) shows a case where the boldness of a bracket is set to "lightface". The width of the bracket is designated by the number of half-size columns or full-size columns. More specifically, if the width of the bracket is set to one fullsize column in the bracket specification screen shown in FIG. 12, a bracket having a width shown in FIG. 13(1) is displayed on the display screen.

FIG. 13(2) shows a case where the boldness of the bracket is changed to "boldface" after the bracket shown in FIG. 13(1) is displayed. FIG. 13(3) shows a case where the width of the bracket is changed to three full-size columns after the bracket shown in FIG. 13(2) is displayed.

The bracket data indicative of the boldness and width is stored in the bracket specification data memory 60c for each bracket.

Though not shown in FIG. 10, bracket boldness data (e.g., a value "1" indicative of "lightface") and bracket width data including width unit (e.g., a value "0" or "1" indicative of full-size column or half-size column) and the number of columns (e.g., a value "3") are included in the bracket data table 50b. After the designation by the operator, the bracket data is stored in a data-storing position for that bracket in the bracket specification data memory 60c.

Though the boldness and width of a bracket are changed by using the bracket specification screen in this embodiment, the boldness may be changed by pressing a special key such as a "conversion/next candidate item" key to circularly shift display items such that "lightface"→"regular"→"boldface".

The width of a bracket may be changed by designating the starting point and ending point of the bracket by means of the pen and moving the pen on the display screen as shown in FIG. 14. This method is more advantageous than the method of designating the width by inputting a value as shown in FIG. 12 in that the operator can visually specify the width of the bracket as desired.

This process will be further detailed below.

Figure 15:
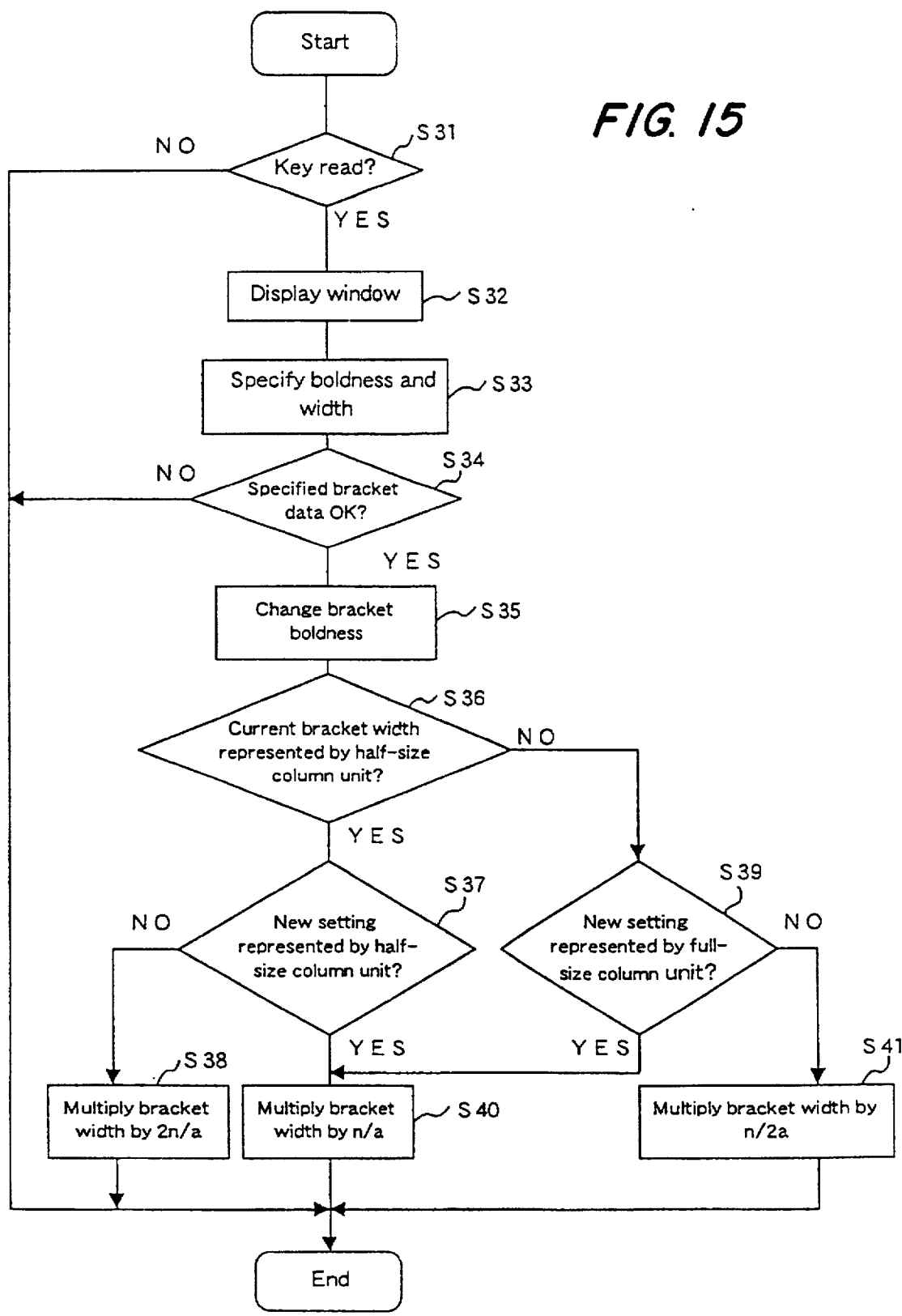
FIG. 15 is a flow chart of a process for specifying the boldness and width of a bracket.

FIG. 15 is a flow chart of a process for specifying the boldness and width of the bracket. This process is performed in accordance with the control programs 50a by the control section 41, preferably by the CPU.

Before this process is started, a bracket to be altered is designated by the cursor.

In step S31, it is checked if the special key is input to display the bracket specification screen shown in FIG. 12. If the input of the special key is detected, the process goes into step S32, and a window of the bracket specification screen shown in FIG. 12 is displayed on the screen of the CRT 34.

In step S33, the boldness and width of the bracket are specified in the window of the bracket specification screen shown in FIG. 12. The data thus specified are once stored in a predetermined storage area of the set data memory 60d, not in the bracket specification data memory 60c.

In step S34, it is checked if the specified data is confirmed by the operator, e.g., it is checked if an "enter" key is pressed. If the "enter" key is pressed, the process goes into step S35, and the boldness of the bracket is changed to the specified boldness. More specifically, the boldness is changed by rewriting the value of the boldness data of the designated bracket stored in the bracket specification data memory 60c.

The width of the bracket is changed in steps S36 to S41. In step S36, it is checked if the current setting of the bracket width is represented by "half-size" column unit. More specifically, the control section 41 judges if the value of the "full-size/half-size" setting for the width of the designated bracket stored in the bracket specification data memory 60c is set to "half-size".

If the value is set to "half-size", the process goes into step S37, and it is further checked if the width stored in the set data memory 60d is represented by "half-size" column unit.

If the width is represented by "full-size" column unit, the process goes into step 38. Then, the width of the bracket is increased or reduced to the newly specified width, and the width is doubled to be converted from the "half-size" setting to the "full-size" setting. More specifically, assuming that the column number of the current width is "a" and the column number of the newly specified width is "n", the current bracket width is multiplied by 2n/a to be converted from the "half-size" setting to "full-size" setting.

If it is judged in step S36 that the bracket width is currently represented by "full-size" column unit, the process goes into step S39, and then it is further checked if the newly specified bracket width is represented by "full-size" column unit. If it is judged in step S39 that the newly specified bracket width is represented by "full-size" column unit, or if it is judged in step S37 that the newly specified bracket width is represented by "half-size" column unit, i.e., if the bracket width data is to be converted from the "full-size" setting to the "full-size" setting or from the "halfsize" setting to the "half-size" setting, the process goes into step S40, and the current bracket width is multiplied by n/a.

If it is judged in step S39 that the newly specified bracket width is represented by "half-size" column unit, the process goes into step S41, and the bracket width is multiplied by n/2a to be converted from the "full-size" setting to the "half-size" setting.

In steps S38, S40 and S41, the bracket width data stored in the bracket specification data memory 60c is rewritten to the newly specified value.

By thus changing the boldness and width of an elongated bracket, the appearance of the bracket can easily be changed in accordance with the layout of a document after generation of the bracket, and hence the impression of the elongated bracket can be improved.

Next, there will be described a process for generating a close bracket by an easy operation after an open bracket is generated.

Figure 16:
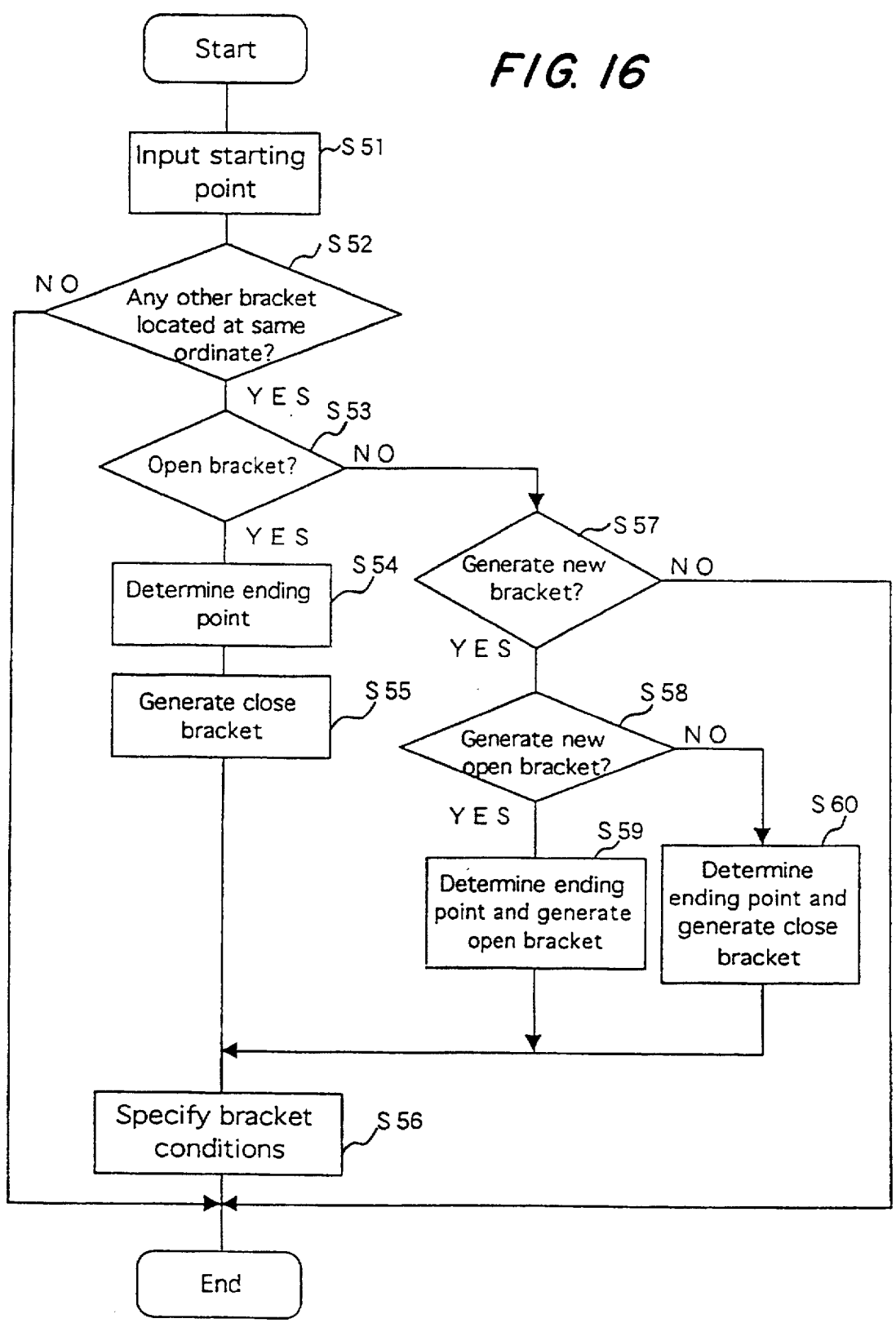
FIG. 16 is a flow chart of a process for generating a close bracket.

FIG. 16 is a flow chart of the process for generating a close bracket.

In step S51, an operator inputs the starting point of the close bracket by means of the keyboard 32 or pen 31, and the coordinate data of the starting point is stored in the bracket specification data memory 60c.

In step S52, the bracket data stored in the bracket specification data memory 60c is checked to see if them exists any other bracket that has a starting point located at the same ordinate as that of the input close bracket.

If there exists no bracket that fits this condition, the process ends. If there exists a bracket that fits this condition, the process goes into step S53, and it is checked if the bracket is an open bracket. If the bracket is a close bracket, it is judged in step S57 if a new bracket having the same specification as that of the existing close bracket is to be generated. If the new bracket having the same specification is to be generated, it is judged in step S58 if a new open bracket is to be generated.

When a new open bracket is generated in step S59, the position of the ending point of the new open bracket is determined so that the ending point of the new open bracket is located at the same ordinate as that of the existing bracket or aligned with the ending point of the existing bracket detected in step S53. Similarly, when a new close bracket is generated in step S60, the position of the ending point of the new close bracket is determined so that the ending point is aligned with ending point of the existing bracket detected in step S53.

If it is judged in step S53 that there exists an open bracket, the process goes into step S54, and the position of the ending point of a new close bracket is determined.

The position of the ending point of the close bracket is determined based on the abscissa of the starting point thereof input in step S51 and the ordinate of the open bracket detected in step S53.

In step S55, data of the close bracket is generated and stored in the bracket specification data memory 60c. More, specifically, bracket data including coordinates of the starting and ending points, and the type, boldness, width of the close bracket and the like are stored in the bracket specification data memory 60c.

Finally, conditions for displaying the close bracket are specified in step S56, and the process ends.

FIG. 17 is a diagram for explaining a more specific example of a process for generating a close bracket.

FIG. 17(a) shows a state in which the starting point of the close bracket to be positioned parallel to an existing open bracket is designated.

FIG. 17(b) shows a state in which the close bracket is generated and displayed based on the starting point of the close bracket input as shown in FIG. 17(a) in accordance with the process shown in FIG. 16.

In accordance with the aforesaid process for inputting a close bracket, the close bracket can be generated only by specifying the starting point of the close bracket in case that an open bracket has already been input. Therefore, the operation of inputting a close bracket can be facilitated.

Next, a function of moving the middle projection of an elongated bracket of type No. 4 or No. 5 shown in FIG. 7 will be described with reference to FIG. 19.

Figure 19:
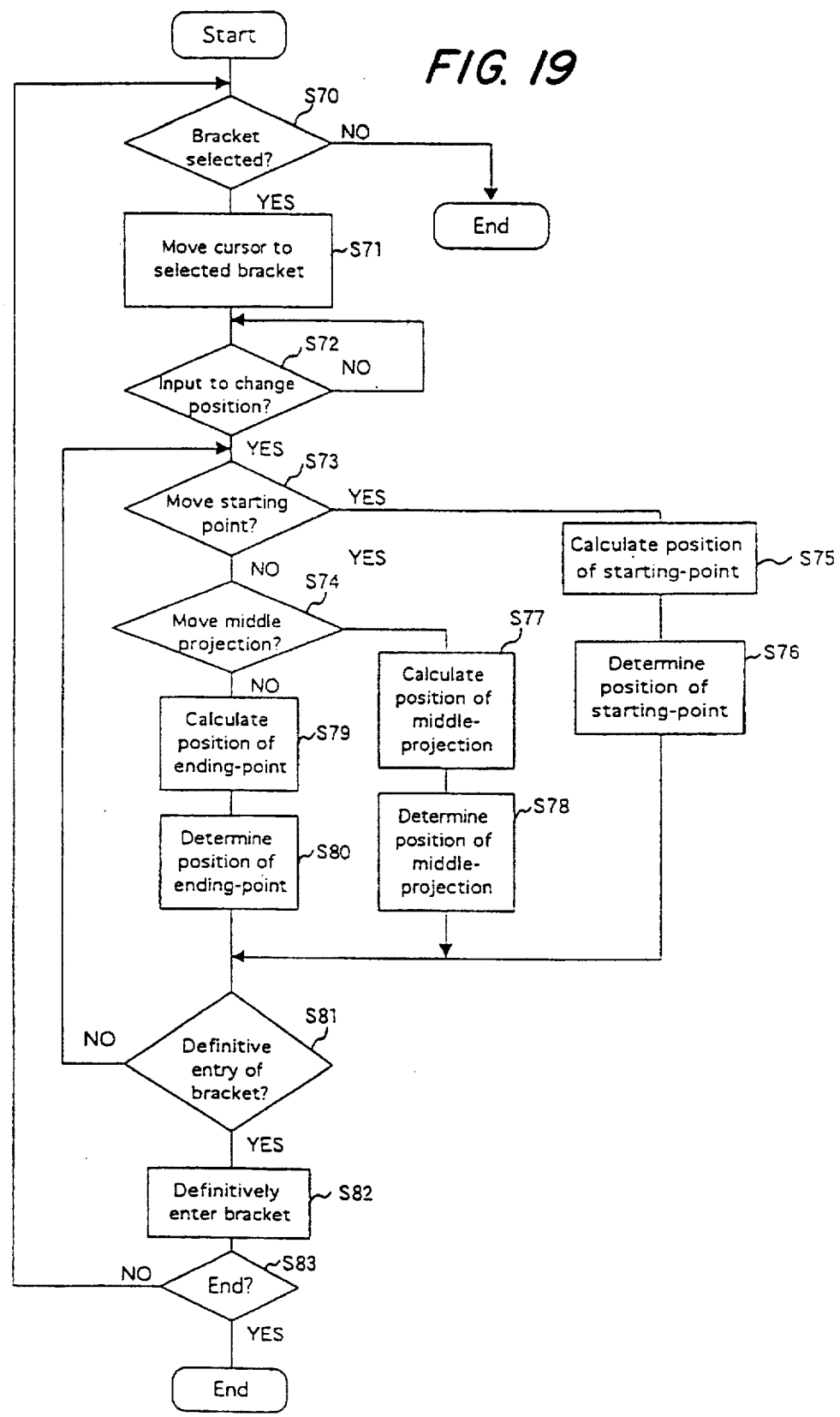
FIG. 19 is a flow chart of a process for moving starting point, middle projection and ending point of an elongated bracket.

FIG. 19 is a flow chart of a process for moving starting point, middle projection and ending point of an elongated bracket.

It is herein assumed that the elongated bracket has already been input and displayed on the screen of CRT 34 in accordance with the process shown in FIG. 11.

Figure 20:
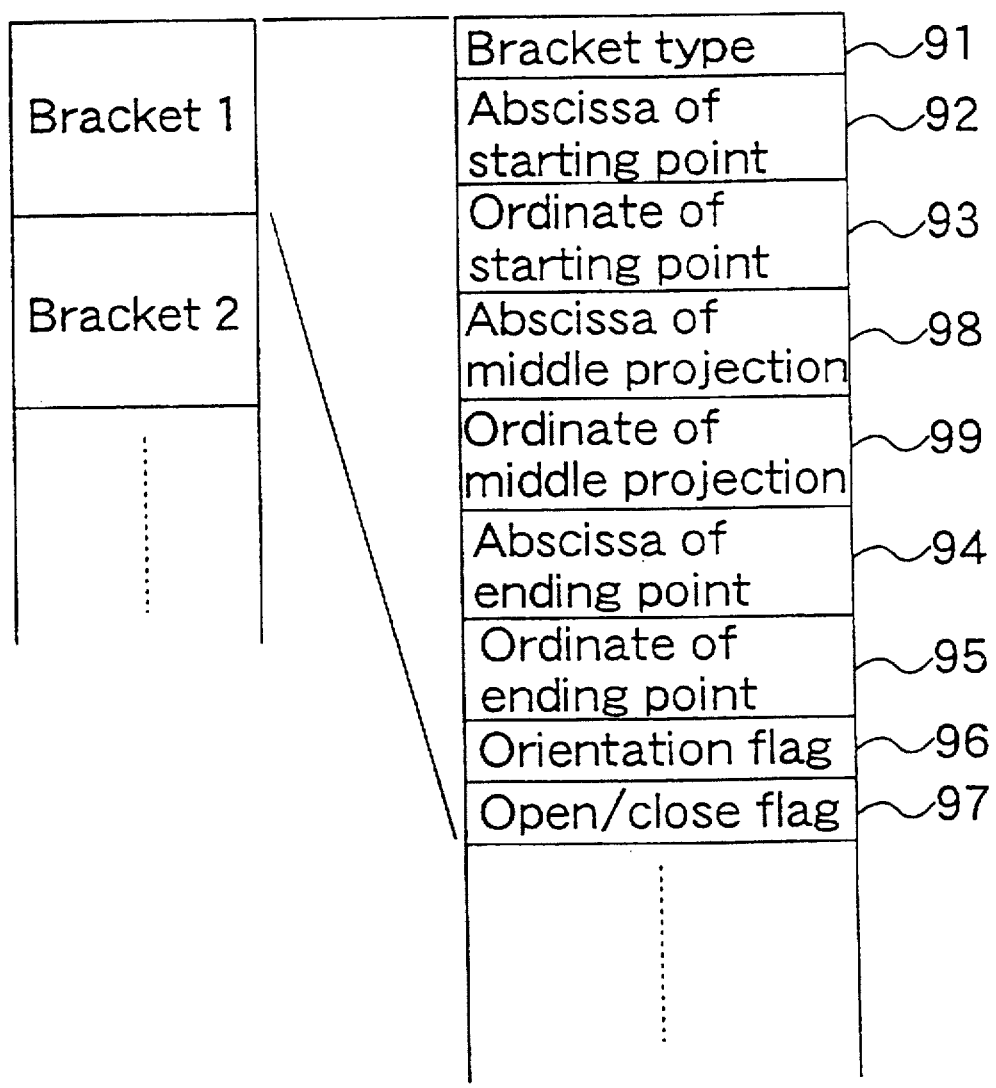
FIG. 20 is a diagram illustrating another example of the structure of elongated bracket data.

To move the middle projection of the elongated bracket, the data indicative of the initial position of the middle projection is required. As shown in FIG. 20, the abscissa and ordinate of the middle projection are stored in the aforesaid bracket specification data memory 60c. For example, the abscissa of the middle projection of the vertically elongated bracket of type No. 4 (see FIG. 7) is the same as that of the starting and ending points, and the ordinate thereof is the same as that of the middle point between the starting and ending points.

When an elongated bracket is generated in accordance with the process shown in FIG. 11, coordinates of the middle projection thereof is determined by the coordinates of the starting point and ending point of the bracket as described above. Alternatively, an operator may designate the position of the middle projection of an elongated bracket by using the pen or keyboard, when generating the bracket. In this case, the operator can locate the middle projection of the elongated bracket in a desired position.

In step S70, it is checked if the operator inputs to select an elongated bracket to change the middle projection thereof.

If the elongated bracket is selected by means of the pen 31 or keyboard 32, the process goes into step S71, and then the cursor is moved to the selected elongated bracket. Where the operator selects the elongated bracket by pointing at the middle projection thereof, the cursor is preferably located in the position of the middle projection on the display screen. Similarly, where the operator points at the starting point or ending point thereof, the cursor is preferably located in the position of the starting point or ending point on the display screen.

Where the operator designates a position other than the starting point, middle projection and ending point, the cursor is located in any one of these points that is closest to the designated position. The operator can change the position later.

In step S72, it is checked if the operator inputs to change the position of the middle projection, i.e., the operator inputs a position to which the middle projection is to be moved by means of the pen or keyboard. If the operator inputs the position, the process goes into the step S73. At this time, the coordinate data indicative of the position is stored in the RAM 60.

In steps S73 and S74 shown in the flow chart in FIG. 19, it is judged which position among the middle projection, starting point and ending point of the elongated bracket the operator designates. It is herein assumed that the middle projection is to be moved, and the process goes into step S77 from step S74.

In step S77, the coordinates of the middle projection of the elongated bracket are calculated based on the coordinate data stored in the RAM 60 and indicative of the position to which the middle projection is to be moved, and the position of the middle projection is determined. Then, the shape of a bracket to be newly generated is calculated, and the generated bracket having a middle projection in a newly designated position is displayed on the screen of the CRT.

If the middle projection moved to the designated position is not located on a line defined between the starting point and ending point of the bracket, the coordinate data of the middle projection is corrected so that the middle projection is aligned with the starting point and ending point. This prevents the deformation of the initially input bracket which may be caused by locating the middle projection thereof exactly in the designated position.

In step S81, it is checked if the operator inputs for definitive entry of the displayed bracket. If YES, the process goes into step S82, and the newly generated bracket is entered.

That is, the bracket data is updated as indicating that the middle projection is moved to the desired position. More specifically, coordinate data indicative of the position of the middle projection as shown in FIG. 20 is updated.

Figure 21:
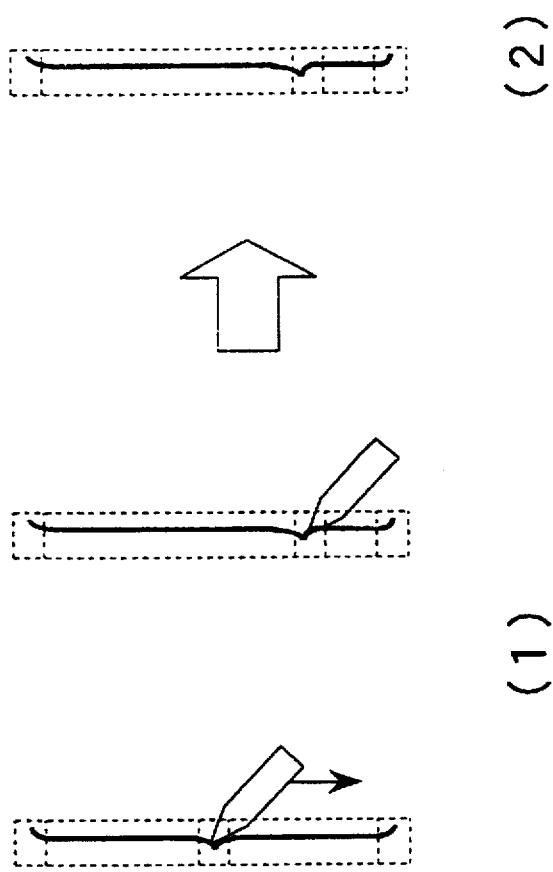
FIGS. 21(1) through (2) are diagrams for explaining a function of moving the middle projection of an elongated bracket.

FIG. 21 is a diagram for explaining the aforesaid function of moving the middle projection of an elongated bracket to a desired position.

A left-hand diagram of FIG. 21(1) shows a state where the middle projection located at a middle point between the starting point and ending point of the bracket is pointed at with the pen.

A right-hand diagram of FIG. 21(2) shows a state where the position to which the middle projection is to be moved is pointed at with the pen.

FIG. 21(2) shows a state where the bracket is definitively entered after the middle projection thereof is moved.

As previously mentioned, even if the designated position of the middle projection is somewhat offset to the right or left in the right-hand diagram of FIG. 21(1), the abscissa of the middle projection is corrected so as to be aligned with the starting point and ending point. Thus, deformation of the bracket can be prevented.

Similarly, the position of the starting point or ending point of the bracket can be changed.

In this case, it is detected in step S72 of the flow chart shown in FIG. 19 that the starting point or ending point to be moved is selected.

When the starting point of the bracket is selected, the process goes into step S75 from step S73. In step S75, a new position of the starting point is calculated so that the starting point is moved to a position designated in step S71. In step S76, the position of the starting point is definitively entered, and the modified bracket is displayed on the screen of the CRT.

When the ending point of the bracket is selected, the process goes into step S79 from step S74. In step S79, a new position of the ending point is calculated. In step S80, the position of the ending point is definitively entered, and then the modified bracket is displayed on the screen of the CRT.

Figure 22:
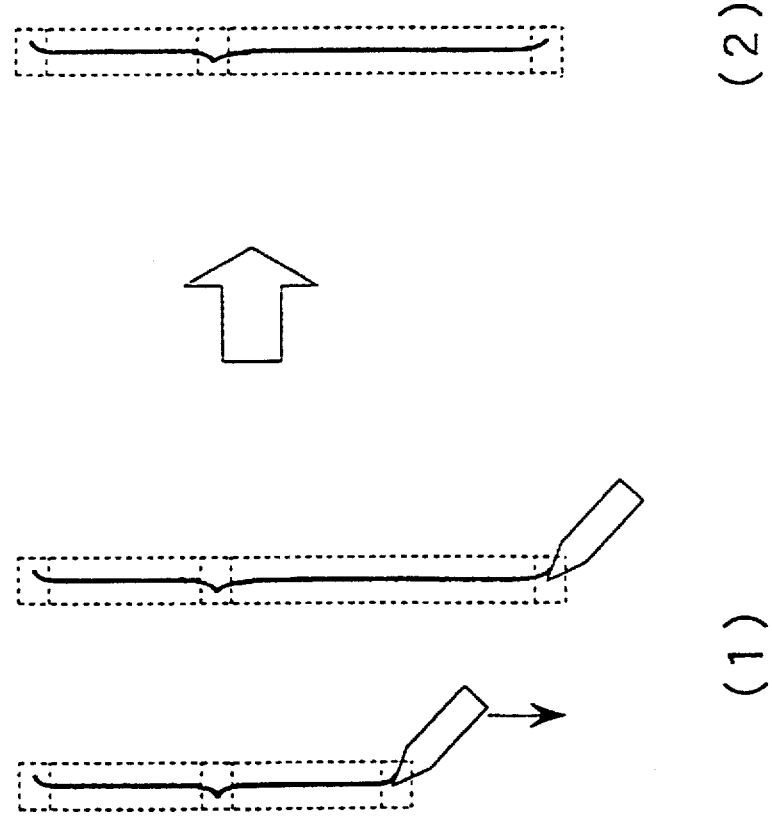
FIGS. 22(1) through (2) are diagrams for explaining a function of moving the ending point of an elongated bracket.
Figure 23:
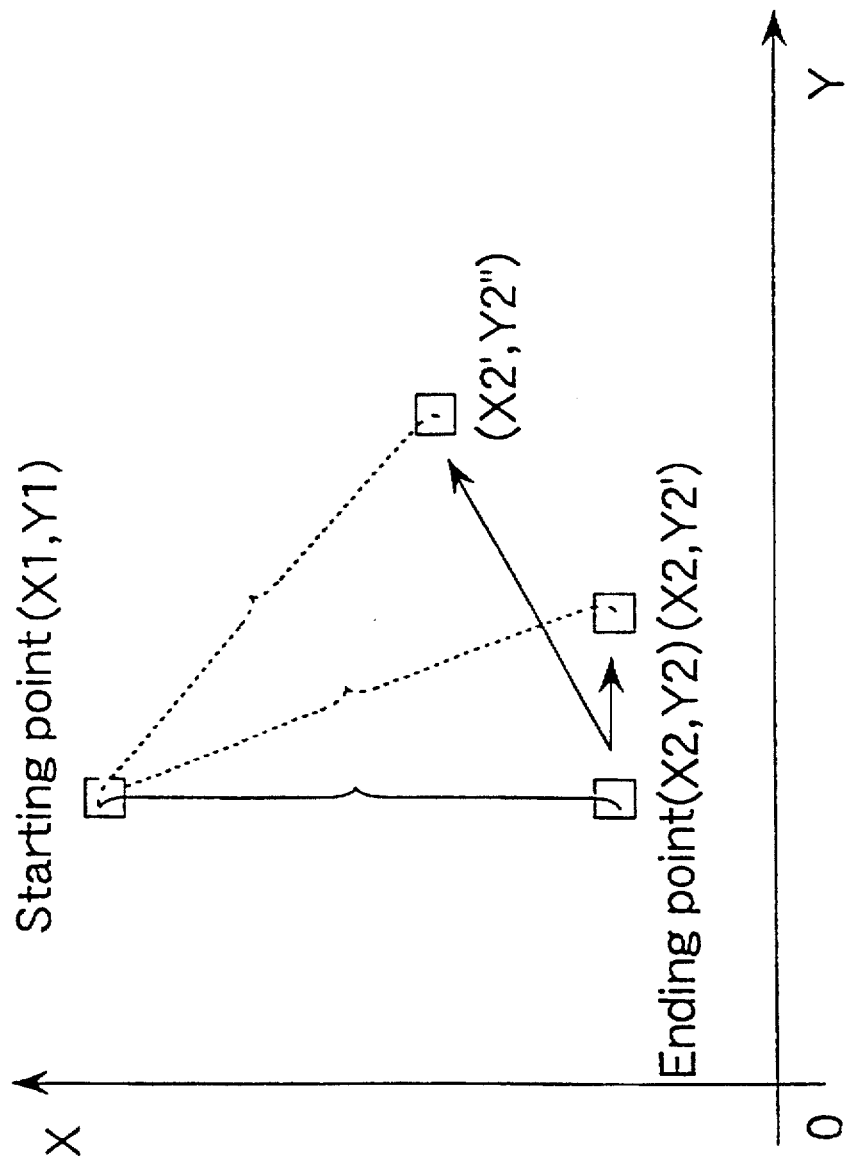
FIG. 23 is a diagram for explaining a function of moving the ending point of an elongated bracket.

FIGS. 22 and 23 are diagrams for explaining an exemplary case where the ending point of an elongated bracket is moved. A left-hand diagram of FIG. 22(1) shows a state where the ending point of the elongated bracket is pointed at with the pen, and a right-hand diagram of FIG. 22(2) shows a state where the ending point of the bracket is moved vertically down to a position pointed at with the pen.

FIG. 22(2) shows a state where the bracket is definitively entered after the ending point thereof is moved. In FIG. 23, there are shown two cases: where the ending point is slid laterally to a new position indicated by coordinates (X2, Y2') with respect to an initial position indicated by coordinates (X2, Y2) on the screen of the CRT; and where the ending point is moved to another new position indicated by coordinates (X2', Y2") on the screen of the CRT.

That is, an inclined elongated bracket can be generated by moving the starting point or ending point. This function allows an elongated bracket once input to be easily modified later. Further, the impression of a document can be improved by altering the appearance of bracket.

The function of moving the starting point, middle projection and ending point of an elongated bracket can be applied to operations of moving, copying and deleting an elongated bracket.

Figure 24:
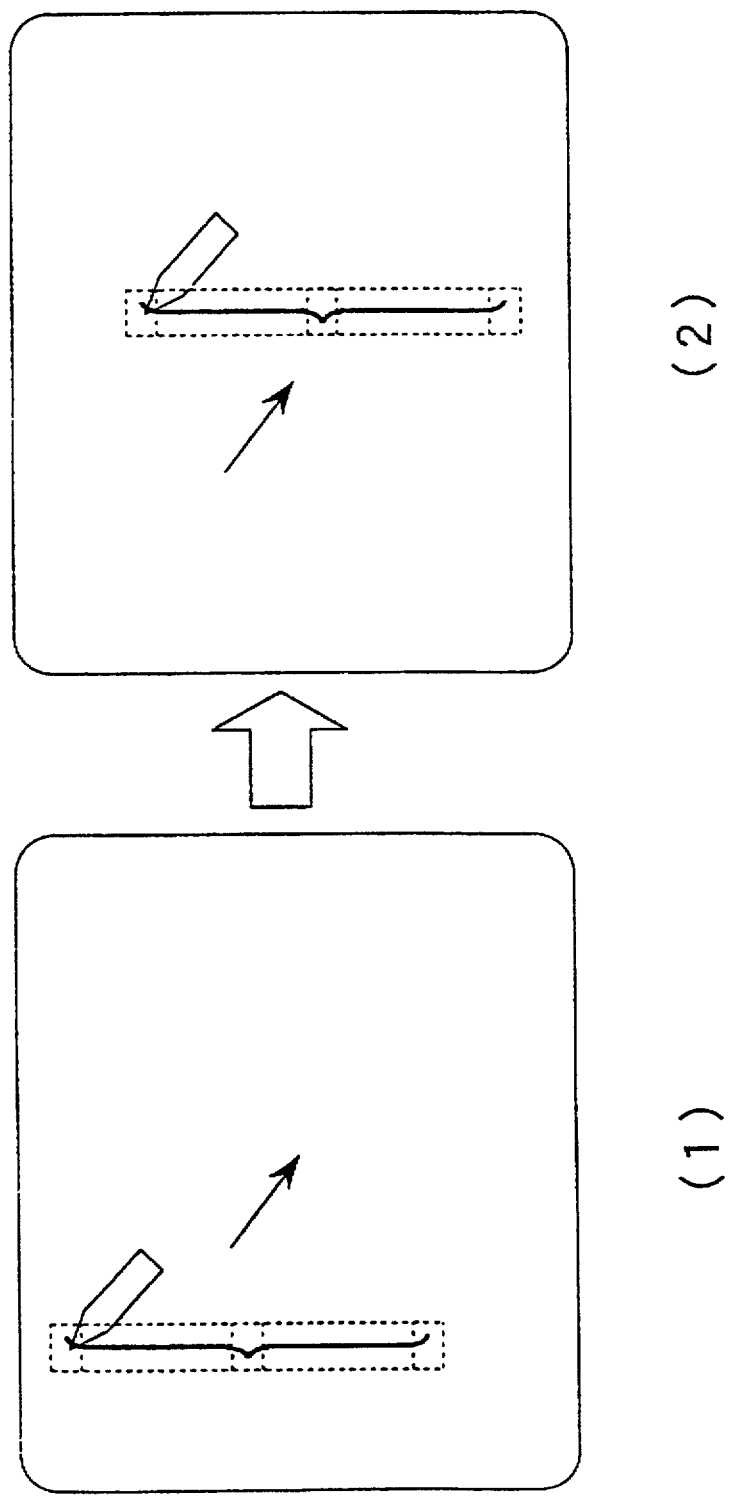
FIGS. 24(1) through (2) are diagrams for explaining a function of moving an entire elongated bracket.

For example, in an operation of moving an elongated bracket as shown in FIG. 24, the elongated bracket to be moved is first designated by means of the pen or keyboard, and coordinate data of the starting point, middle projection and ending point thereof are stored in the RAM. Thereafter, when a position to which the bracket is to be moved is designated, the coordinate data of the respective points are replaced with those after the movement of the bracket.

As described above, since the positions of the starting point, middle projection and ending point of the elongated bracket can be changed, the position, length and orientation of the elongated bracket once generated can easily be changed.

The process shown in FIG. 11 is applied to a bracket elongated either vertically or transversely, but not limited thereto. This process may also be applicable to an inclined bracket as shown in FIG. 25.

In accordance with the elongated-bracket generating process shown in FIG. 11, the coordinates of an elongated bracket are calculated so that the bracket forcibly extends either vertically or transversely, based on the positions of the starting and ending points input by an operator. Alternatively, an inclined elongated bracket can be generated by adopting the exact positions of the starting and ending points designated by the operator.

If the starting point and ending point of a bracket is to be input by using the pen, it is difficult to exactly align the starting point and ending point of the bracket vertically or laterally. Therefore, the system is preferably adapted to employ an ordinary bracket generating process as shown in FIG. 11 if a bracket extending vertically or laterally is to be generated, and to accept an input prior to entry of an inclined- bracket generating mode if an inclined bracket is to be generated.

Next, there will be explained a function of rotating an existing elongated bracket in accordance with the present invention.

Figure 26:
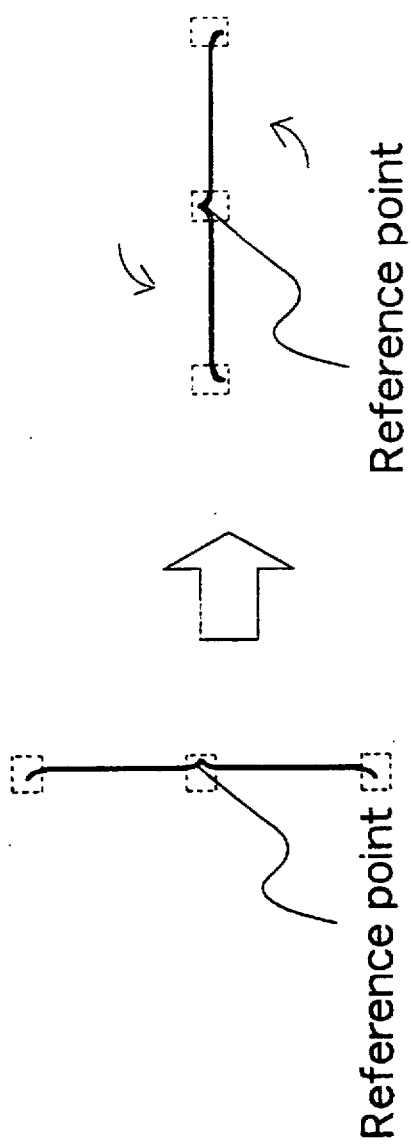
FIG. 26 is a diagram for explaining a function of rotating an elongated bracket.
Figure 27:
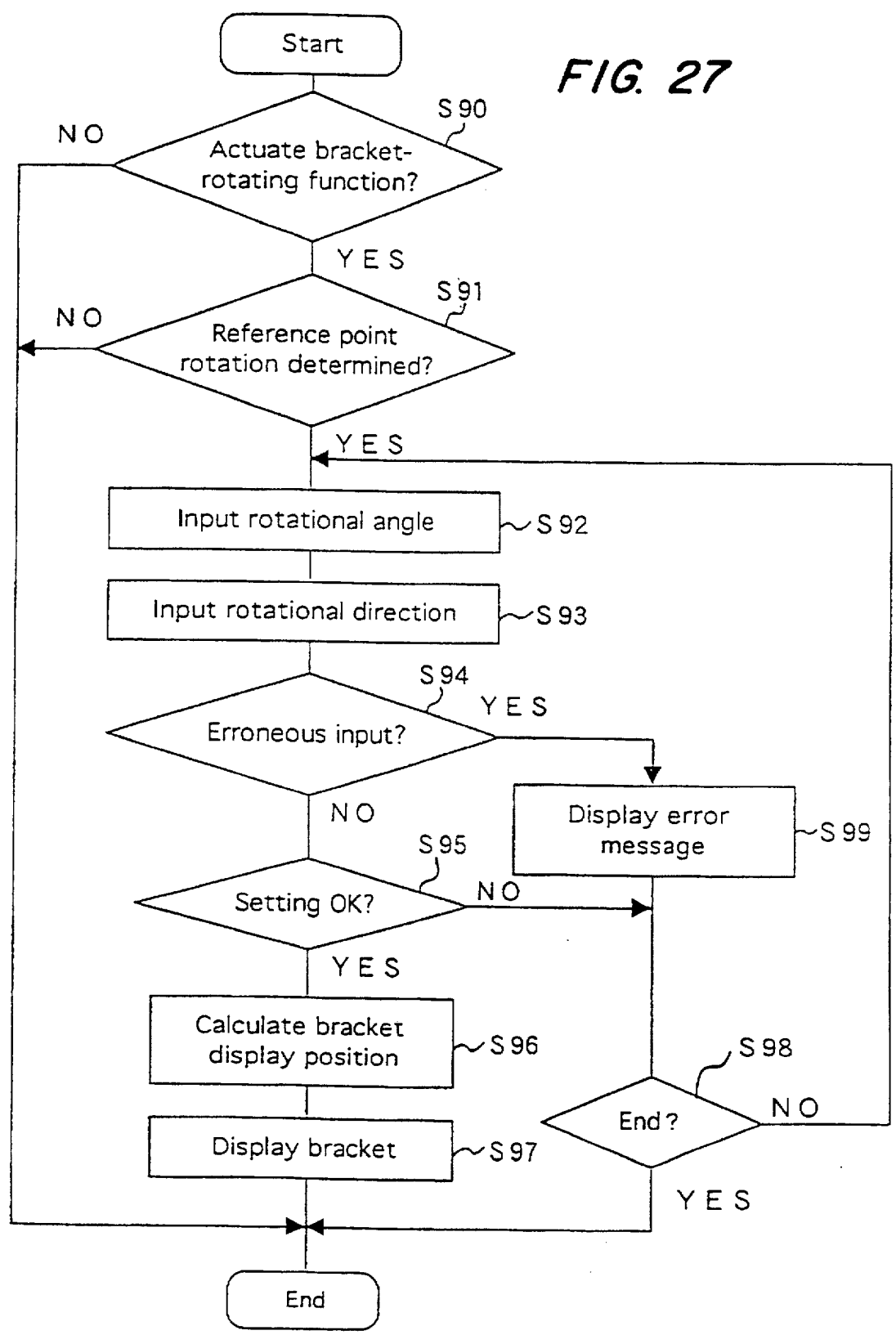
FIG. 27 is a flow chart of a process for rotating an elongated bracket.

As shown in FIG. 26, this function allows an existing elongated bracket to be rotated around a middle point of the bracket or any given point. The center of rotation of the bracket will hereinafter be referred to as "reference point". FIG. 27 is a flow chart of an exemplary process for rotating an elongated bracket.

In step S90, it is checked if an operator inputs for actuation of the bracket-rotating function. If YES, the process goes into step S91. In step S91, it is checked if the operator inputs for designation of the reference point or the rotation center of an elongated bracket to be rotated.

The reference point may be input by means of the pen or by moving the cursor by means of the keyboard.

The reference point is not limited to the middle point of the bracket, but includes any points designated by the operator. However, it is difficult to exactly point at the middle point of the bracket as the reference point by means of the pen. Therefore, the system is preferably adapted to forcibly designate the middle point as the reference point only by pointing at any point on the bracket, when it is desired to rotate the bracket around the middle point.

In step S92, an input rotational angle is stored in the RAM. In step S93, an input rotational direction is stored in the RAM.

If it is judged in step S94 that the input rotational angle or direction is incorrect, an error message is displayed in step S99.

If the input rotational angle and direction are correct, it is judged in step S95 if the operator inputs for confirmation that the input setting is correct. If the operator inputs for confirmation, the process goes into step S96, and a position in which the bracket is to be displayed after rotation is calculated. More specifically, the coordinates of the starting point, middle projection and ending point shown in FIG. 20 are obtained by way of coordinate conversion or the like.

In step S97, the bracket after rotation is displayed in a position thus calculated.

The function of rotating an elongated bracket in accordance with the present invention makes it possible to easily generate a highly impressive elongated bracket, thereby improving the impression of a document.

Next, there will be described an edit function such as a function of moving, copying or deleting any one of elongated brackets overlapping each other.

Even if elongated brackets displayed on the screen of the CRT overlap each other as shown in FIG. 28, this function allows these brackets to be separately modified.

In FIG. 28, there are shown two elongated brackets A and B overlapping each other, and a bracket A is selected to be moved. When an operator designates an overlap point, i.e., the ending point of the bracket A and the starting point of the bracket B shown in FIG. 28, it is impossible to judge which bracket is designated, A or B. Therefore, an order in which these brackets were generated is stored, and these brackets are selected in that order when the overlap point is designated.

More specifically, a bracket generated first is selected first. If this bracket is not a target bracket to be moved, a special key is input to select a bracket generated next. This operation is repeated until the target bracket is selected.

Preferably, the selected bracket is distinguished from the other brackets by blinking the entire bracket.

Even if elongated brackets overlap each other, these brackets can individually be selected to be moved, copied, rotated or deleted by utilizing this edit function.

For each of the overlapping brackets, bracket data as shown in FIG. 20 is generated. Other than the bracket data shown in FIG. 20, numeral data indicative of the bracket generation order is required to be stored for the aforesaid edit function for each of the overlapping brackets.

This function makes it possible to individually handle brackets overlapping each other, thereby facilitating the modification of elongated brackets when a document is edited.

Next, there will be described a document processing system that facilitates an input position designating operation for a symbol, especially for an elongated bracket, and the like operation in accordance with the present invention.

FIG. 29 is a block diagram illustrating the fundamental structure of the document processing system. Exemplary pointing devices to be used as an inputter 201, input position specifier 203, candidate length selector 209 include a keyboard, and pointing devices such as a pen, mouse and track ball.

Preferable as a document storage 202 is an RAM. Alternatively, external storages such as a hard disk and flexible disk may be employed.

Used as an outputter 205 are display devices such as a CRT display and liquid crystal display, and printing device such as a printer.

Preferably used as an editor 206, symbol input position determiner 204, symbol characteristic point determiner 210, symbol length determiner 207 and candidate length determiner 208 is a so-called microprocessor including a CPU, RAM, ROM, I/O interface, timer and the like. In the document processing system, the operations of these means are controlled by software stored in the ROM.

With reference to FIGS. 30 to 47, a method of inputting a 0 bracket extending across plural lines will hereinafter be described. A bracket extending across plural columns and other symbols extending across plural lines or columns can be input in substantially the same manner.

Figure 30:
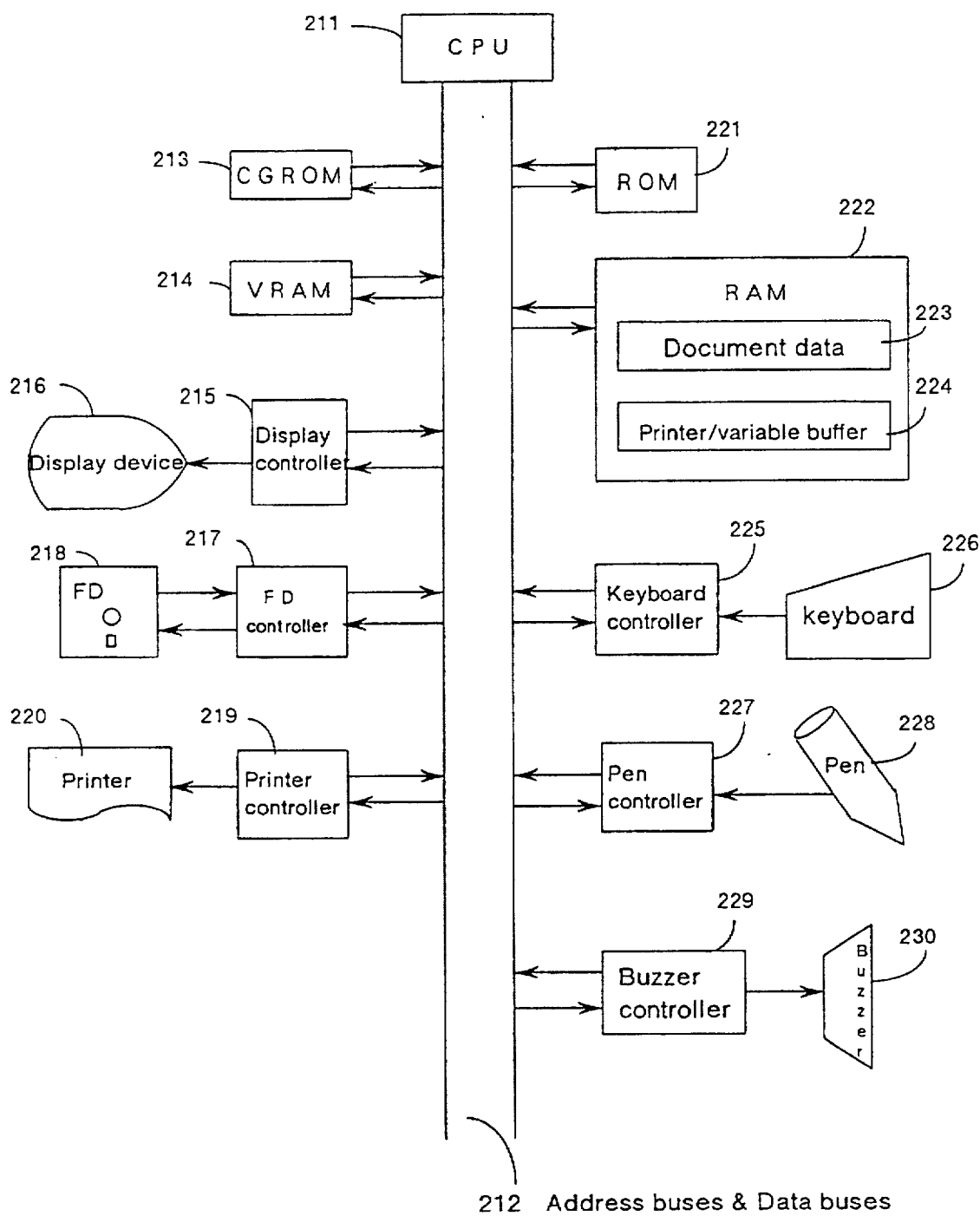
FIG. 30 is a block diagram illustrating a system configuration in accordance with another embodiment of the present invention.

FIG. 30 is a block diagram illustrating an exemplary system configuration in accordance with another embodiment of the present invention. As shown, the document processing system includes: a central processing unit (CPU) 211 for controlling the entire system and transferring data by running programs stored in an ROM 221; address buses and data buses 212 for transferring therethrough data between respective system components; a CGROM 213 for retaining therein bit-mapped data and outline font data of characters, symbols and the like to be displayed and/or printed; a VRAM 214 having a configuration of addresses in one-to-one correspondence with pixel coordinates on a display screen for retaining therein bit-mapped data of a frame being displayed; a display controller 215 for displaying one-frame display data retained in the VRAM 214 on the screen of the display device 216 such as liquid crystal display or CRT in real time; an FD controller 21 7 for controlling a flexible disk drive 218 for storing and reading out document data and the like data; a printer controller 219 for controlling a printer 220 to print out the document data stored in an RAM by reading out font data from the CGROM 213; and an ROM (read only memory) 221 for retaining therein control programs to be referred to by the CPU for the control of the entire system.

Figure 40:
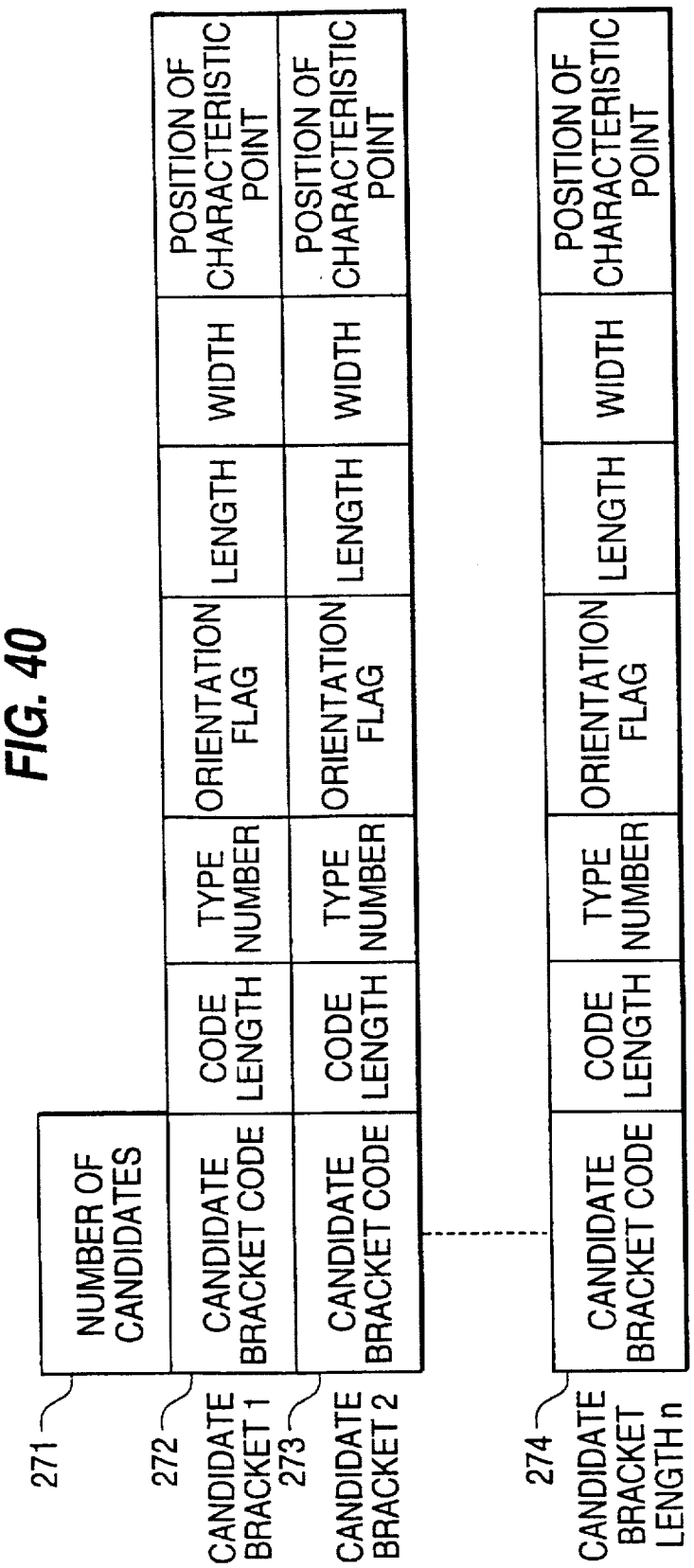
FIG. 40 is a diagram for explaining candidate bracket data including candidate length data of elongated brackets.
Figure 41:
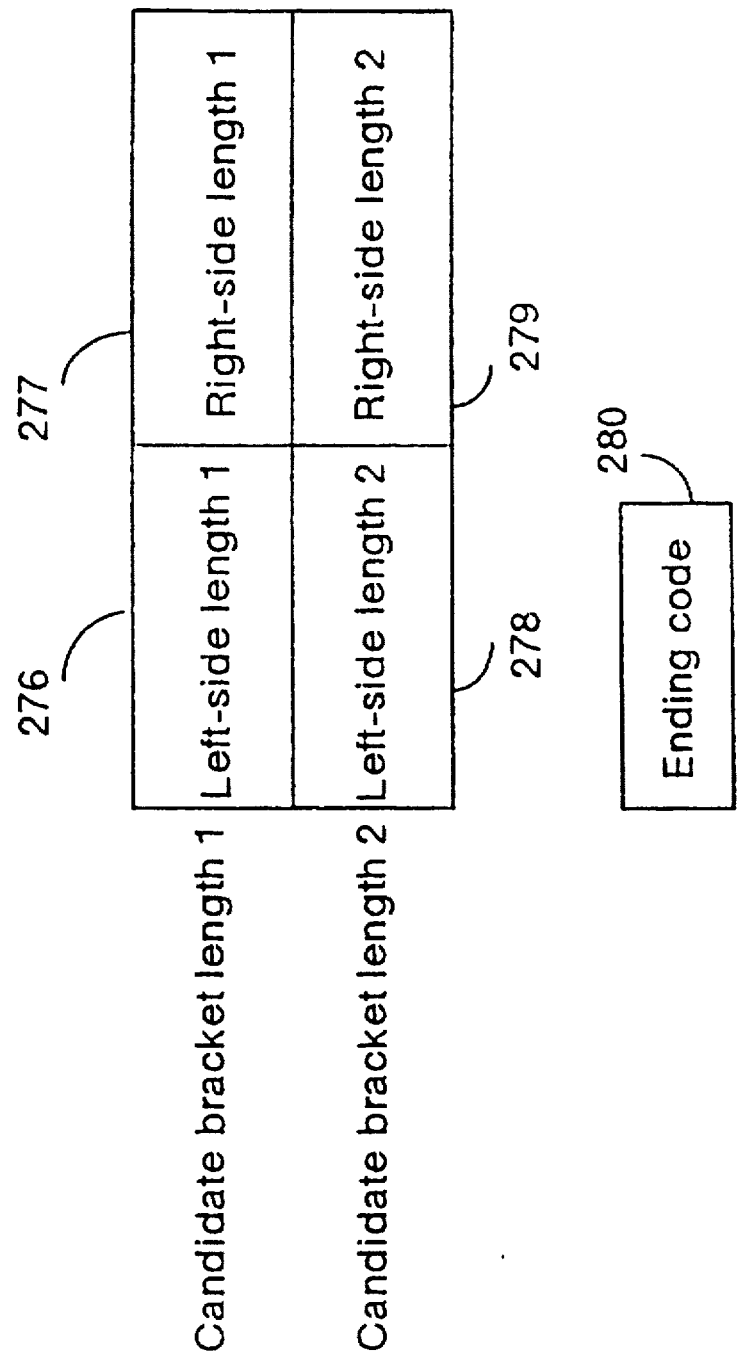
FIG. 41 is a diagram illustrating a bracket length table.

The system further includes: an RAM (random access memory) 222 used as a pointer/variable buffer 224 for retaining therein document data (graphic data, ruled line data, bracket data etc.) and other data used by the CPU 211 for the control operation of the system and the editting operation of a document (a memory area for retaining therein candidate data indicative of a candidate length of an elongated bracket as shown in FIG. 40, a bracket length table shown in FIG. 41, and various kinds of pointers, target columns and target lines to be used in processes shown in flow charts of FIGS. 43 to 47); a keyboard controller 225 for transferring a key-coded input from a keyboard 226 to the CPU 211; a pen controller 227 for transferring data indicative of the state of a pen input device 228 (whether or not the pen is brought into contact with the screen) and coordinate data indicative of the position pointed at with the pen on the screen; and buzzer controller 229 for controlling a buzzer 230 for actuation thereof.

Figure 31:
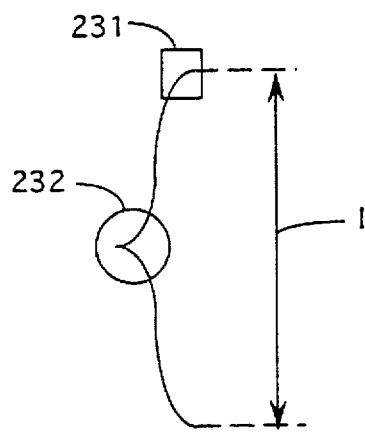
FIG. 31 is a diagram for explaining the nomenclature of respective portions of an elongated bracket.

FIG. 31 is a diagram for explaining the nomenclature of respective portions of an elongated bracket. A portion 231 is a symbol code input position to which a code of an elongated bracket is input, a portion 232 is a characteristic point of the elongated bracket, and l is a length of the elongated bracket.

Figure 32A:
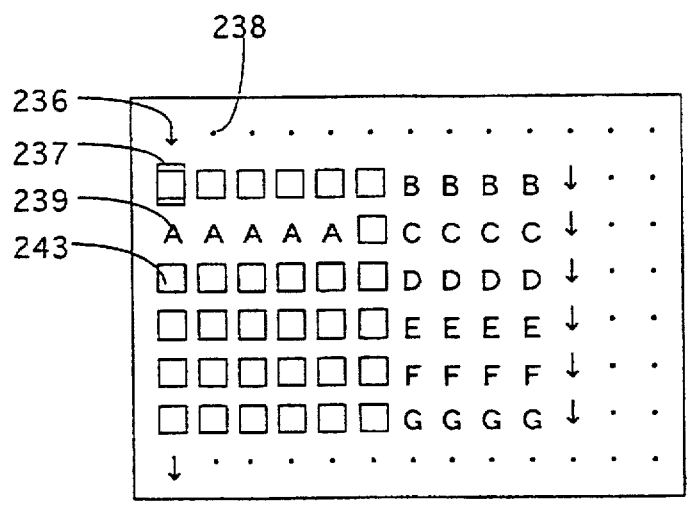
FIGS. 32(a) through (b) are diagrams for explaining a process for inputting an elongated bracket.
Figure 32B:
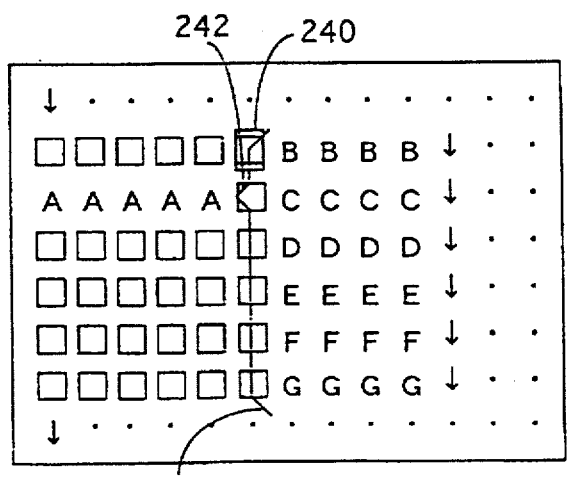

FIG. 32 is a diagram for explaining a process for inputting an elongated bracket. FIG. 32(a) shows a state before an elongated bracket is input. FIG. 32(b) shows a state after an elongated bracket is input. In accordance with the present invention, the elongated bracket shown in FIG. 32(b) is input in the state shown in FIG. 32(a) by a single operation (or by designating the entry of the elongated bracket). In FIG. 32, there are shown a line feed code 236, a cursor 237 pointing at an input position, a non-input area 238, an ordinary character 239, an elongated bracket code position 240, an input elongated bracket 241, a characteristic point 242 of the input elongated bracket, and a null character 243. The arrangement of displayed null characters (see FIG. 35) and other characters shown in FIG. 32 exactly corresponds to the character arrangement in the document data 223.

Figure 33A:
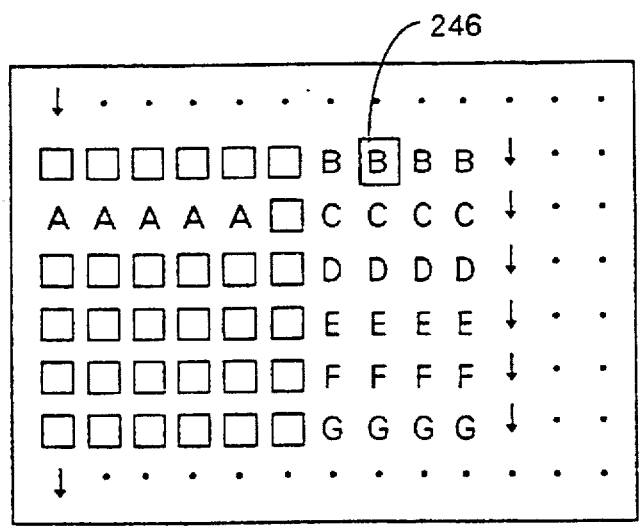
FIGS. 33(a) through (b) are diagrams for explaining a process for inputting elongated brackets.
Figure 33B:
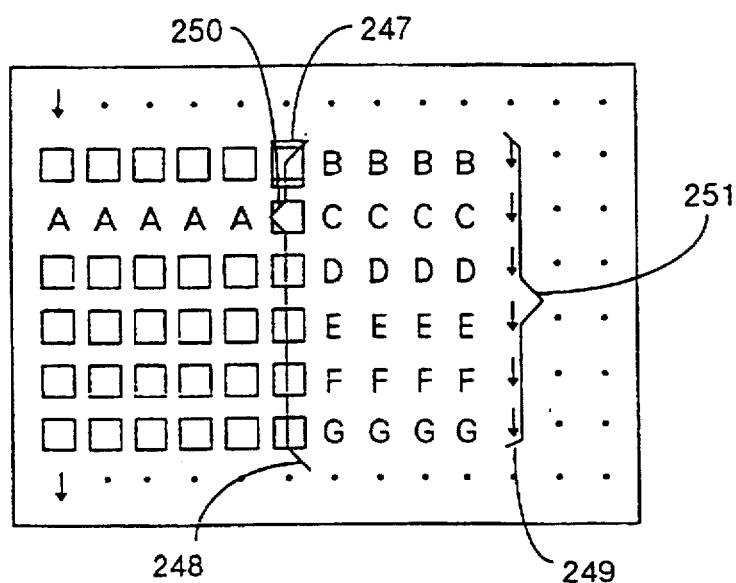

FIG. 33 is a diagram for explaining a process for inputting elongated brackets. An operation of inputting elongated brackets is performed when the cursor 2-46 (which indicates an input position) is located on an ordinary character as shown in FIG. 33(a). Then, a pair of elongated brackets can be input to allow a text block to be enclosed in the pair of brackets as shown in FIG. 33(b) by a single operation. In FIG. 33, there are shown a code position 247 of left elongated bracket (a position in which the symbol is to be input), a left elongated bracket 248, a right elongated bracket 249, a characteristic point 250 of the left elongated bracket, and a position 251 of a characteristic point of the right elongated bracket. The arrangement of displayed null characters (see FIG. 35) and other characters shown in FIG. 33 exactly corresponds to the character arrangement in the document data 223.

Figure 34A:
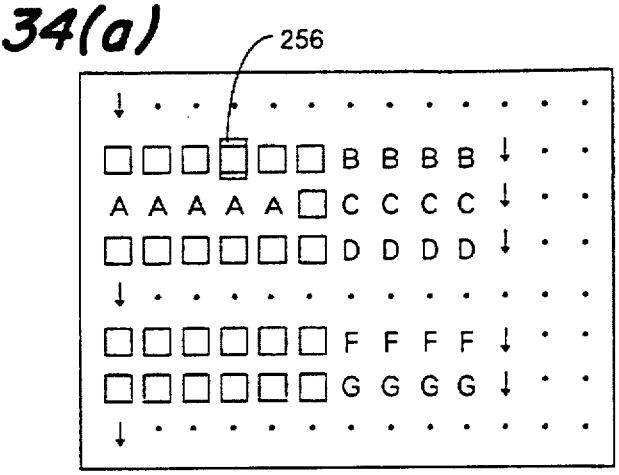
FIGS. 34(a) through (c) are diagrams for explaining a process for selecting an appropriate length of an elongated bracket from plural candidate lengths.
Figure 34B:
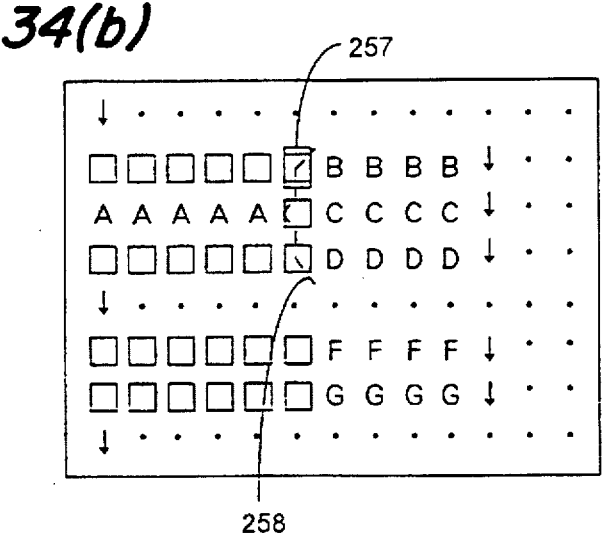
Figure 34C:
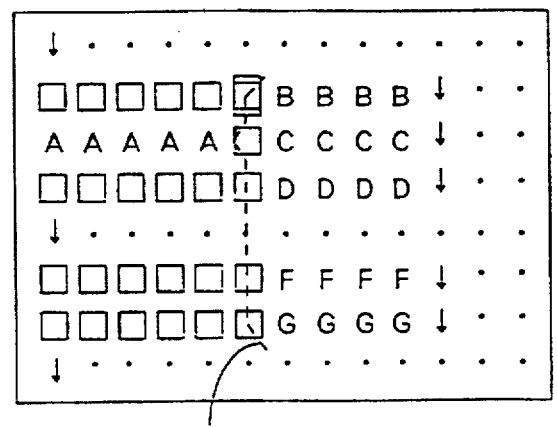

FIG. 34 is a diagram for explaining a process for selecting an appropriate length of an elongated bracket from plural candidate lengths. FIG. 34(a) shows a state before an elongated bracket is input, FIG. 34(b) shows a state where an elongated bracket having a first candidate length is displayed, and FIG. 34(c) shows a state where an elongated bracket having a second candidate length is displayed. In FIG. 34, there are shown a cursor 256 (pointing at an input position) and a code position 257 of the elongated bracket (a position in which the symbol is to be input). Reference numerals 258 and 259 denote the elongated bracket having the first candidate length and the elongated bracket having the second candidate length, respectively.

FIG. 35 shows exemplary null characters. Characters included in document data are classified into null characters and other characters (ordinary characters). Null characters include a null code (null character in the narrow sense of the word), line feed code and non-input code (non-input area).

Figure 36:
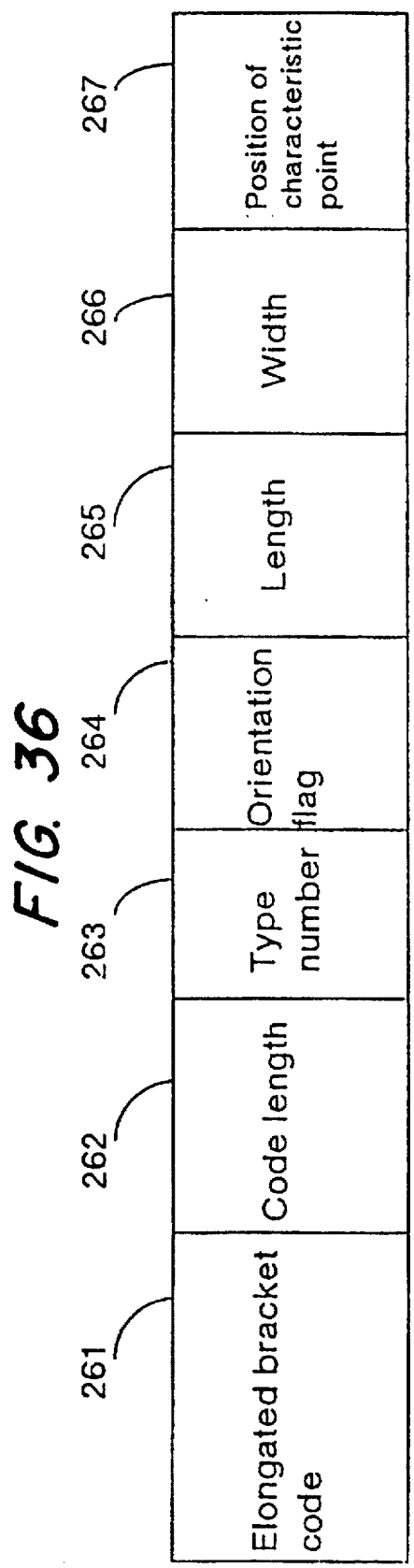
FIG. 36 is a diagram illustrating the structure of elongated bracket data.

FIG. 36 is a diagram illustrating the structure of elongated bracket data. The elongated bracket data is stored in a corresponding code position in document data 223, and includes an elongated bracket code 261 indicating that the bracket extends across plural lines, a code length 262 of the elongated bracket data, a bracket type number 263 of the elongated bracket selected from those shown in FIG. 38, an orientation flag selected from those shown in FIG. 39, a length 265 of the elongated bracket, a width 266 of the elongated bracket and a position 267 of a characteristic point of the elongated bracket (see FIG. 37).

Figure 37:
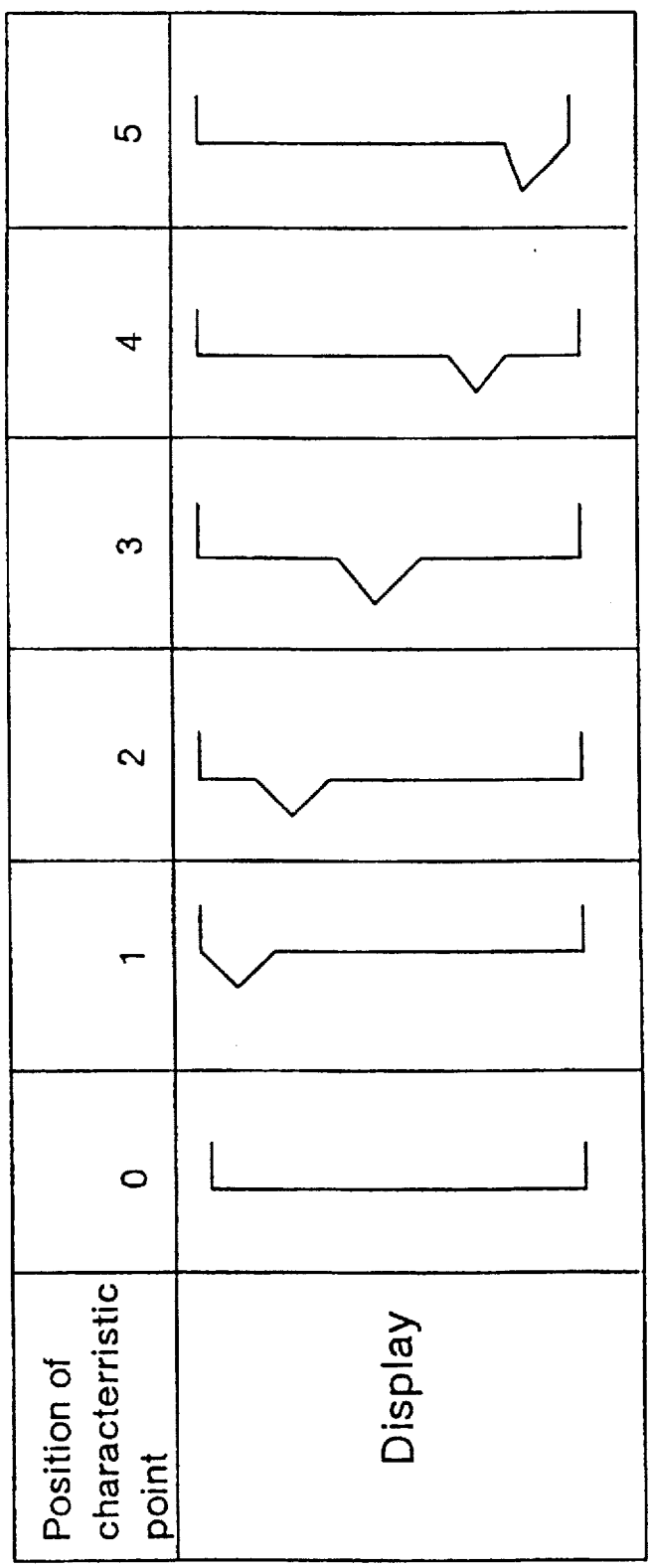
FIG. 37 is a diagram for explaining the appearance of elongated brackets with a length of 5 each having a characteristic point located in a position specified by a characteristic-point positioning number.

FIG. 37 is a diagram for explaining the appearance of elongated brackets with a length of 5 each having a characteristic point located in a position specified by a characteristic-point position number. The position of the characteristic point of an elongated bracket is defined as "1", "2", "3", ... or n (n: the number of lines across which the bracket extends) when the characteristic point is located in the first, second, third, ... or n-th line, and if the bracket has no characteristic point, the position is defined as "0".

FIG. 38 is a diagram for explaining types of elongated brackets each specified by a bracket type number. As shown, some of the brackets have no characteristic point.

FIG. 39 is a diagram for explaining an orientation flag indicative of the orientation of a bracket extending across plural lines or columns. The orientation flag set to "3" or "4" means that the bracket extends across plural columns.

FIG. 40 is a diagram for explaining the structure of data of candidate elongated brackets having different lengths. The candidates of left or right elongated brackets each have data as shown in FIG. 40, which are retained in the pointer/variable buffer 224. In FIG. 40, there are shown the number 271 of candidate elongated brackets, a candidate bracket 272 having a first candidate length, a candidate bracket 273 having a second candidate length, and a candidate bracket 274 having the last candidate length.

FIG. 41 is a diagram illustrating a bracket length table which includes bracket length data obtained by searching the document data along a column on the right or left side of an elongated bracket. This table is retained in the pointer/variable buffer 224. As shown in FIG. 41, the bracket length data includes a first left-side length 276 obtained by searching the document data along a column next to the bracket input position on the left side thereof, a second left-side length 278 obtained by further searching the document data along the left-side column, a first right-side length 277 obtained by searching the document data along a column next to the bracket input position on the right side thereof, and a second right-side length 279 obtained by further searching the document data along the right-side column, which lengths are each represented by the number of lines, and an ending code 280 indicating that there is no more candidate length.

Figure 42:
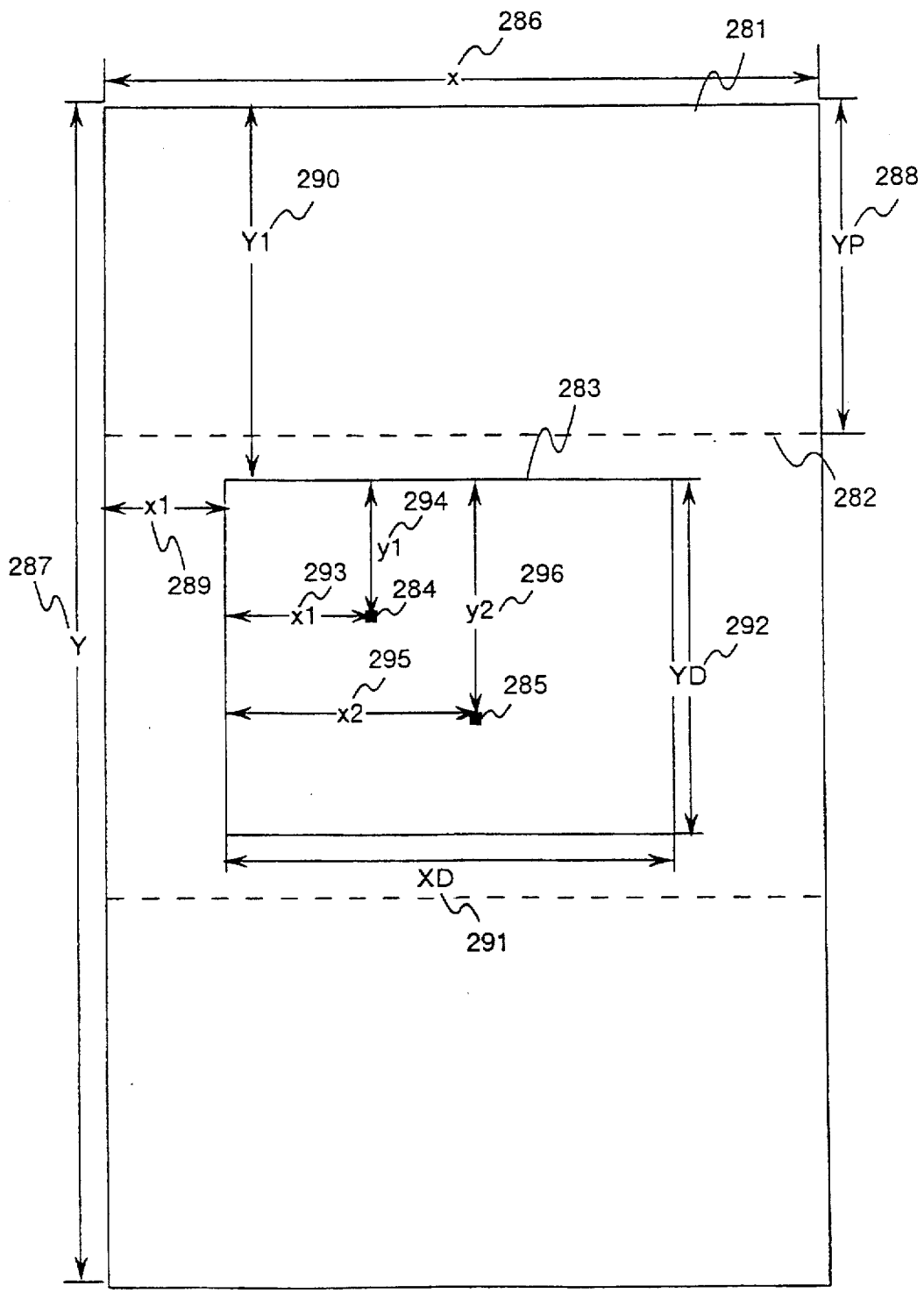
FIG. 42 is a diagram of a coordinate system for locating an elongated bracket in a document.

FIG. 42 is a diagram of a coordinate system for locating an elongated bracket in the document data. An explanation for FIG. 42 will be omitted, because FIG. 42 is substantially the same as FIG. 9.

An operation of inputting an elongated bracket according to this embodiment is performed in accordance with flow charts shown in FIGS. 43 to 47.

Figure 43:
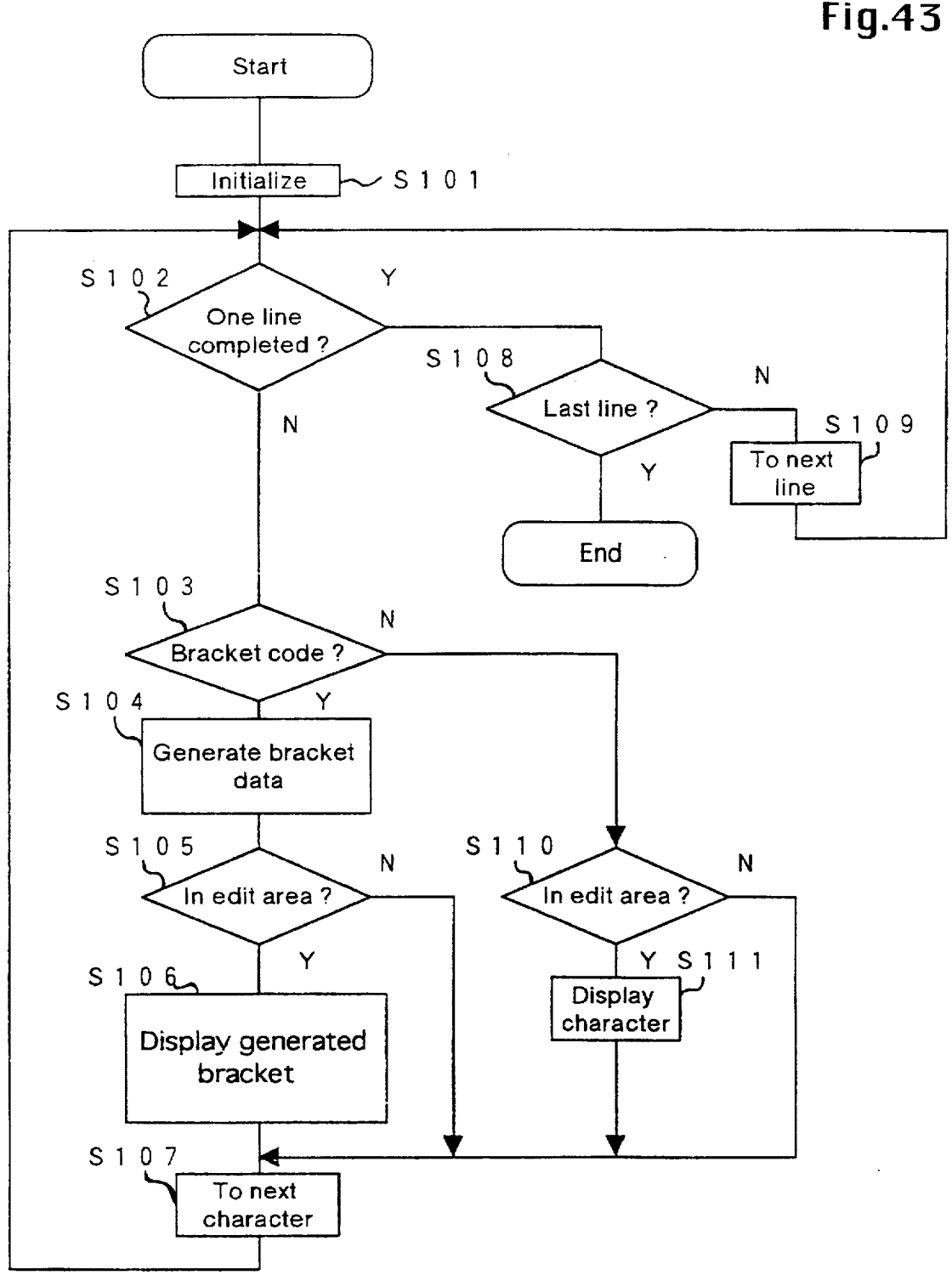
FIG. 43 is a flow chart of a display process.

FIG. 43 is a flow chart of a display process in accordance with this embodiment. Frame data retained in the VRAM 214 is displayed on the screen of the display device 216 in real time under the control of the display controller 215. In a display controlling process performed in accordance with a display program retained in the ROM 221, bit-mapped display data is generated in the VRAM 214 based on the document data 223 stored in the RAM 222 with reference to outline data or bit-mapped data of characters and symbols stored in the CGROM 213.

In step 101, a target character pointer is set to an address of the RAM indicative of a position of the first character of the document data 223 retained in a document buffer, i.e., a character in the first column of the first line is specified as a target character (a character under processing). (A line and column in which the target character is located are herein defined as a target line and target column, respectively.) Then, the process goes into step S102.

In step S102, it is checked if the target character pointer points at a column position of the last column plus 1 in the target line. If YES, it is judged that the processing of the target line is completed, and the process goes into step S108. If NO, the process goes into step S103. In step S103, it is checked if a target character pointed at by the target character pointer is represented by an elongated bracket code 261 included in bracket data as shown in FIG. 36. If YES, the process goes into step S104, and if NO, the process goes into step S110.

In step S104, bracket data (bit-mapped data) for displaying is generated by selecting from the CGROM 213 bit-mapped data or outline data of an elongated bracket having a type number 263, orientation flag 264, length 265, width 266 and position 267 of characteristic point, based on bracket data (shown in FIG. 36) indicated by the target character pointer. Then, the process goes into step S105.

In step S105, it is checked if part of the generated bracket data is located in the edit area 283 as shown in FIG. 42. More specifically, assuming that the target line and target column in the document data 223 are represented by ys and xs, respectively, and the ending position (xe, ye) of the bracket is represented by (xs+bracket width 266, ys+bracket length 265), it is checked if xe>x1, xs<x1+XD, ye>y1 and ys<y1+YD. If YES, the process goes into step S106. If NO, the process goes into step S107. In step S106, a portion of the generated bracket data in the edit area 283 is tranferred to the VRAM 214. Then, the process goes into step S107.

In step S107, a character in the next column is specified as the target character. More specifically, if the target character is represented by an elongated bracket code, the target character pointer is incremented by a value of a code length 262, and if not, the target character pointer is incremented by 1. Then, the process returns to step S102. In step S110, it is checked if the target character is located in the edit area. More specifically, assuming that the target line and target column in the document data 223 are represented by ys and xs, respectively, it is checked if x1<xs<x1+XD and y1<ys<y1+YD. If YES, the process goes into step S111, and if NO, the process goes into step S107. In step S111, bit-mapped data or outline data of The target character is selected from the CGROM 213 to generate character data (image data) for displaying. The generated character data is transferred to the VRAM 21 4 and displayed. Then, the process goes into step s107. In step S108, it is checked if the target line is the final line (target line=Y). If YES, the process ends, and if NO, the target line is set to the next line and the process returns to step S102.

Figure 44:
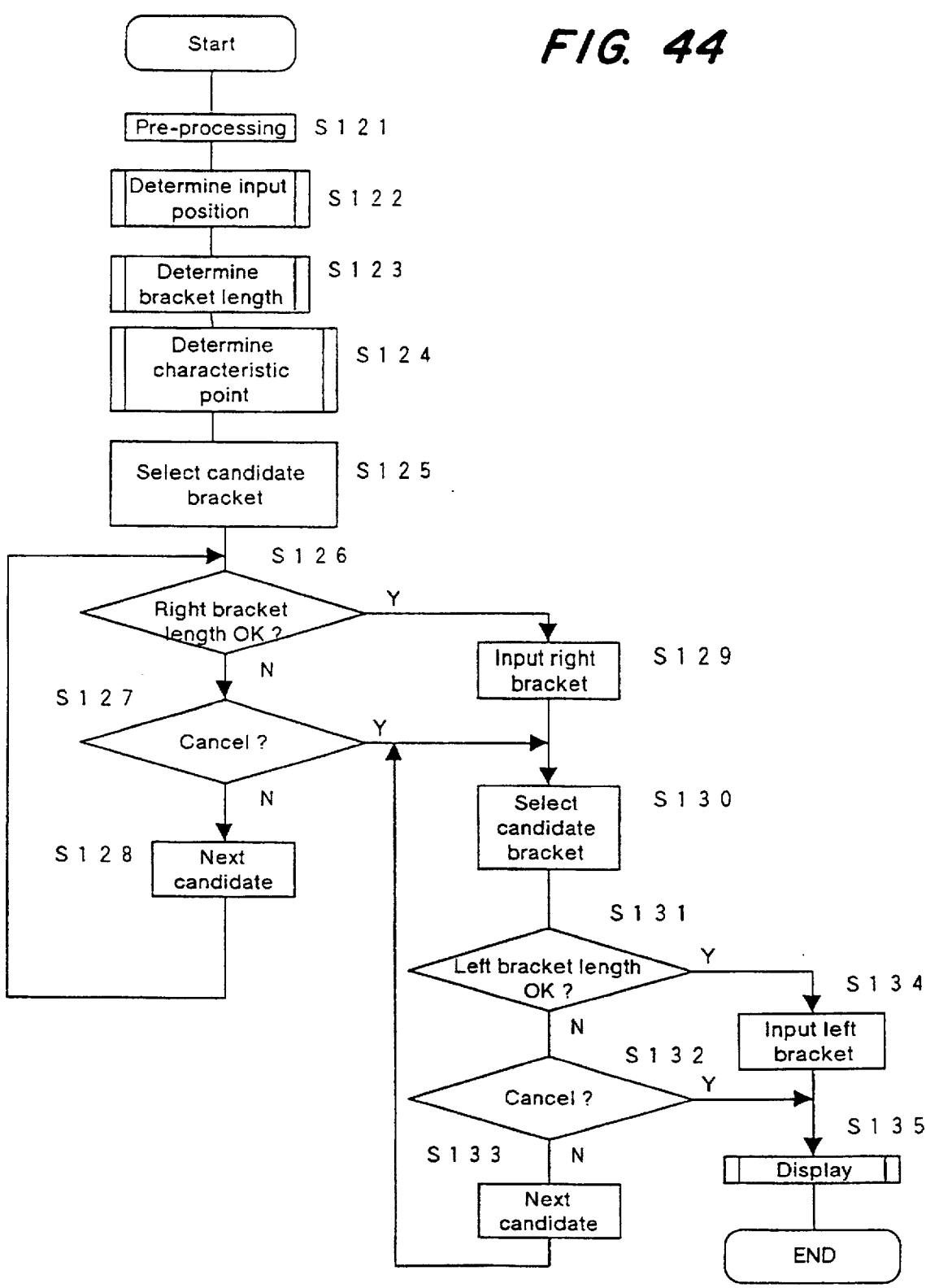
FIG. 44 is a flow chart of a process for inputting an elongated bracket.

FIG. 44 is a flow chart of a process for inputting an elongated bracket in accordance with this embodiment. This process is performed in accordance with steps S121 to S135. In step S121, an input position is taken in and a bracket type is set. The input position is defined by a cursor position that the operator specifies by operating the key board 226 or defined by a pen input position pointed at with the pen 228. The bracket type is selected from those shown in FIG. 38 by the operator or, alternatively, previously selected bracket type is employed. Then, the process goes into step S122. In step S122, an elongated-bracket input position is determined in a bracket input position determining process shown in FIG. 45, in which the input positions of both or either of right and left brackets am determined. Then, the process goes into step S123.

Figure 46:
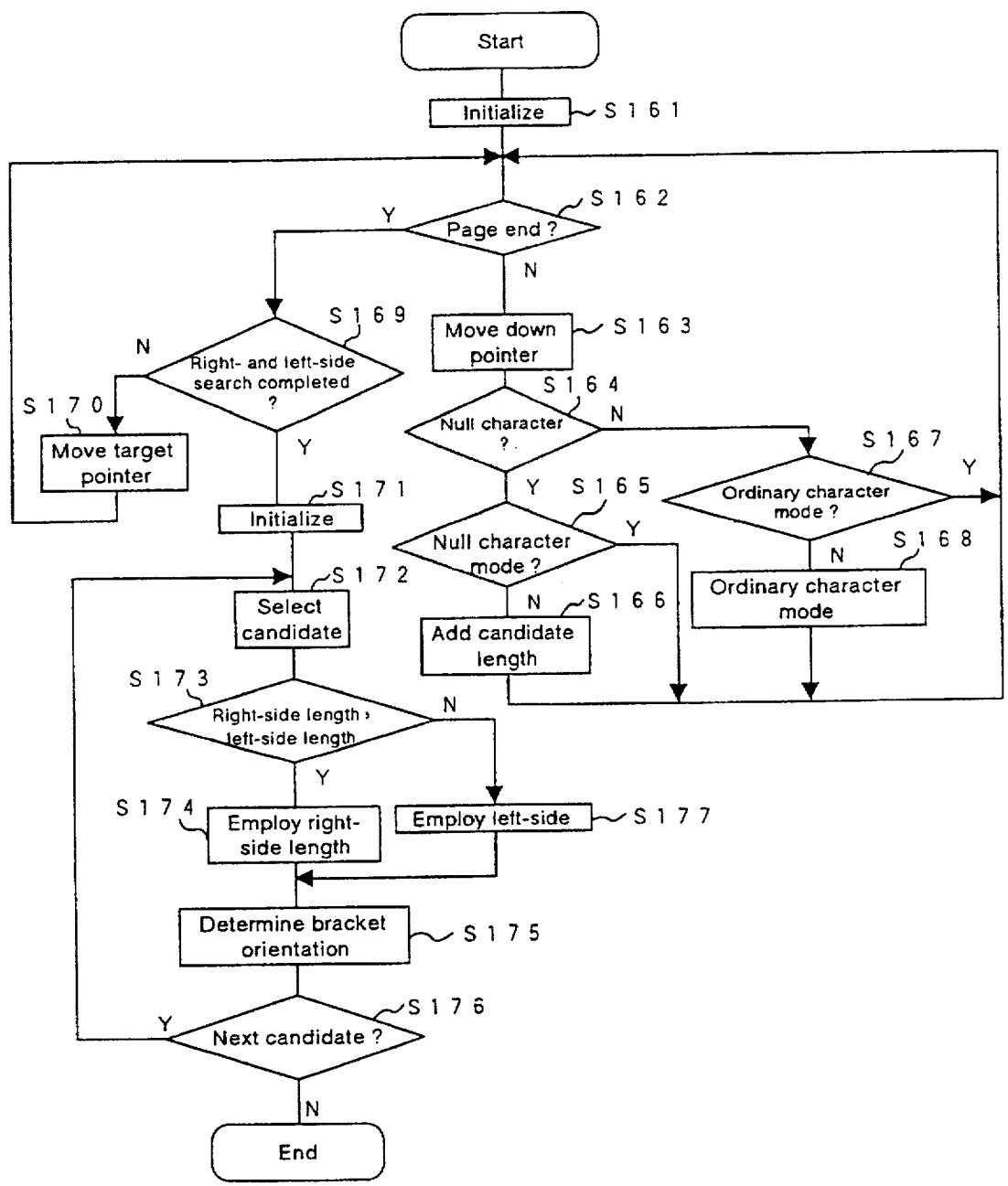
FIG. 46 is a flow chart of a process for determining an appropriate length of an elongated bracket.

In step S123, candidate bracket lengths for each of the elongated brackets in the input positions determined in step S122 are determined in a bracket length determining process shown in FIG. 46. Then, the process goes into step S124.

Figure 47:
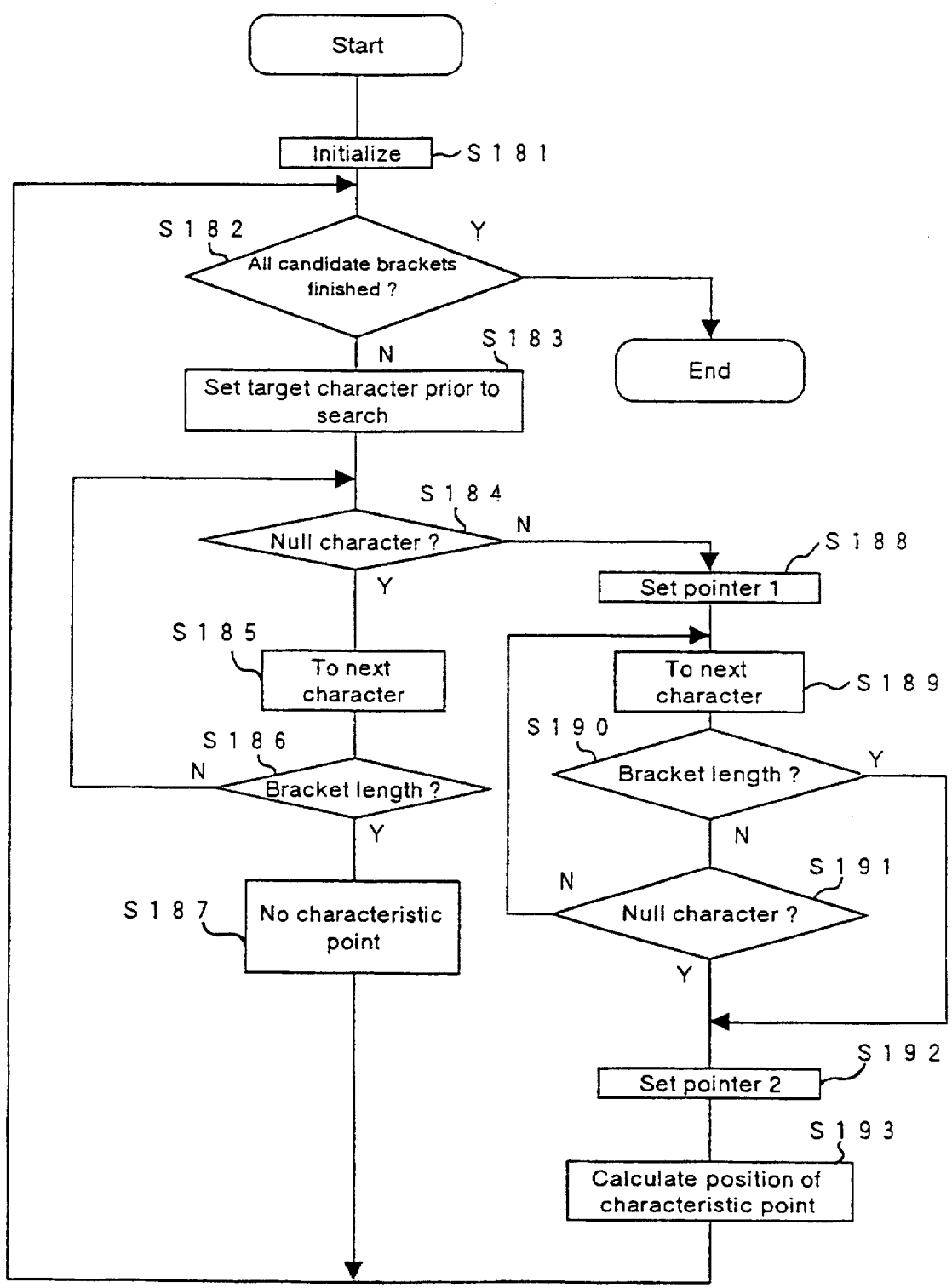
FIG. 47 is a flow chart of a process for determining an appropriate position of a characteristic point of an elongated bracket.
Figure 48A:
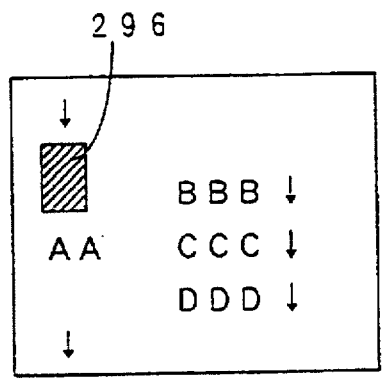
FIGS. 48(a) through (d) are diagrams for explaining an operation of inputting an elongated bracket performed by a conventional system.
Figure 48B:
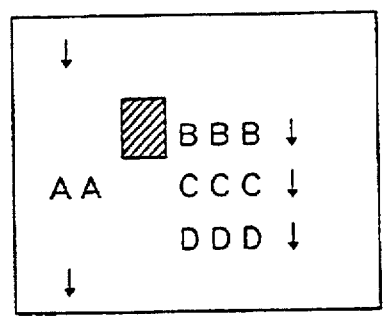
Figure 48C:
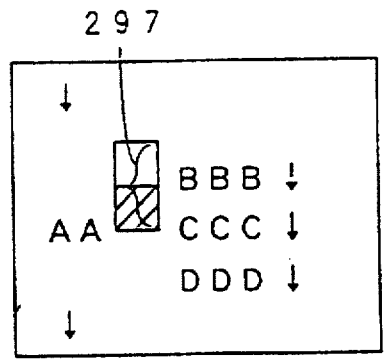
Figure 48D:
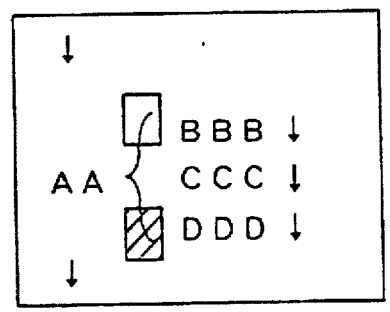
Figure 49A:
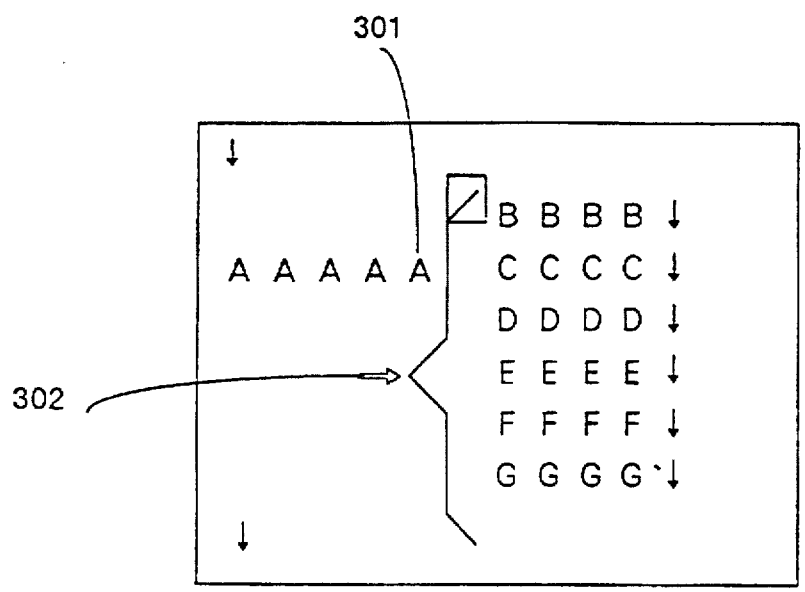
FIGS. 49(a) through (b) are diagrams for explaining a process for determining an appropriate position of a characteristic point of an elongated bracket performed by a conventional system.
Figure 49B:
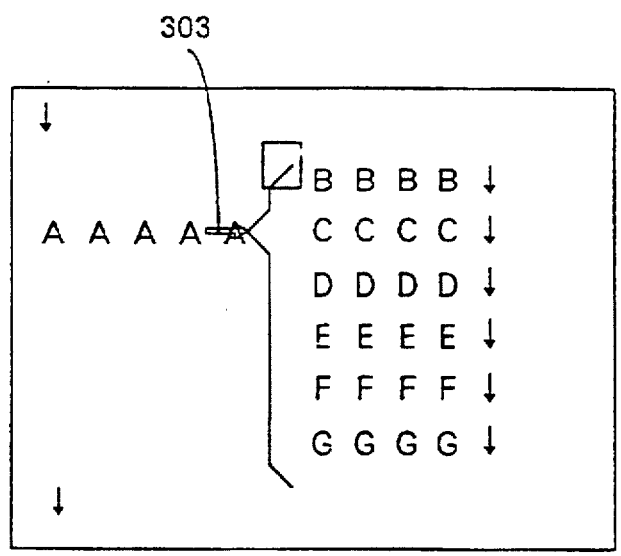

In step S124, the position of a characteristic point of each of the elongated brackets having different candidate lengths determined in step S123 is determined in a characteristic-point determining process shown in FIG. 47. Then, the process goes into step S125.

In step S125, assuming that there exists a right-bracket input position, a first candidate bracket having a first right-side length determined in step S123 (first candidate bracket data 272 shown in FIG. 40) is selected, and then the process goes into step S126.

In step S126, bit-mapped data and outline data corresponding to the bracket having the selected candidate length are taken out of the CGROM 213, and written in an address of the VRAM 214 corresponding to the right bracket input position, and the bracket having the selected candidate length is temporarily displayed as shown in FIG. 34(b). Then, it is checked if the operator inputs definitive entry of the temporarily displayed bracket from the keyboard 226 or the like. If YES, the process goes into step S129, and if NO, the process goes into step S127.

In step S127, it is checked if it is found that there exists no right bracket input position or if the operator intends to input no right bracket (or the operator cancels the right bracket inputting process by inputting from the keyboard 226 or the like). If YES, the process goes into step S130, and if NO, the process goes into step S128. In step S128, the next candidate bracket is selected (if there is no more candidate bracket, the first candidate bracket is employed), and then the process returns to step S126. In step S129, the bracket data of the selected candidate bracket in the right bracket input position is written in an address of the RAM 222 corresponding to the right bracket input position in the document data 223. Then, the process goes into step S130.

In step S130, assuming that there exists a left bracket input position, the first candidate bracket having the first left-side length determined in step S123 (first candidate bracket data 272 shown in FIG. 40) is selected, and then the process goes into step S131. In step S131, bit-mapped data and outline data corresponding to the bracket having the selected candidate length are taken out of the CGROM 213, and written in an address of the VRAM 214 corresponding to the left bracket input position, and the bracket having the selected candidate length is temporarily displayed. Then, it is checked if the operator inputs from the keyboard 226 or the like definitive entry of the temporarily displayed bracket. If YES, the process goes into step S134, and if NO, the process goes into step S132.

In step S132, it is checked if it is found that there exists no left bracket input position or if the operator intends to input no left bracket (or the operator cancels the left bracket inputting process by inputting from the keyboard 226 or the like). If YES, the process goes into step S135, and if NO, the process goes into step S133. In step S133, the next candidate bracket is selected (if there is no more candidate bracket, the first candidate is employed), and then the process returns to step S130. In step S134, the bracket data of the selected candidate bracket in the left bracket input position is written in an address of the RAM 222 corresponding to the left bracket input position in the document data 223. Then the process goes into step S135. In step S135, a display process shown in FIG. 43 is performed, and the elongated-bracket inputting process ends.

Figure 45:
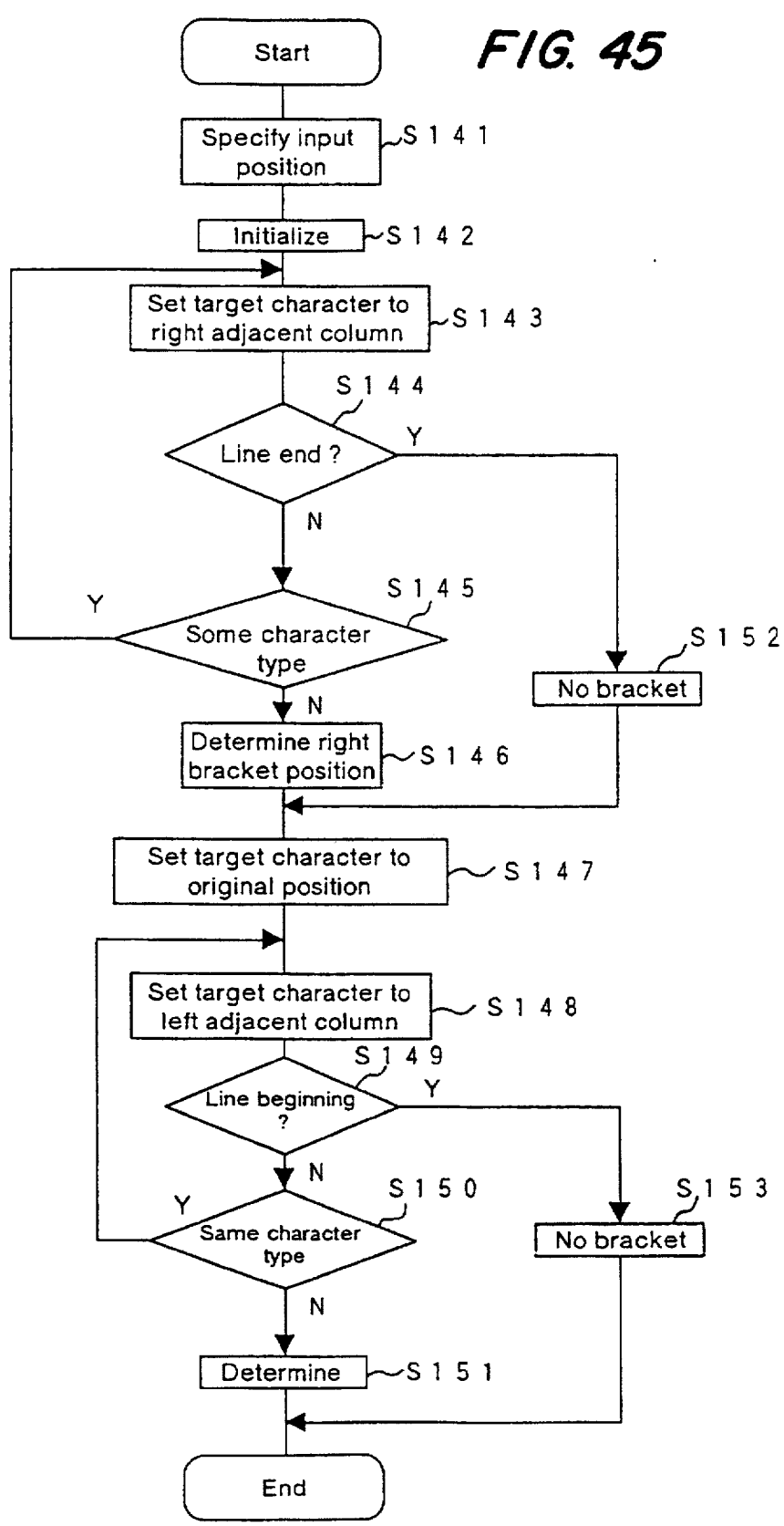
FIG. 45 is a flow chart of a process for determining an input position of an elongated bracket.

FIG. 45 is a flow chart of a process for determining an input position of an elongated bracket. This process is performed in accordance with steps S141 to S153.

In step S141, an input position pointed at by the cursor 246 or the like as shown in FIG. 33(a) is defined as a reference position before the bracket input position determining process is called, and the process goes into step S142. In step S142, a character in the reference position is specified as the target character, and the character in the reference position is extracted from the document data 223 and a character type (null character or ordinary character) of the character in the reference position is determined. Then, the process goes into step S143. In step S143, a character in the next column on the right side is specified as the target character.

In step S144, it is checked if the target character is located at the end of a line (target column>X). If Yes, the process goes into step S152, and if NO, the process goes into S145. In step S145, it is checked if the character type of the target character is the same as that of the character in the reference position. If YES, the process goes into step s143, and if NO, the process goes into step S146. In step S146, the current target character position is determined to be employed as a right bracket input position. Then, the process goes into step S147. In step S147, the target character position is reset to the reference position, and then the process goes into step S148 In step S148, a character in the next column on the left side is specified as the target character.

In step S149, it is checked if the current target character is located at the beginning of the line. If YES, the process goes into step S153, and if NO, the process goes into step S150. In step S150, it is checked if the character type of the target character is the same as that of the character in the reference position. If YES, the process returns to step S148, and if NO, the process goes into step S151. In step S153, the current target character position is determined to be employed as a left bracket input position, and the process ends. In step S152, it is determined that there exists no right bracket input position, and the process goes into step S147. In step S153, it is determined that there exists no left bracket input position, and the process ends. If there exist right and left bracket input positions, two positions in which a pair of brackets am to be input are detected as shown in FIG. 33(b). On the other hand, if there exists only the left bracket input position, one position in which a left bracket is to be input is detected as shown in FIG. 32(b).

FIG. 46 is a flow chart of a process for determining an appropriate length of an elongated bracket and preparing candidate lengths. This process is performed in accordance with steps S161 to S177. In step S161, a target pointer is set to a column next to the elongated-bracket input position on the left thereof designated before the length determining process is performed, and it is checked whether a character in the target pointer position is a null character or an ordinary character. If the character is a null character, the process mode is set to a null character mode. If the character is an ordinary character, the process mode is set to an ordinary character mode. Then, the process goes into step S162. In step S162, it is checked if the target pointer is located in the last line of a page (line of the target pointer=y1+YD). If YES, the process goes into step S169, and if NO, the process goes into step S163.

In step S163, the target pointer is moved to a position in the same column of the next line. Then, the process goes into step S164. In step S164, it is checked if a character in the target pointer position is a null character. If YES, the process goes into step S165, and if NO, the process goes into step S167. In step S165, if the process mode is the null character mode, the process returns to step S162, and if not, the process goes into step S166. In step S166, the number of lines counted from a line in which the elongated-bracket input position is located to a line in which the target pointer is currently located is detected, and the line number minus 1 is determined to be employed as a candidate bracket length and added to the bracket length table (see FIG. 41). (If the target pointer is located in the column next to the bracket input position on the left side thereof, the bracket length is added as a left-side length. On the other hand, if the target pointer is located in the column next to the bracket input position of the right side thereof, the bracket length is added as a right-side length.) Then, the process mode is set to the null character mode, and the process returns to step S162.

In step S167, it is checked if the process mode is the ordinary character mode. If YES, the process returns to step S162, and if NO, the process goes into step S168. In step S168, the process mode is set to the ordinary character mode, and then the process returns to step S162. In step S169, it is checked if all the left-side lengths and right-side lengths have been determined by setting the target pointer in the columns next to the elongated-bracket input position on the both sides thereof and searching the document data along the columns. If YES, the process goes into step S171, and If NO, the process goes into step S170. In step S170, the target pointer is set to a column next to the elongated-bracket input position. If a character in the target pointer position is a null character, the process mode is set to the null character mode, and if the character is an ordinary character, the process mode is set to the ordinary character mode. Then, the process returns to step S162.

In step S171, an ending code is added to the end of the bracket length table shown in FIG. 41, and the first bracket length data is employed as a target bracket length. Then, the process goes into step S172. In step S172, the right-side length and left-side length of the target bracket length data are obtained, and then the process goes into step S173. In step S173, the right-side length is compared with the left-side length. If the right-side length is greater than the left-side length, the process goes into step S174, and if not, the process goes into step S177. In step S174, it is determined to employ the right-side length as a bracket length, and the process goes into step S175. In step S177, it is determined to employ the left-side length as a bracket length, and the process goes into step S175.

In step S175, data of a bracket having a length determined in step S174 is added to the candidate bracket data table shown in FIG. 40, and a bracket orientation flag determined by a bracket orientation determiner is added thereto. Then, the process goes into step S176. In step S176, it is checked if another bracket length data is retained in the bracket length table shown in FIG. 41. If YES, the next bracket length data is employed as the target bracket length data, and the process returns to step S172. If NO, the process ends.

FIG. 47 is a flow chart of a process for determining an appropriate position of a characteristic point of an elongated bracket. This process is performed in accordance with steps S181 to S193. In step S181, the first candidate bracket data 272 in the candidate bracket data table shown in FIG. 40 for an input position of a bracket which is to be specified in step S125 of a flow chart shown in FIG. 40 is employed as target bracket data, and the process goes into step S182. In step S182, it is checked if the position of a characteristic point is determined for every candidate bracket data shown in FIG. 40 by searching the document data. If YES, the process ends, and if NO, the process goes into step S183.

In step S183, the bracket orientation flag in the target bracket data is checked. If the bracket orientation flag is set to "1" (which means an open bracket), a character next to the bracket input position on the left side thereof is specified as the target character. If the bracket orientation flag is set to "2" (which means a close bracket), a character next to the bracket input position on the right side thereof is specified as the target character. Then, the process goes into step S184. In step S184, it is checked if the character type of the target character is a null character. If YES, the process goes into step S185, and if NO, the process goes into step S188. In step S185, a character in the same column of the next line is specified as the target character. Then, the process goes into step S186. In step S186, it is checked if the target character is located in a position downwardly distanced from the bracket input position by more than the bracket length of the target candidate bracket. If YES, the process goes into step S187, and if NO, the process goes into step S184.

In step S187, it is judged that the position of the characteristic point of the target candidate bracket is indeterminable, and the characteristic point is located in the center of the bracket. AT this time, the type of the bracket may be changed to a type having no characteristic point. Then, the next candidate bracket is employed as the target candidate bracket, and the process returns to step S182. In step S188, the position of the current target character is stored as a first pointer, and the process goes into step S189. In step S189, a character in the same column of the next line is specified as the target character, and then the process goes into step S190. In step S190, it is checked if the target character is located in a position downwardly distanced from the bracket input position by the number of lines equivalent to the length of the target candidate bracket plus one. If YES, the process goes into step S192, and if NO, the process goes into step S191.

In step S191, it is checked if the character type of the target character is a null character. If YES, the process goes into step S192, and if NO, the process goes into step S189. In step S192, a position one line above the target character is stored as a second pointer, and the process goes into step S193. In step S193, the position of the characteristic point of the target candidate bracket is determined to be a middle point between the first and second pointers. Then, the next candidate bracket is employed as the target candidate bracket, and the process returns to step S192.

The respective process shown in FIGS. 43 to 47 are automatically carried out by the CPU 211 shown in FIG. 30.

The present invention enables an operator to easily input an elongated bracket of a desired size in a desired position by detecting the starting point and ending point of the elongated bracket input by the operator or by detecting the elongated bracket hand-written in a desire position by the operator.

In accordance with the present invention, the position, boldness and width of an elongated bracket can be specified.

Therefore, the position, boldness and width of an elongated bracket once generated can be changed by a simple input operation, and the appearance of the bracket can easily be altered to improve the impression of a document once generated.

Furthermore, the position, length and orientation of a bracket once generated can easily be changed by specifying any of the starting point, middle projection and ending point to be changed. In addition, the elongated bracket can be rotated around a certain rotational center. Hence, a more impressive elongated bracket can easily be generated, thereby improving the impression of a document.

In accordance with the present invention, in the operation of inputting a symbol extending across plural lines or columns, the input position of the symbol is determined by detecting the character arrangement of document data around the input position. Hence, the operation of specifying the input position of a symbol extending across plural lines or columns can be facilitated. In addition, a text block can be enclosed in paired symbols extending across plural lines located on the right and left sides of the text block, or enclosed in paired symbols extending across plural columns located on the upper and lower sides of the text block by a single operation, i.e., without specifying each of the input positions of the paired symbols. Therefore, the operation of inputting a symbol extending across plural lines or columns can be facilitated.

Further, in the symbol inputting operation, the length of the symbol is determined by detecting the character arrangement of document data around the input position of the symbol. Therefore, the step of inputting the length of the symbol can be omitted, thereby facilitating the symbol inputting operation.

Still further, when the length of the symbol is determined by detecting the character arrangement of the document data around the symbol input position in the elongated-symbol inputting operation, an appropriate length of the symbol can be selected from plural candidate lengths. Therefore, the operator can easily specify the length of the symbol extending across plural lines or columns, and yet is allowed a free choice.

Yet further, since the position of a characteristic point of the symbol is determined by detecting the character arrangement around the symbol input position in the elongatedsymbol input operation, the step of inputting the position of the characteristic point can be omitted, thereby facilitating the characteristic-point specifying operation.

What is claimed is:

1. A document processing system comprising:

input means for inputting data of a document;

document storing means for storing therein the input document data;

display means for displaying the document data;

bracket data storing means for storing therein data of plural types of brackets each having a predetermined shape;

bracket specification storing means for storing therein data of a bracket type selected from the plural types of brackets stored in said bracket data storing means;

bracket position specifying means for specifying positions of starting and ending points between which a bracket specified by the data stored in said bracket specification storing means is to be located in the document;

bracket position storing means for storing therein positional data indicative of the positions of the starting and ending points in the document specified by said bracket position specifying means;

bracket generating means for determining a size of the bracket specified by the data stored in said bracket specification storing means based on the position data stored in said bracket position storing means so as to lay out the bracket in the document, for generating the bracket having said size, and for storing data of the generated bracket in said document storing means;

editing means for controlling display of the generated bracket by said display means in a position in the document specified by the positional data based on the data of the generated bracket stored in said document storing means; and middle-projection position specifying means for specifying a position of a middle projection of the bracket specified by the data stored in said bracket specification storing means, said bracket position storing means storing positional data indicative of the position of the middle projection in the document specified by said middle-projection position specifying means, said bracket generating means generating the bracket specified by the data stored in said bracket specification storing means as having a middle projection located in the position specified by said middle-projection position specifying means and storing the generated bracket in said document storing means.

2. The document processing system as set forth in claim 1, further comprising:

reference point setting means for setting a reference point serving as a center of rotation of the bracket, the reference point being located at a given point on the bracket; and rotational conditions setting means for setting conditions of rotation of the bracket, said bracket generating means rotating the bracket specified by the data stored in said bracket specification storing means around the reference point under the conditions set by said rotational conditions setting means.

3. A document processing system comprising:

input means for inputting data of a document by handwriting;

document storing means for storing therein the input document data;

display means for displaying the document data;

bracket data storing means for storing therein data of plural types of brackets each having a predetermined shape;

bracket identifying means for comparing a trace of a bracket in the input document data with the data of the plural types of brackets stored in said bracket data storing means and selecting a bracket type which is closest in shape to the trace of the bracket;

bracket specification storing means for storing data of the bracket type selected by said bracket identifying means;

bracket position storing means for storing therein positional data of starting and ending points of the trace of the bracket;

bracket generating means for determining a size of the bracket specified by the data stored in said bracket specification storing means based on the positional data stored in said bracket position storing means so as to lay out the bracket in the document, for generating the bracket having said size, and for storing data of the generated bracket in said document storing means; and editing means for controlling display of the generated bracket by said display means in a position in the document specified by the positional data based on the data of the generated bracket stored in said document storing means.

4. A document processing system comprising:

input means for inputting data of a document;

document storing means for storing therein the input document data;

display means for displaying the document data;

input position specifying means for specifying an input position of a symbol in the document data, the input position selectable such that the symbol extends across plural lines or plural columns;

symbol input position determining means for determining an input position of the symbol, based on the input position specified by said input position specifying means and arrangement of null characters and characters other than the null characters around the input position specified by said input position specifying means in the document data; and editing means for storing the document data corresponding to the symbol at the determined input position of the symbol in said document storing means, said symbol input position determining means determining the input position of the symbol by detecting a position where a character of a type other than that of a character located in the input position specified by said input position specifying means in the document data is first detected on the right or left side of a column of the specified input position.

5. The document processing system as set forth in claim 4, further comprising:

symbol length determining means for determining a length of the symbol, based on arrangement of the null characters and the characters other than the null characters around the input position of the symbol in the document data, said editing means editing the symbol data to include data indicative of the length determined by said symbol length determining means and storing the edited symbol data in said document storing means.

6. The document processing system as set forth in claim 4, further comprising:

characteristic-point determining means for determining a position of a characteristic point of the symbol based on positions of the characters other than the null characters around the input position of the symbol in the document data, said editing means editing the symbol data to include data indicative of the position of the characteristic point determined by said characteristic-point determining means and storing the edited symbol data in said document storing means.

7. A document processing system comprising:

input means for inputting data of a document;

document storing means for storing therein the input document data;

display means for displaying the document data;

input position specifying means for specifying an input position of a symbol in the document data, the input position selectable such that the symbol extends across plural columns or plural lines;

symbol length determining means for determining a length of the symbol, based on arrangement of null characters and characters other than the null characters around the input position of the symbol in the document data; and editing means for editing the symbol data to include data indicative of the length determined by said symbol length determining means and storing the edited symbol data in said document storing means, said symbol length determining means determining the length of the symbol by downwardly searching the document data along columns next to the input position of the symbol on right and left sides thereof, detecting a first number of lines counted from a line in which a character other than the null character is first detected on the right side to a line in which a null character is thereafter detected on the right side and a second number of lines counted from a line in which a character other than the null character is first detected on the left side to a line in which a null character is thereafter detected on the left side, and designating the greater of the first and second line numbers as the length of the symbol.

8. The document processing system as set forth in claim 7, further comprising:

candidate length determining means for determining candidate lengths of the symbol by controlling said symbol length determining means to further downwardly search the document data along the columns next to the input position of the symbol on the right and left sides thereof from a position of an ending point of the symbol having the length determined by said symbol length determining means as far as possible; and candidate length selecting means for selecting any one of the candidate lengths determined by said candidate length determining means.

9. A document processing system comprising:

input means for inputting data of a document;

document storing means for storing therein the input document data;

display means for displaying the document data;

input position specifying means for specifying an input position of a symbol in the document data, the input position selectable such that the symbol extends across plural columns or lines;

characteristic-point determining means for determining a position of a characteristic point of the symbol based on positions of null characters and characters other than null characters around the input position of the symbol in the document data; and editing means for editing the symbol data to include data indicative of the position of the characteristic point determined by said characteristic-point determining means and storing the edited symbol data in said document storing means, said characteristic point determining means determining the position of the characteristic point of the symbol by downwardly searching the document data along a column next to an input position of the symbol on a side to which the characteristic point projects, detecting a first position in which a character other than the null character is first detected and a second position in which a null character is thereafter detected, and designating a middle position between the first and second positions as the position of the characteristic point of the symbol.

10. A method of document processing using a processing system comprising the steps of:

storing data of a document in a memory of the processing system;

storing data of plural types of brackets each having a predetermined shape in the memory;

selecting a bracket type from the plural types of brackets stored in the memory;

selecting starting and ending points between which the selected bracket type is to be located within the document, data indicative of the selected bracket type and the selected starting and ending points being stored in the memory, the processing system determining a size of the selected bracket type in accordance with the stored data indicative of starting and ending points, generating the selected bracket type having the determined size and displaying the selected bracket type as generated on a display; and selecting a position of a middle projection of the selected bracket type, data indicative of the selected position of the middle projection being stored in the memory, the processing system generating the selected bracket type as including the middle projection in accordance with the stored data indicative of the selected position of the middle projection.

11. A method of document processing using a processing system comprising the steps of:

storing data of a hand-written document including a trace of a bracket in a memory of the processing system;

storing data of plural types of brackets each having a predetermined shape in the memory; and storing data indicative of the starting and ending points of the trace of the bracket in the memory, the processing system determining a size of the bracket in accordance with the stored data indicative of starting and ending points, comparing a trace of a bracket in the stored document data with the data of the plural types of brackets stored in the memory, selecting a bracket type which is closest in shape to the trace of the bracket, generating the bracket of the selected bracket type having the determined size and displaying the generated bracket on a display.

12. A document processing method for a processing system comprising the steps of:

storing input document data in a memory of the processing system;

storing data indicative of a user selected input position for a symbol in the document data, the input position of the symbol selectable as extending across plural lines or plural columns;

determining an actual input position of the symbol based on the stored data indicative of the input position and arrangement of null characters and characters other than null characters around the input position as specified by the stored data indicative of input position; and displaying the document data on a display of the processing system as including the symbol located at the determined actual input position, said step of determining an actual input position includes detecting a position where a character of a type other than that of a character located in the user selected input position in the document data is first detected on the right or left side of a column of the user selected input position.

13. A document processing method for a processing system comprising the steps of:

storing input document data in a memory of the processing system;

storing data indicative of a user selected input position for a symbol in the document data, the input position of the symbol selectable as extending across plural lines or plural columns;

determining a length of the symbol based on the stored data indicative of the input position and arrangement of null characters and characters other than null characters around the input position as specified by the stored data indicative of input position; and displaying the document data on a display of the processing system as including the symbol having the determined length and located at the input position, said step of determining a length of the symbol including downwardly searching the document data along columns next to the user selected input position on right and left sides thereof, detecting a first number of lines counted from a line in which a character other than a null character is first detected on the right side to a line in which a null character is thereafter detected on the right side and a second number of lines counted from a line in which a character other than the null character first detected on the left side to a line in which a null character is thereafter detected on the left side, and designating the greater of the first number of lines and the second number of lines as the length of the symbol.

14. A document processing method for a processing system comprising the steps of:

storing input document data in a memory of the processing system;

storing data indicative of a user selected input position for a symbol in the document data, the input position of the symbol selectable as extending across plural lines or plural columns;

determining a position of a characteristic point of the symbol based on the stored data indicative of the input position and arrangement of null characters and characters other than null characters around the input position as specified by the stored data indicative of input position; and displaying the document data on a display of the processing system as including the symbol having the characteristic point at the determined position and located at the input position, said step of determining a position of a characteristic point including downwardly searching the document data along a column next to the user selected input position on a side to which the characteristic point projects, detecting a first position in which a character other than the null character is first detected and a second position in which a null character is thereafter detected, and designating a middle position between the first and second positions as the position of the characteristic point of the symbol.

15. A document processing system comprising:

input means for inputting data of a document;

document storing means for storing therein the input document data;

display means for displaying the document data;

bracket data storing means for storing therein data of plural types of brackets each having a predetermined shape;

bracket specification storing means for storing therein data of a bracket type selected from the plural types of brackets stored in said bracket data storing means;

bracket position specifying means for specifying positions of starting and ending points between which a bracket specified by the data stored in said bracket specification storing means is to be located in the document;

bracket position storing means for storing therein positional data indicative of the positions of the starting and ending points in the document specified by said bracket position specifying means;

bracket generating means for determining a size of the bracket specified by the data stored in said bracket specification storing means based on the position data stored in said bracket position storing means so as to lay out the bracket in the document, for generating the bracket having said size, and for storing data of the generated bracket in said document storing means;

editing means for controlling display of the generated bracket by said display means in a position in the document specified by the positional data based on the data of the generated bracket stored in said document storing means;

middle-projection position specifying means for specifying a position of a middle projection of the bracket specified by the data stored in said bracket specification storing means, said bracket position storing means storing positional data indicative of the position of the middle projection in the document specified by said middle-projection position specifying means, said bracket generating means generating the bracket specified by the data stored in said bracket specification storing means as having a middle projection located in the position specified by said middle-projection position specifying means and storing the generated bracket in said document storing means;

second input means for inputting data of a document by handwriting; and bracket identifying means for comparing a trace of a bracket in the input document data with the data of the plural types of brackets stored in said bracket data storing means and selecting a bracket type which is closest in shape to the trace of the bracket, said bracket position storing means storing therein positional data of starting and ending points of the trace of the bracket.

* * * * *